(12) United States Patent
Stephanopoulos et al.

(10) Patent No.: US 7,871,459 B2
(45) Date of Patent: Jan. 18, 2011

(54) APPARATUS AND METHODS FOR NON-REGENERATIVE AND REGENERATIVE HOT GAS DESULFURIZATION

(75) Inventors: Maria Flytzani Stephanopoulos, Winchester, MA (US); Zheng Wang, Alexandria, VA (US); Mann Sakbodin, Newbury Park, CA (US)

(73) Assignee: Trustees of Tufts College, Boston, MA (US)

( * ) Notice: Subject to any disclaimer, the term of this patent is extended or adjusted under 35 U.S.C. 154(b) by 512 days.

(21) Appl. No.: 11/718,864

(22) PCT Filed: Nov. 8, 2005

(86) PCT No.: PCT/US2005/040488

§ 371 (c)(1),
(2), (4) Date: Mar. 18, 2008

(87) PCT Pub. No.: WO2006/052997

PCT Pub. Date: May 18, 2006

(65) Prior Publication Data

US 2008/0267848 A1 Oct. 30, 2008

Related U.S. Application Data

(60) Provisional application No. 60/626,078, filed on Nov. 8, 2004, provisional application No. 60/645,133, filed on Jan. 19, 2005, provisional application No. 60/681,315, filed on May 16, 2005, provisional application No. 60/730,994, filed on Oct. 28, 2005.

(51) Int. Cl.
*B01D 53/02* (2006.01)
*B01D 53/52* (2006.01)

(52) U.S. Cl. .............................. 95/135; 95/136; 95/148

(58) Field of Classification Search .................. 96/108, 96/153; 95/90, 135–137, 148; 423/242.1, 423/244.01; 502/400
See application file for complete search history.

(56) References Cited

U.S. PATENT DOCUMENTS 3,974,256 A    8/1976   Wheelock et al.

(Continued)

FOREIGN PATENT DOCUMENTS

EP         1245268 A2    10/2002

(Continued)

OTHER PUBLICATIONS

International Search Report dated Apr. 7, 2006.

*Primary Examiner*—Frank M Lawrence
(74) *Attorney, Agent, or Firm*—Foley Hoag, LLP

(57) ABSTRACT

Disclosed is a doped cerium oxide sorbent that can effectively and regenerably remove $H_2S$ in the temperature range of about 500° C. to about 1000° C. Regenerable sorbents (e.g., $ZnO$, $La_2O_3$, $CeO_2$) and methods of using them are disclosed that allow cyclic desulfurization from about 300-500° C., 350-450° C., and at about 400° C. In one embodiment, the present invention relates to a method of desulfurizing fuel gas comprising passing the fuel gas through the sorbent at a space velocity wherein the sulfur compounds are adsorbed substantially on the surface of the sorbent; and regenerating the sorbent by passing a regenerating gas through the sorbent, wherein substantially all of the sulfur compounds are desorbed from the sorbent surface. In a further embodiment, the method of desulfurizing fuel gas further comprises repeating the aforementioned steps while the fuel processor is in operation. In another embodiment, the step of passing the fuel gas may be preceded by reducing the sorbent by passing a reducing gas through the sorbent. In another embodiment, the sorbent may be fully sulfided, i.e., sulfided on its surface and bulk (internally).

17 Claims, 53 Drawing Sheets

U.S. PATENT DOCUMENTS

| | | | |
|---|---|---|---|
| 4,001,375 A | | 1/1977 | Longo |
| 4,002,720 A | * | 1/1977 | Wheelock et al. ............ 423/230 |
| 4,251,496 A | | 2/1981 | Longo et al. |
| 4,346,063 A | * | 8/1982 | Cahn et al. .................. 423/230 |
| 4,381,991 A | * | 5/1983 | Bertolacini et al. ......... 208/113 |
| 4,826,664 A | | 5/1989 | Kay et al. |
| 4,885,145 A | * | 12/1989 | Kay et al. .................... 423/230 |
| 5,024,985 A | | 6/1991 | Koberstein et al. |
| 5,492,684 A | * | 2/1996 | Buchanan et al. ...... 423/244.01 |
| 5,741,469 A | * | 4/1998 | Bhore et al. ........... 423/244.01 |
| 5,766,567 A | * | 6/1998 | Voirin et al. ............. 423/574.1 |
| 6,521,196 B2 | * | 2/2003 | Campbell et al. ......... 423/242.1 |
| 6,607,704 B2 | * | 8/2003 | Guttridge et al. .......... 423/213.2 |
| 6,914,033 B2 | * | 7/2005 | Gislason et al. ............. 502/400 |
| 7,510,692 B2 | * | 3/2009 | Alvarez et al. .............. 423/210 |
| 2002/0044901 A1 | * | 4/2002 | Wilson et al. ................ 423/230 |
| 2002/0178915 A1 | | 12/2002 | Shore et al. |
| 2006/0108262 A1 | | 5/2006 | Takatsu et al. |

FOREIGN PATENT DOCUMENTS

| | | |
|---|---|---|
| EP | 1550505 A1 | 7/2005 |
| WO | WO-9405401 A1 | 3/1994 |
| WO | WO-0226357 A2 | 4/2002 |
| WO | WO-2004022224 A1 | 3/2004 |
| WO | WO-2004058927 A1 | 7/2004 |

OTHER PUBLICATIONS

Lew, et al.; "Sulfidation of Zinc Titanate and Zinc Oxide Solids," Ind. Eng. Chem. Res. 31: 1890-1899 (1992).

Li, Z., et al.; "Cu-Cr-O and Cu-Ce-O Regenerable Oxide Sorbents for Hot Gas Desulfurization," Ind. Eng. Chem. Res. 36: 187-196 (1997).

Liu, et al.; "Transition metal-promoted oxidation catalysis by fluorite oxides: A study of CO oxidation over $Cu-CeO_2$"; The Chem. Eng. J. 64: 283-294 (1996).

Liu, et al.; "Transition metal/fluorite-type oxides as active catalysts for reduction of sulfur dioxide to elemental sulfur by carbon monoxide," Catalysis Today 28(4): 391-403 (1996).

Patrick, et al.; "High-Temperature Sulfidation-Regeneration of $CuO-Al_2O_3$ Sorbents"; Ind. Eng. Chem. Res. 28: 931-340 (1989).

* cited by examiner

Cyclic Sulfidation/Regeneration

Cyclic Sulfidation/Regeneration

Cyclic Sulfidation/Regeneration

Cyclic Sulfidation/Regeneration

Cyclic Sulfidation/Regeneration

Cyclic Sulfidation/Regeneration

Cyclic Sulfidation/Regeneration

| Sorbent treatment conditions | CeO₂ particle size (nm) | |
|---|---|---|
| | (111) | (200) |
| 650 °C 4h, air | 9.7 | 10.6 |
| 800 °C 10h, air | 93.6 | 96.9 |
| 800 °C 10min, 50%H₂/He | 51.1 | 45.8 |

Sorbent surface area (m²/g) after pre-reduction

| Sorbent | CeO$_2$ | 10%Cu-CeO$_2$ | Ce30%LaO$_x$ | Ce70%LaO$_x$ |
|---|---|---|---|---|
| 650 °C | 73.1 | 56.5 | 61 | 38.2 |
| 800 °C | 25.1 | ~1 | 28.3 | 13.8 |

[A]

[B]

APPARATUS AND METHODS FOR NON-REGENERATIVE AND REGENERATIVE HOT GAS DESULFURIZATION

RELATED APPLICATIONS

This application claims the benefit of priority to Patent Cooperation Treaty Application number PCT/US2005/040488, filed Nov. 8, 2005; which claims the benefit of priority to U.S. Provisional Patent Application Ser. No. 60/626,078, filed Nov. 8, 2004; U.S. Provisional Patent Application Ser. No. 60/645,133, filed Jan. 19, 2005; U.S. Provisional Patent Application Ser. No. 60/681,315, filed May 16, 2005; and U.S. Provisional Patent Application Ser. No. 60/730,994, filed Oct. 28, 2005; all of which are hereby incorporated by reference in their entirety.

GOVERNMENT SUPPORT

This invention was made with government support under grant number DAAD19-01-2-0010 awarded by the U.S. Army. The U.S. government has certain rights in the invention.

BACKGROUND OF THE INVENTION

Over the past two decades, significant effort has been devoted to the regenerable hot-gas desulfurization from coal-derived fuel gas streams at high temperatures. See Flytzani-Stephanopoulos, M and Li, Z., "Kinetics of Sulfidation Reactions Between H2S and Bulk Oxide Sorbents," Invited review paper, NATO-Advanced Study Institute on "Desulfurization of Hot Coal Gas", NATO ASI Series G, v. 42 (ed. A. T. Atimtay, D. P. Harrison), pp. 179-212. Bulk metal oxides have been studied more extensively than supported oxides as potential hot gas desulfurization sorbents due to lower manufacturing costs and higher sulfur capacity (grams of sulfur per grams of sorbent).

The general desulfurization reaction of a metal oxide sorbent in a reducing environment can be written as follows:

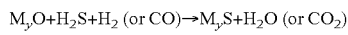

$$M_yO + H_2S + H_2 \text{ (or CO)} \rightarrow M_yS + H_2O \text{ (or CO}_2\text{)}$$

Zinc oxide is the sorbent of choice in non-regenerable schemes and for operations at low temperatures (<400° C.). At higher temperatures (~550° C.), zinc-oxide gets reduced to volatile Zn in a reformate gas stream. See Flytzani-Stephanopoulos, M., "Alternative Sorbent Development," Keynote lecture at DOE/METC Workshop on "Status and Direction of Research and Development for High Temperature Sulfur Removal Sorbents," Morgantown, W. Va., Jan. 28, 1993; Lew, S., Sarofim, A. F., and Flytzani-Stephanopoulos, M., Chem. Eng. Sci. 47 (6), 1421-1431 (1992); and Lew, S., Sarofim, A. F., and Flytzani-Stephanopoulos, M., Ind. Eng. Chem. Res. 31, 1890-1899 (1992). Mixed oxide compounds of zinc (e.g., zinc ferrite and zinc titanate) with less zinc activity are more suitable for higher temperatures but present problems in implementation due to "stratified" sulfidation/reduction in fixed-bed designs. See Gasper-Galvin, L. "Review of METC Test Program," in DOE/METC Workshop on "Status and Direction of Research and Development for High Temperature Sulfur Removal Sorbents," Morgantown, W. Va., Jan. 28, 1993. Zinc migration occurs to the surface of the sorbent particles. The zinc metal either volatilizes or forms dense ZnS resulting in very slow diffusion inwards, i.e., low sulfur capacity and difficulty in regeneration. See Flytzani-Stephanopoulos, M., "Alternative Sorbent Development," Keynote lecture at DOE/METC Workshop on "Status and Direction of Research and Development for High Temperature Sulfur Removal Sorbents," Morgantown, W. Va., Jan. 28, 1993. The use of copper-based sorbents, has been also advocated. See Flytzani-Stephanopoulos, M., Yu, T. U., and Lew, S., "Development and Testing of Desulfurization Sorbents," Topical Report to Texaco, under subcontract, DOE Coop. Agreement No. DE-FC21-87MC23277, Dec. 1988; Patrick, V., Gavalas, G. R., Flytzani-Stephanopoulos, M., and Jothimurugesan, K., Ind. Eng. Chem. Res. 28, 931-340 (1989); and Li, Z., and Flytzani-Stephanopoulos, M., "Cu—Cr—O and Cu—Ce—O Regenerable Sorbents for Hot Gas Desulfurization," Ind. Eng. Chem. Res. 36, 187-196 (1997). In particular, for a fixed-bed operation at temperatures exceeding 700° C., the combination of copper with chromium oxide and cerium oxide has been recently shown to be most appropriate. See Li, Z., and Flytzani-Stephanopoulos, M., "Cu—Cr—O and Cu—Ce—O Regenerable Sorbents for Hot Gas Desulfurization," Ind. Eng. Chem. Res. 36, 187-196 (1997). Iron and aluminum oxides can also be combined with copper oxide to stabilize the latter against total reduction to the metal form, but they are less effective stabilizers than chromium oxide. Another candidate is Cu—CeO$_2$, which has several advantages. CeO$_2$ does not stabilize CuO against reduction; it actually enhances the CuO reducibility. See Liu, W., and Flytzani-Stephanopoulos, M., The Chem. Eng. J. 64, 283 (1996); and Liu, W., Wadia, C., and Flytzani-Stephanopoulos, M., Catal. Today 28 (4), 391 (1996). However, CeO$_2$ is an excellent dispersant keeping copper in finely divided form. In turn, copper increases the reducibility of ceria. The reduced form Ce$_2$O$_3$ is a highly efficient sorbent. See Kay, D. A. R., et al., U.S. Pat. No. 4,826,664 (1989). The sulfur capacity of the Cu—CeO$_2$ system is higher than that of Cu with other stabilizers since CeO$_2$ can also participate in desulfurization through the formation of Ce$_2$O$_2$S and Ce$_2$S$_3$ phases.

Future methods of production of electricity utilize processes such as Integrated Gasifier Combined Cycle (IGCC) systems or fuel cells or pressurized fluid bed combustion. In these methods of electric power production, the reaction of coal with oxygen is not carried to completion. As a result, the gases contain amounts of hydrogen (H$_2$) and carbon monoxide (CO) which are generally greater than the amount of carbon dioxide (CO$_2$) and H$_2$O in these gases. The sulfur from the coal used to produce these gases is mainly in the form of hydrogen sulfide (H$_2$S) or sulfur carbonyl (COS). Such gases are hereinafter referred to as "fuel" gases.

Desulfurization to the lowest possible levels of fuel gases is critical because of restrictions on the amount of sulfur released into the atmosphere from the combustion of coal. The restrictions have been imposed by the Federal Clean Air Act, the provisions of which are enforced by the Environmental Protection Agency. Desulfurization to these low levels is also required for efficient, long term operation of IGCC systems and fuel cells.

Desulfurization at the highest possible rate is also important. The rate of desulfurization will control the size of the equipment used in which desulfurization of fuel or flue gases is conducted. Smaller sized reaction vessels will reduce the capital cost for the desulfurization of gases. It is also important that the utilization of the sorbent be as high as possible over many cycles of sulfidation and regeneration to minimize the amount of sorbent required. While adsorption of H$_2$S is known to take place on oxide sorbents, such as cerium oxide, the resulting sulfided sorbent is difficult to regenerate fully. In fixed bed reactors, the process is slow and complicated by the production of a mixture of sulfur-containing gases that cannot be readily processed to recover the sulfur value. The problem of highly efficient and regenerative hot desulfurization of gas streams remains an unsolved problem.

Presently, fuel cells are undergoing rapid development for both stationary and transportation applications. Low-sulfur diesel and fuel oils are being contemplated for use with fuel cells domestically. However, even with low-sulfur fuels, there should be a sorbent unit effectively removing $H_2S$ upstream of the fuel cell to protect the anode material from sulfur poisoning. A lot of interest in this field derives from the intended use of fuel processing to produce hydrogen for fuel cells. Any sulfur present in the fuel will be converted to $H_2S$ during the auto-thermal or stream reforming step of fuel processing. The sensitivity of most anode materials to sulfur requires deep desulfurization of the anode feed gas stream. For high temperature fuel cells, such as solid oxide fuel cells (SOFC), the desulfurization unit will operate at temperatures exceeding 600° C. A sorbent is needed with high structural stability in cyclic operation at these temperatures.

The application of lanthanide oxides to substrates for desulfurization of fuel gases has been described by Wheelock et al., U.S. Pat. Nos. 3,974,256 and 4,002,720. However, Wheelock et al. fails to successfully solve the problem that, (1) during regeneration of lanthanide sulfides or lanthanide oxysulfides other than cerium sulfide or cerium oxysulfide, lanthanide oxysulfate could be formed which would require temperatures in excess of 1500° C. to regenerate back to lanthanide oxide, and (2) in many cases the utilization of the sorbent for desulfurization would be reduced to a small fraction of its original utilization because of the formation of these lanthanide oxy-sulfates and lanthanide sulfates.

Furthermore, Wheelock et al. utilizes alkali or alkaline earth metal components (as oxides). Thus, the prior art, including Wheelock et al., failed to appreciate that the low melting point oxides of the alkalis would react with the lanthanide oxides to create a mixture which may not be capable of reacting with the sulfur in either fuel or flue gases. The cerium oxide sorbents of the present invention avoid this problem by doping the cerium oxide with lanthanide or transition metal oxides such as copper oxide.

The application of cerium oxide coatings to substrates for the desulfurization of fuel gases has been suggested by Kay et al, U.S. Pat. No. 4,885,145. The information in Column 6, lines 3 through 7 of Kay et al. acknowledges that putting cerium oxide on a support would increase its utilization. Kay et al. states that increasing the utilization of the sorbent also increases the rate of desulfurization and the extent of desulfurization. However, Kay et al. does not solve the long regeneration times that do not match the sulfiding times which require multiple units.

Longo, U.S. Pat. Nos. 4,001,375 and 4,251,496, describes the use of cerium oxide for the desulfurization of flue gases. The methods utilized by Longo to apply the cerium oxide to an $Al_2O_3$ support are described in detail in these patents. However, Longo does not teach or suggest effective desulfurization sorbents at low temperatures.

Kay et al., U.S. Pat. No. 4,885,145, describes the utilization of solid solutions of cerium oxide and other altervalent oxides of either other lanthanides or oxides of the alkaline earth elements to increase the utilization of the sorbents, which are solid solutions, as well as to increase the extent of desulfurization and the rate of desulfurization of fuel gases. However, Kay et al. does not disclose using copper oxides in the cerium oxide sorbents or effective desulfurization at low temperatures.

Koberstein et al., U.S. Pat. No. 5,024,985, describes a support material for a three-way automotive catalyst containing platinum group metal and having a reduced tendency for $H_2S$ emissions. The support material is formed from an annealed spray-dried combination of aluminum oxide and cerium oxide. In the process described in Koberstein et al., $SO_2$ in the exhaust gas exiting the engine reacts under oxidizing conditions ($\lambda=1.02$) with the $CeO_2$ portion of the catalyst to form $Ce_2(SO_4)_3$. When a reducing gas ($\lambda=0.92$) is passed over the $Ce_2(SO_4)_3$, a release of $H_2S$ and $SO_2$ occurs with the regeneration of $Ce_2(SO_4)_3$ back to $CeO_2$, which is again capable of reacting with the $SO_2$ in an oxidizing gas ($\lambda=1.02$). The reaction for the release of $SO_2$ and $H_2S$ during regeneration of $Ce_2(SO_4)_3$ has been described in the Longo patents previously cited.

Koberstein et al. does not teach or suggest that the $CeO_2$ portion of the catalyst reacts with $H_2S$ in the automobile exhaust gas. In fact, the exhaust gas exiting the automobile engine does not contain $H_2S$. Rather, the data of Koberstein et al. shows in the Examples provided therein that the smaller surface area of the $CeO_2$ portion of the catalyst annealed at 1000° C. limits the amount of $SO_2$ that reacts with the $CeO_2$ to form $Ce_2(SO_4)_3$, thereby limiting the amount of $H_2S$ which may be subsequently emitted as a result of the chemically reducing action of the %=0.92 gas with $Ce_2(SO_4)_3$.

Koberstein et al. illustrates this principle in Comparative Example 1 and Example 3. In Comparative Example 1, high surface area is maintained by a final annealing step in hydrogen at 550° C. for four hours. In Example 3, Koberstein et al. prepares the catalyst in the same manner as Comparative Example 1 except that the final annealing step is performed at 1000° C. for 24 hours in hydrogen. It is known to those skilled in the art that the surface area of $CeO_2$ is markedly reduced by annealing at temperatures as high as 1,000° C. This is particularly true when the annealing step is performed in an atmosphere of hydrogen, which is necessary to reduce the hexachloroplatinic salt to platinum metal.

Wilson et al., U.S. Published Patent Application No. 2002/0044901, discloses a method of desulfurizing gases in which microdomains or microcrystals of cerium oxide are provided with an aluminum oxide substrate. Wilson et al. reports that the use of microdomains provides a high surface area of cerium oxide, and a stable surface area of cerium oxide, which react in a rapid fashion with sulfur compounds within the fuel gas. However, forming the microdomains and microcrystals on an aluminum oxide substrate requires extra formation steps that may not be practical on a production scale.

Effective regeneration of fully sulfided sorbents is fraught with problems. These problems include 1) long regeneration times not matching the sulfidation times necessitate the use of multiple units, greatly increasing the weight/volume of the sorber/regenerator units; 2) the sorbent material changes structurally during regeneration; as a result, its sulfur capacity gradually declines; and 3) the regeneration offgas requires treatment to recover sulfur in one form; this is highly undesirable for any power plant; and totally unrealistic for small-scale devices, APUs, and the like.

Remarkably, among others, the present invention solves all of the aforementioned problems: 1) adsorption of $H_2S$ under high space velocities allows only the surface of the sorbent to sulfide; very fast regeneration in various gas streams is then used to simply desorb the $H_2S$ at times comparable to the adsorption times. Thus, just one sorber/regenerator pair suffices for small- or large-scale fuel cell power plants; 2) only the surface of the sorbent is regenerated/sulfided in cyclic form. This process is reversible, with no irreversible structural complications. The sorbent capacity remains constant after steady-state operation is established; and 3) the sulfur product recovered in the regeneration offgas is approximately 100% $H_2S$, i.e., it requires no further treatment; it can be simply collected in a trap. This approach works over a wide range of temperatures and for all the sorbent materials tested. The disclosures of the foregoing US patents are expressly incorporated herein by reference in their entirety.

SUMMARY OF THE INVENTION

Remarkably, disclosed is a doped cerium oxide sorbent that can effectively and regenerably remove $H_2S$ in the temperature range of about 500° C. to about 1000° C. Moreover, regenerable sorbents (e.g., ZnO, $La_2O_3$, $CeO_2$) and methods of using them are disclosed that allow cyclic desulfurization from about 300-500° C., 350-450° C., and at about 400° C. In one embodiment, the present invention relates to a method of desulfinurizing fuel gas comprising passing the fuel gas through the sorbent at a space velocity wherein the sulfur compounds are adsorbed substantially on the surface of the sorbent; and regenerating the sorbent by passing a regenerating gas through the sorbent, wherein substantially all of the sulfur compounds are desorbed from the sorbent surface. In a further embodiment, the method of desulfurizing fuel gas further comprises repeating the aforementioned steps as long as the fuel processor is in operation. In another embodiment, the step of passing the fuel gas may be preceded by reducing the sorbent by passing a reducing gas through the sorbent. In another embodiment, the sorbent may be fully sulfided, i.e., sulfided on its surface and bulk (internally).

In part, the present invention relates to a sorbent comprising a doped cerium oxide, wherein the cerium oxide is doped by a lanthanide metal. The amount of lanthanide metal is sufficient to create oxygen vacancies in the cerium oxide.

In another embodiment, the present invention relates to a cartridge comprising a housing and a lanthanide or transition metal oxide sorbent. The cartridge is easily replaceable and allows for quick and efficient replacement for semi-continuous fuel gas desulfurization.

In another embodiment, the present invention relates to a desulfurization unit comprising the desulfurization cartridge of the present invention and a fuel gas inlet and outlet, and a regenerating gas inlet and outlet.

In another embodiment, the present invention relates to a non-regenerative method of desulfurizing fuel gas comprising passing the fuel gas through the sorbent at a space velocity wherein the sulfur compounds are adsorbed substantially on the surface of the sorbent.

These embodiments of the present invention, other embodiments, and their features and characteristics, will be apparent from the description, drawings and claims that follow.

DETAILED DESCRIPTION OF THE INVENTION

1. Definitions

Figure 1:
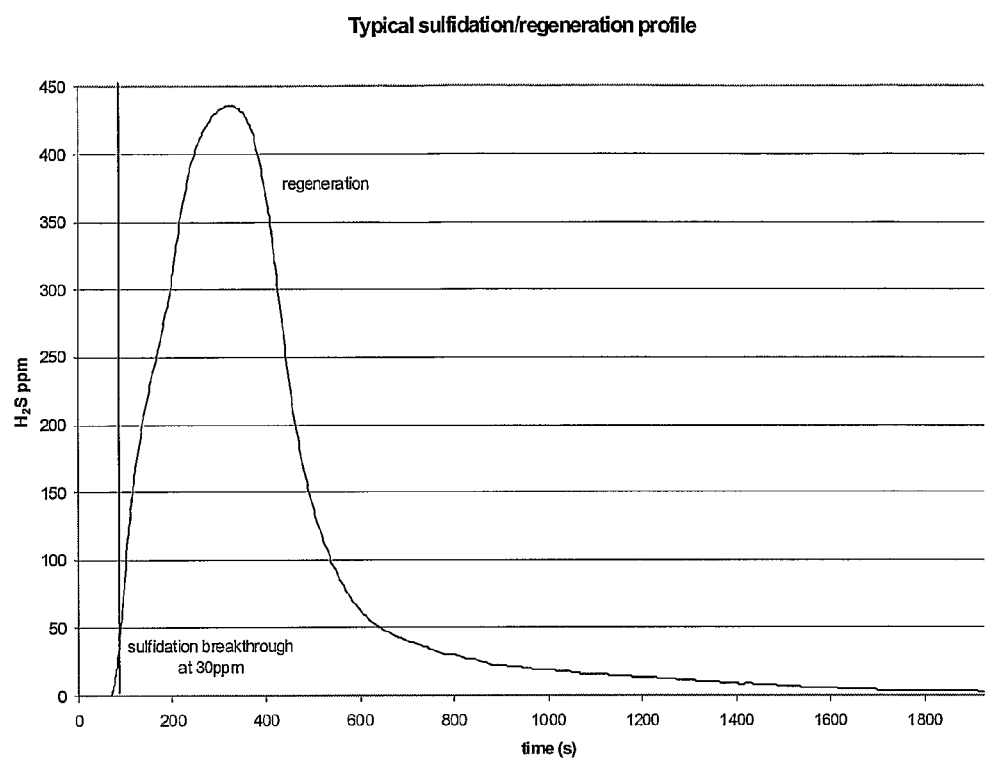
FIG. 1 depicts a typical sulfidation/regeneration profile.
Figure 2:
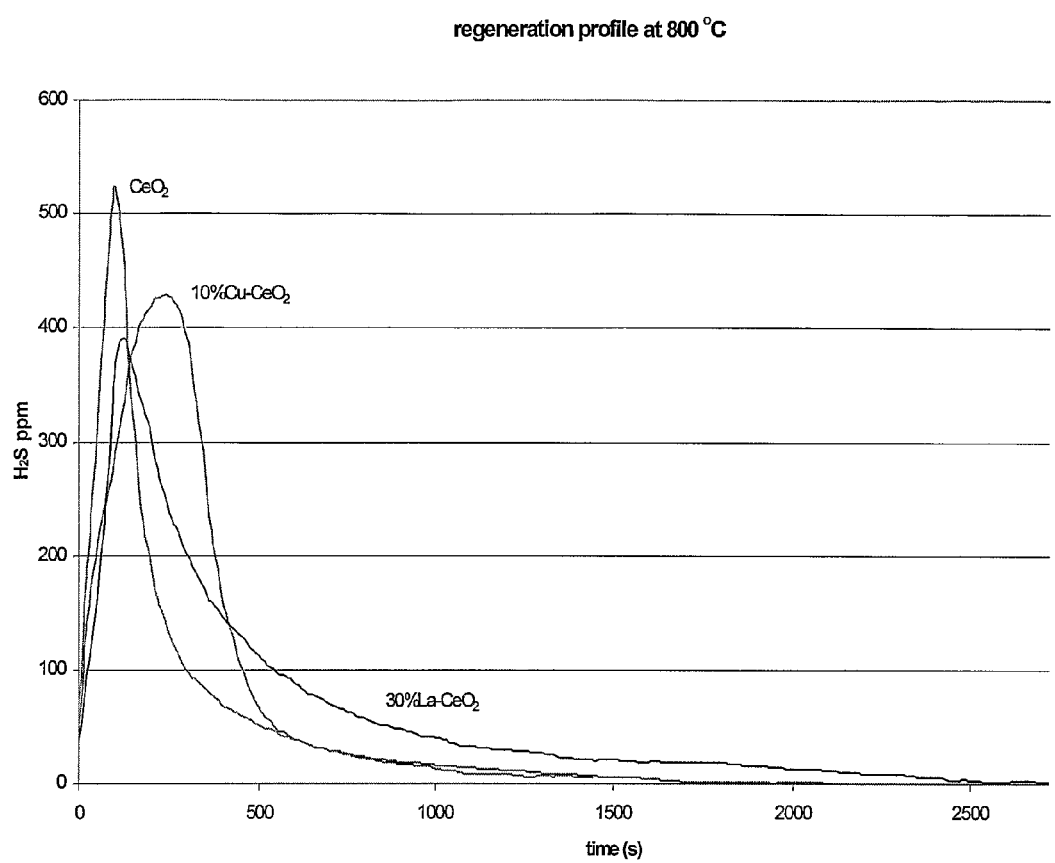
FIG. 2 depicts a regeneration profile at 800° C. for two sorbents, 10% Cu—$CeO_x$ and 30% La—$CeO_x$.
Figure 3:
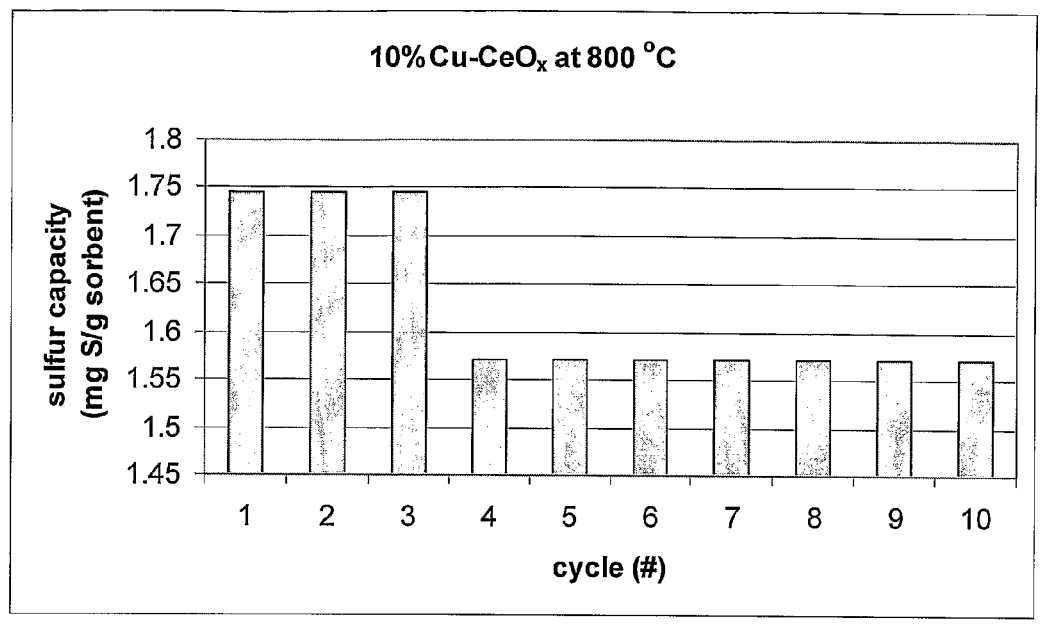
FIG. 3 depicts cyclic sulfidation/regeneration at 650° C. for 10% Cu—$CeO_x$.
Figure 3:
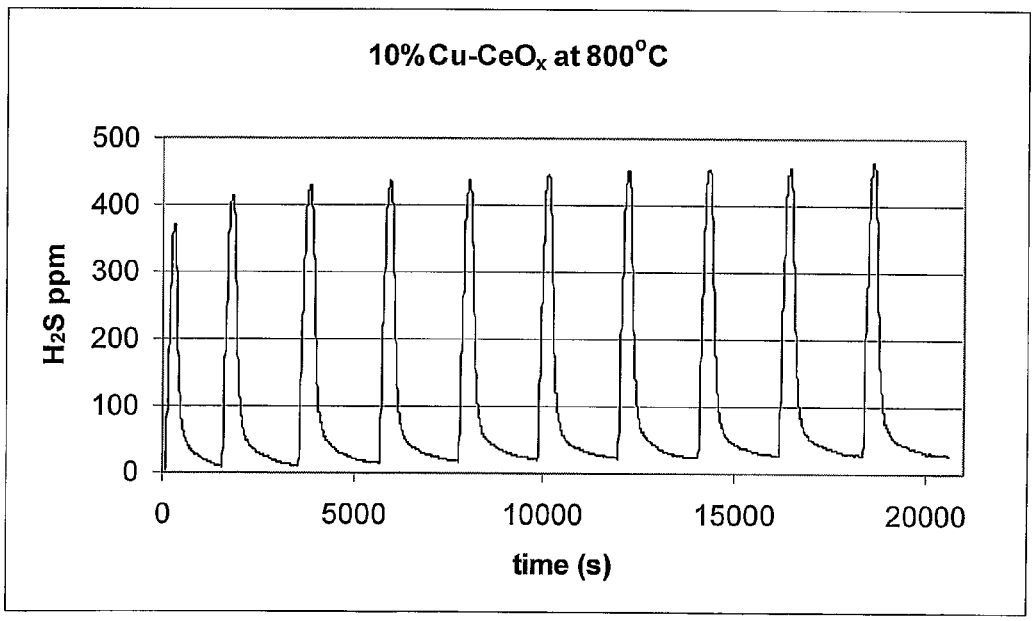
Figure 4:
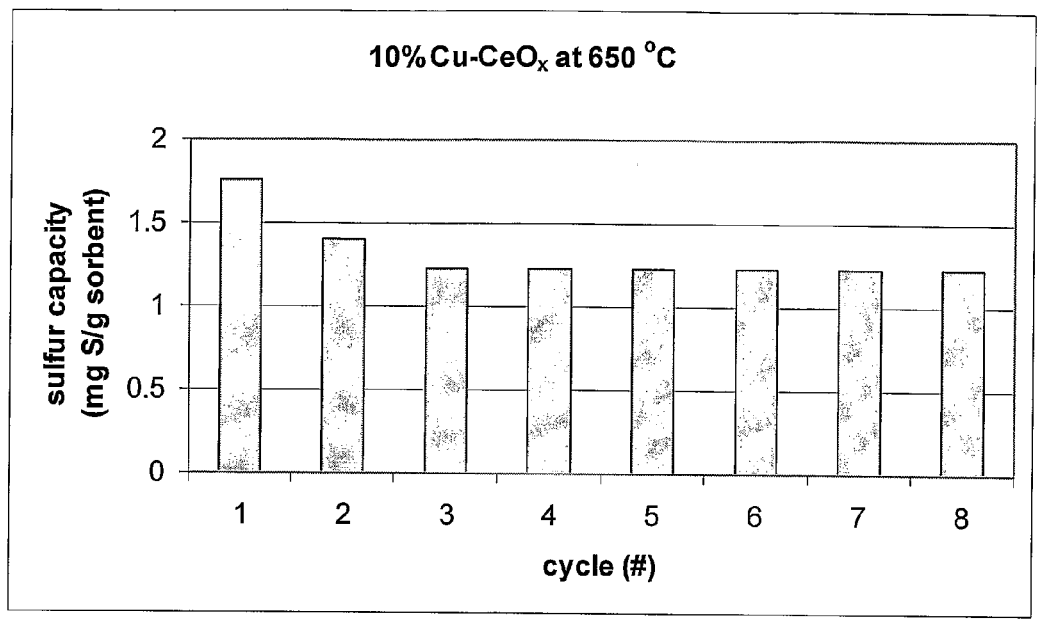
FIG. 4 depicts cyclic sulfidation/regeneration at 800° C. for 10% Cu—$CeO_x$.
Figure 4:
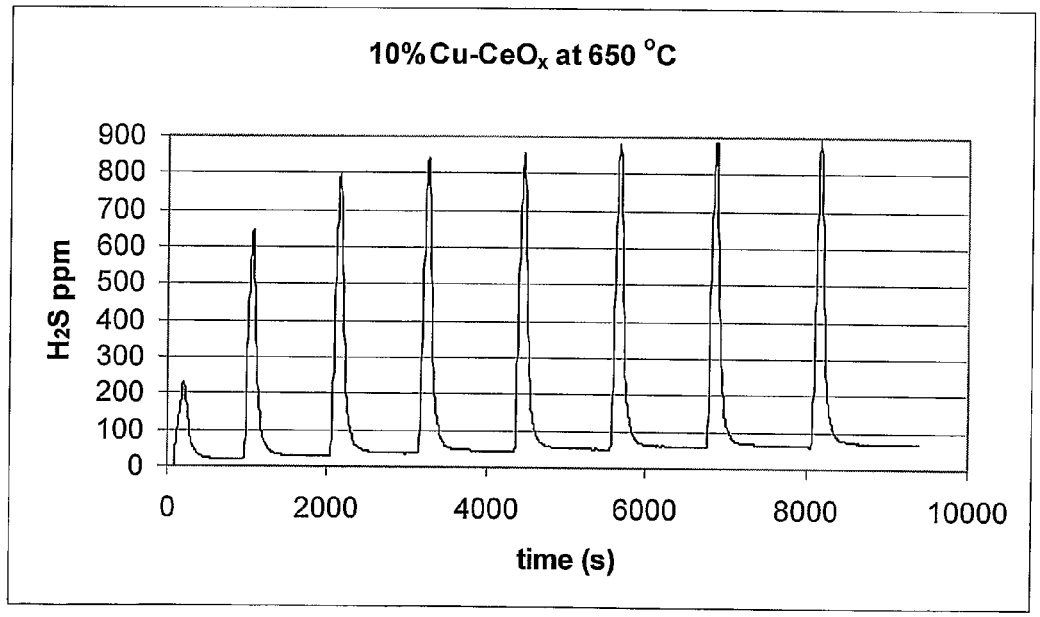
Figure 5:
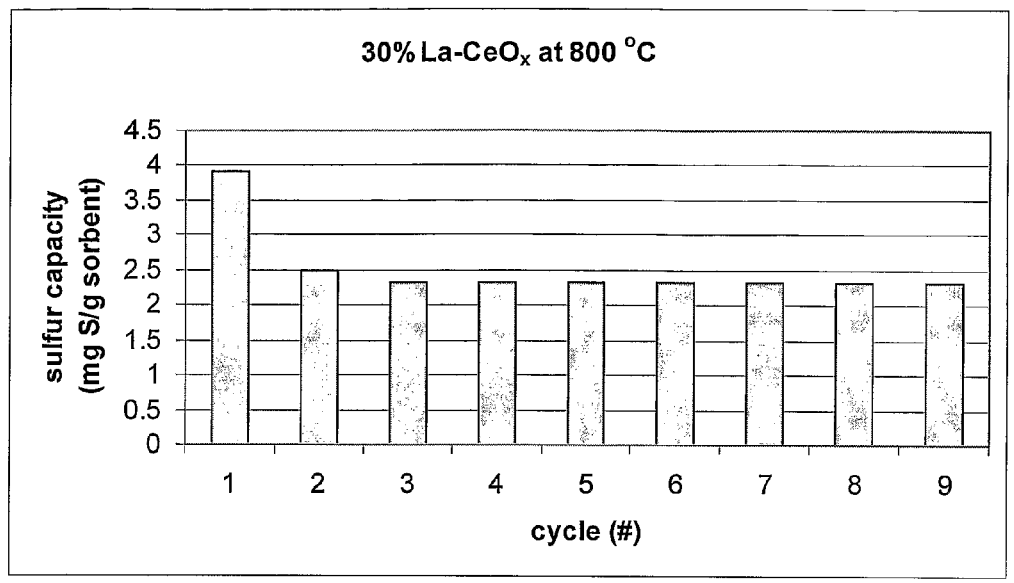
FIG. 5 depicts cyclic sulfidation/regeneration at 650° C. for 30% La—$CeO_x$.
Figure 5:
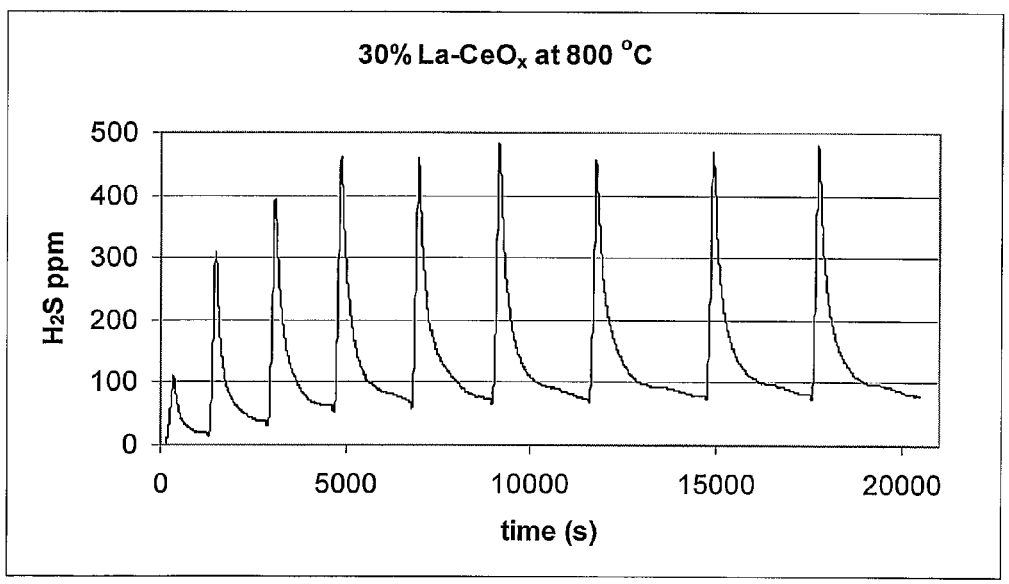
Figure 6:
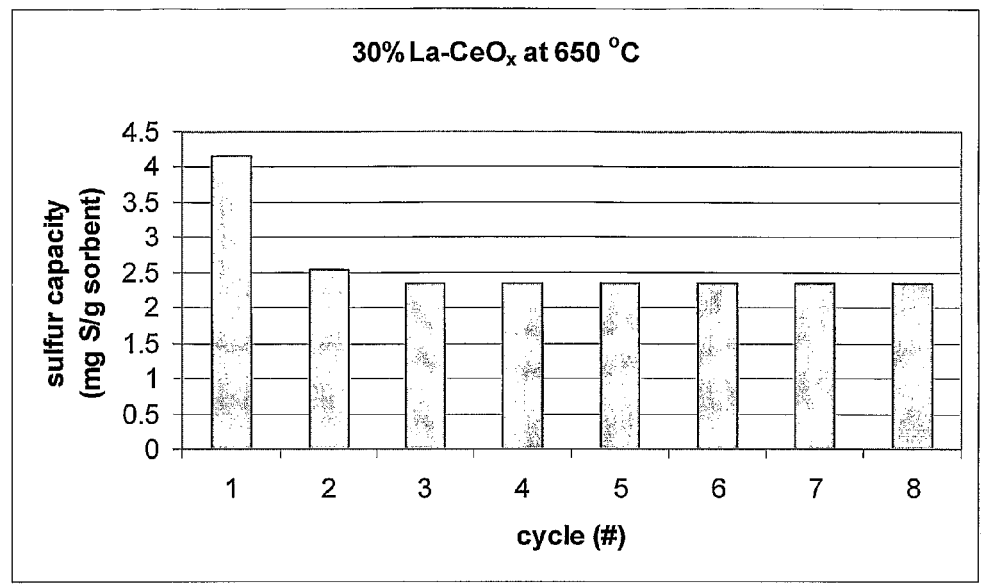
FIG. 6 depicts cyclic sulfidation/regeneration at 800° C. for 30% La—$CeO_x$.
Figure 6:
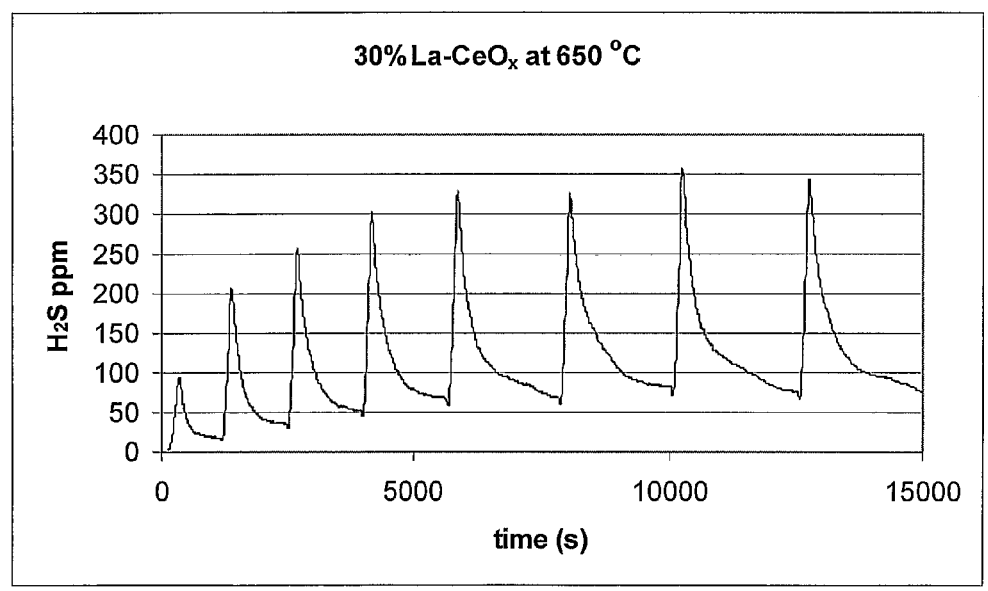
Figure 7:
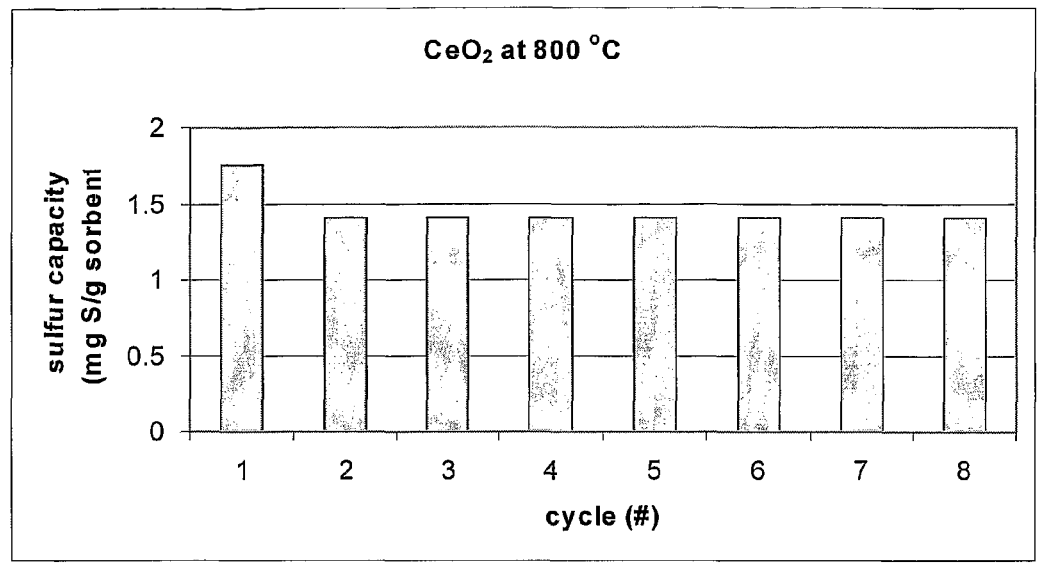
FIG. 7 depicts cyclic sulfidation/regeneration at 650° C. for $CeO_2$.
Figure 7:
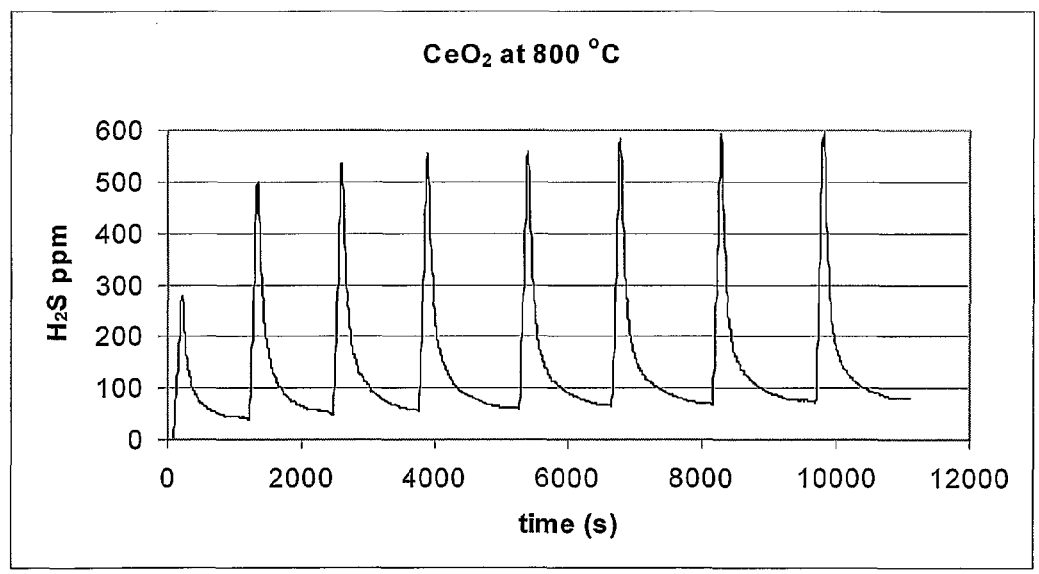
Figure 8:
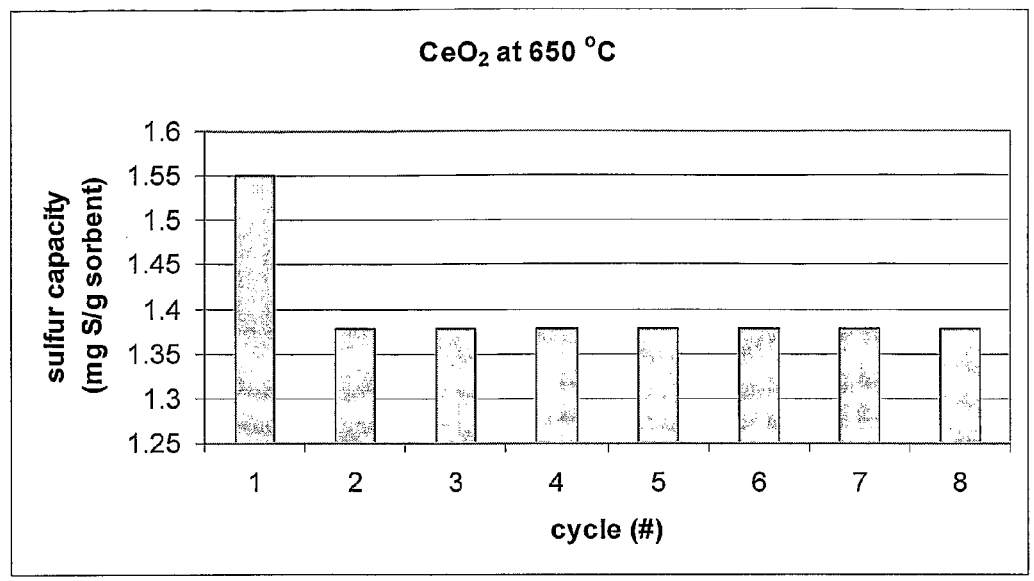
FIG. 8 depicts cyclic sulfidation/regeneration at 800° C. for $CeO_2$.
Figure 8:
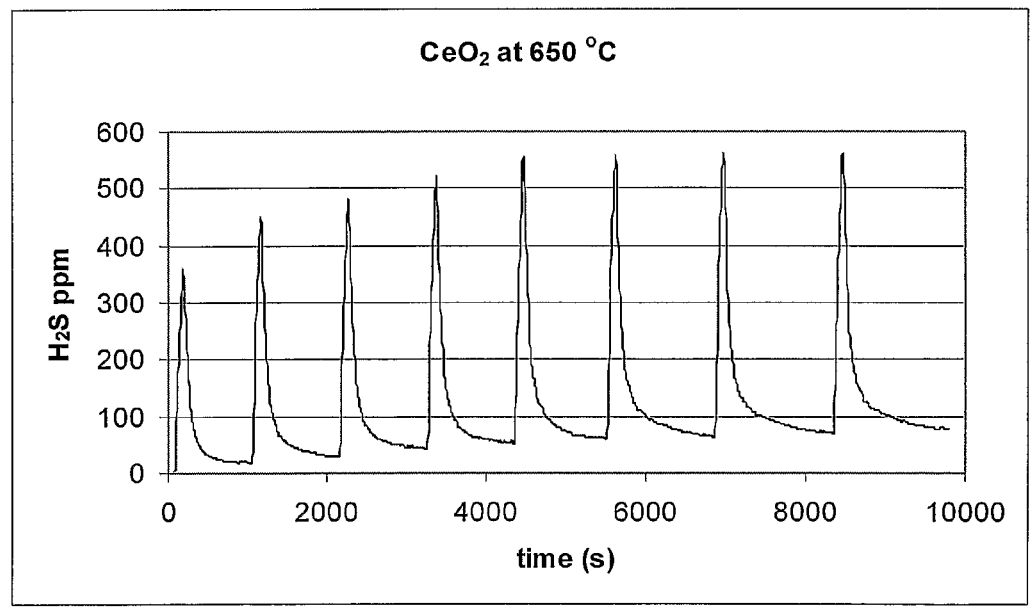
Figure 9:
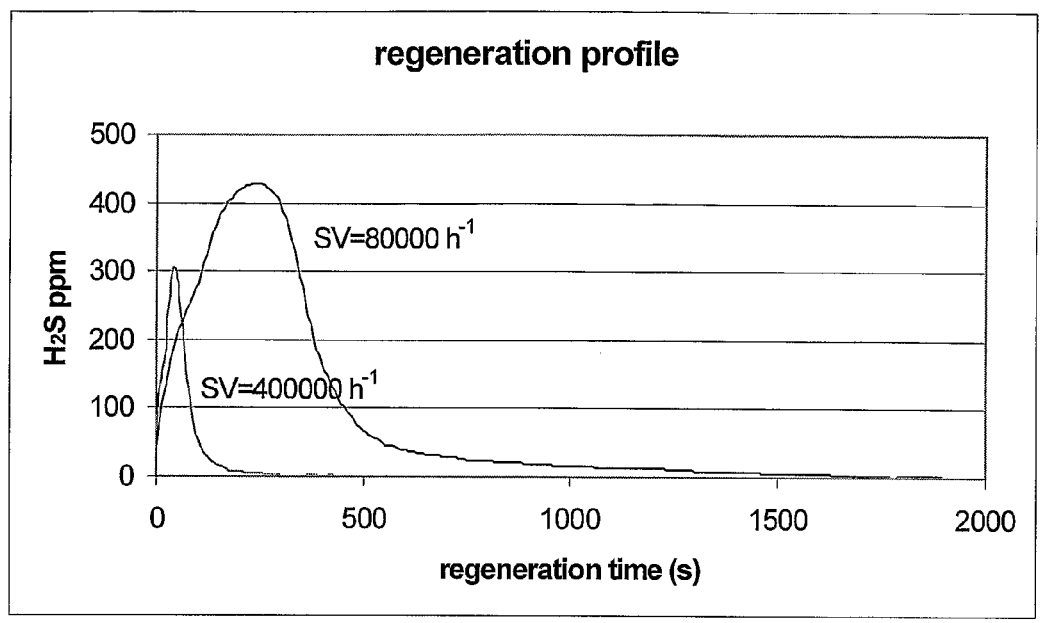
FIG. 9 depicts the regeneration profile of $CeO_2$ showing the effects of space velocity on regeneration time.
Figure 10:
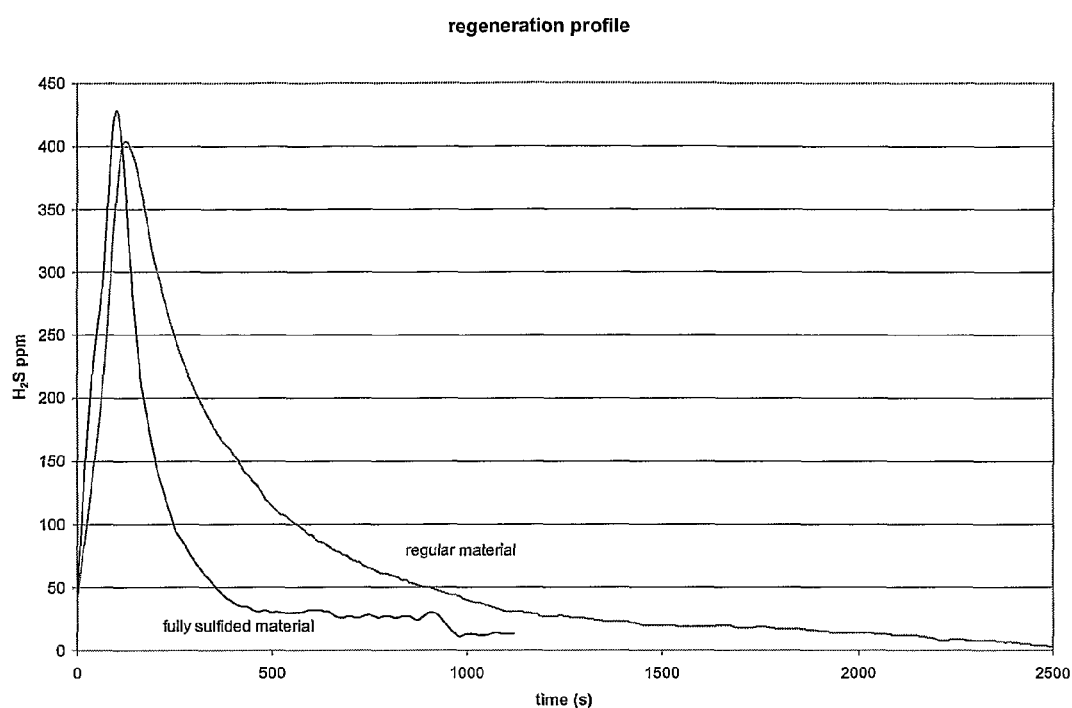
FIG. 10 depicts the regeneration profiles of sorbent material and fully sulfided sorbent material.
Figure 11:
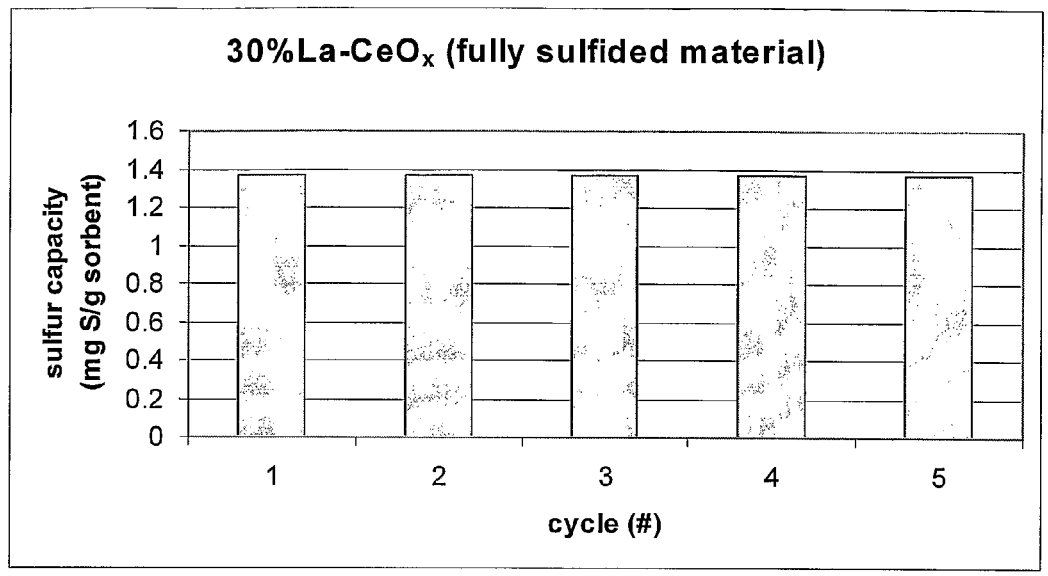
FIG. 11 depicts cyclic sulfidation/regeneration at 650° C. for 30% La—$CeO_x$ for fully sulfided sorbent material.
Figure 11:
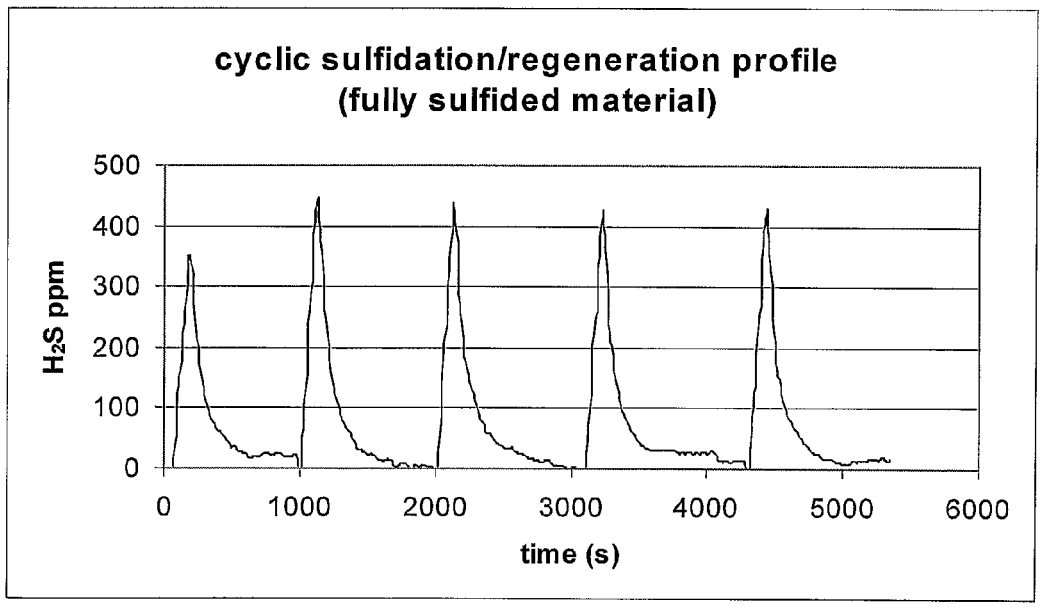
Figure 12:
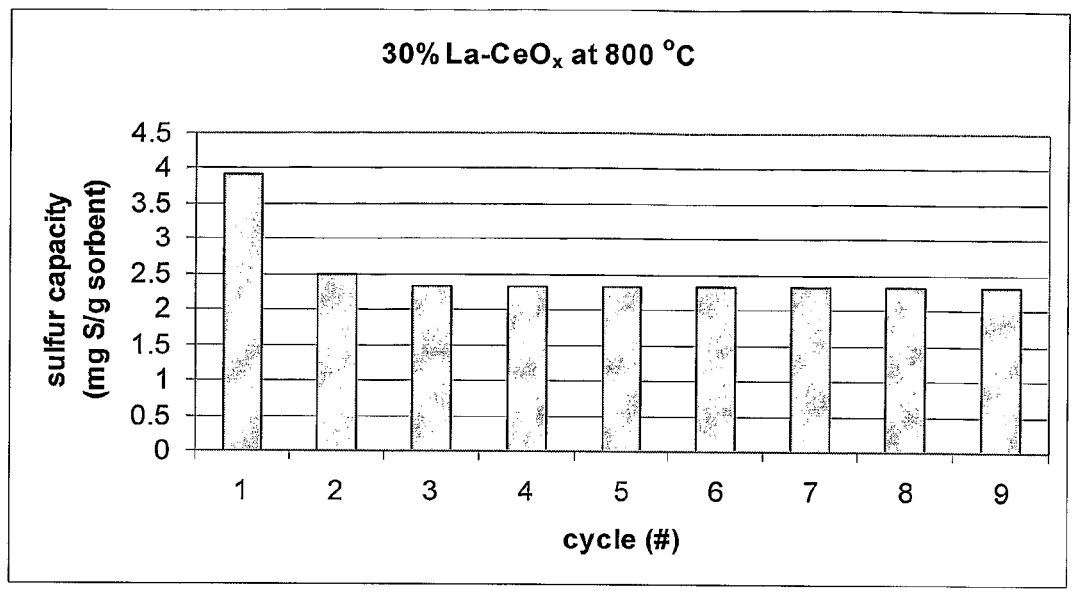
FIG. 12 depicts cyclic sulfidation/regeneration at 800° C. for 30% La—$CeO_x$ for fully sulfided sorbent material.
Figure 12:
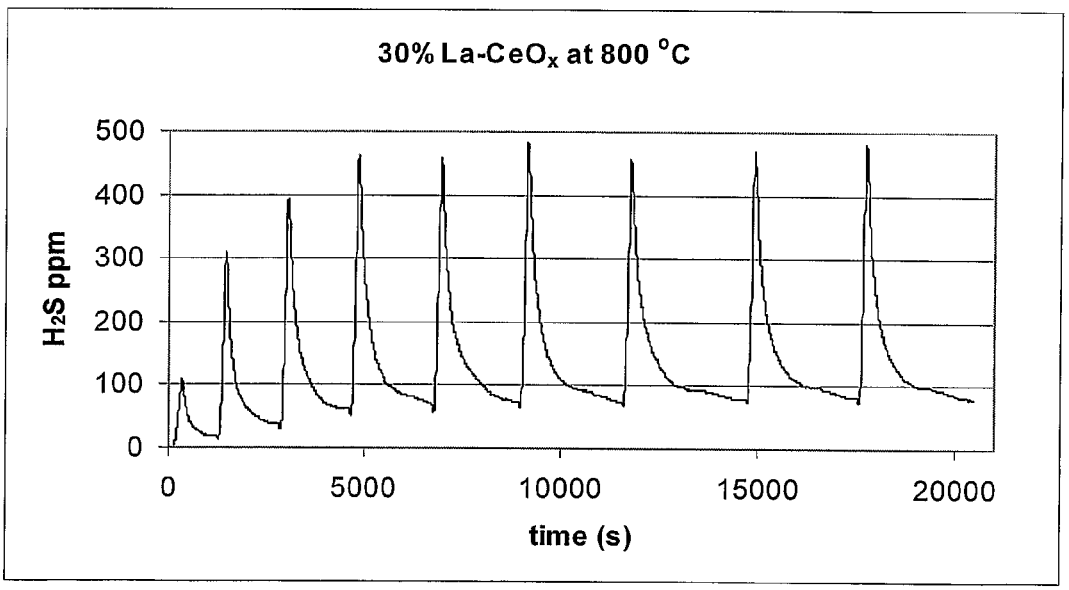
Figure 13:
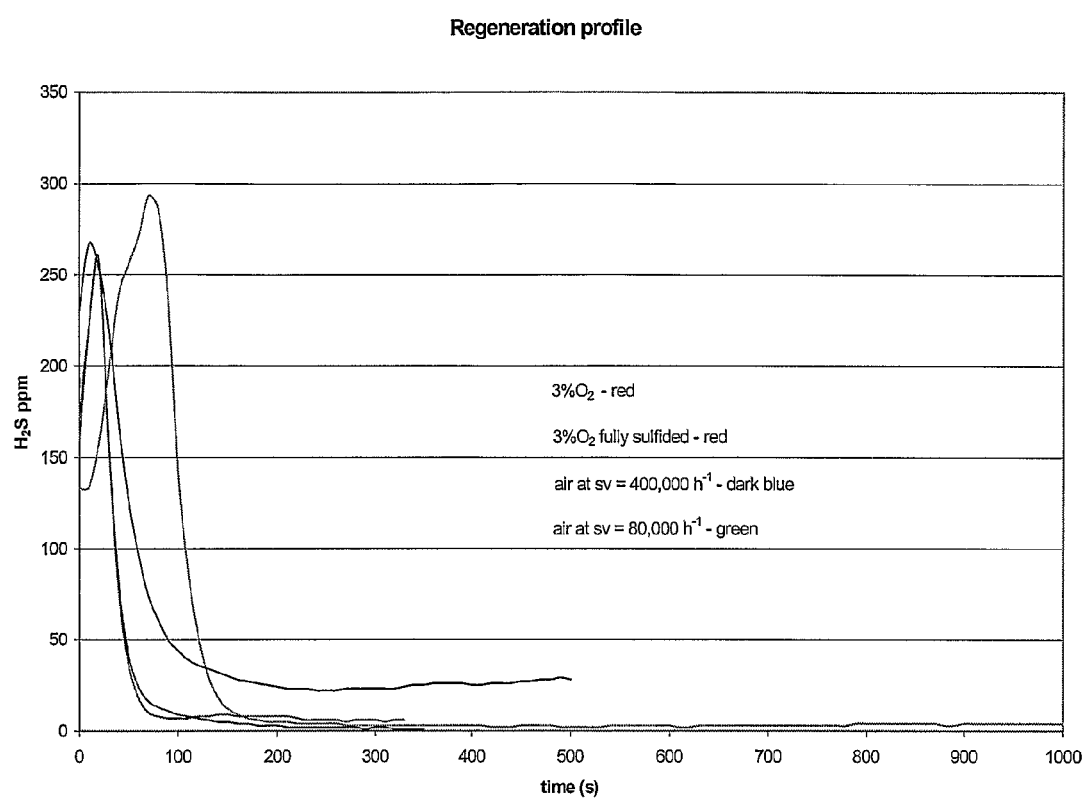
FIG. 13 depicts cyclic sulfidation/regeneration for fully and non-fully sulfided 10% Cu—$CeO_x$ sorbent with regeneration gases: 3% $O_2$/He+10% $H_2O$ at 400,000 space velocity, air+10% $H_2O$ at 80,000 space velocity, and air+10% $H_2O$ at 400,000 space velocity.
Figure 14:
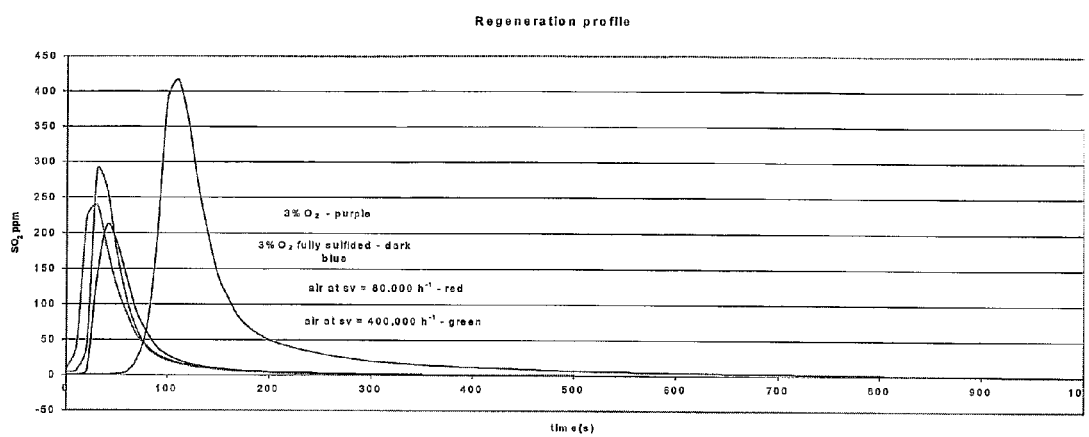
FIG. 14 depicts $SO_2$ levels from cyclic sulfidation/regeneration for fully and non-fully sulfided 10% Cu—$CeO_x$ sorbent with regeneration gases: 3% $O_2$/He+10% $H_2O$ at 400,000 space velocity, air+10% $H_2O$ at 80,000 space velocity, and air+10% $H_2O$ at 400,000 space velocity.
Figure 15:
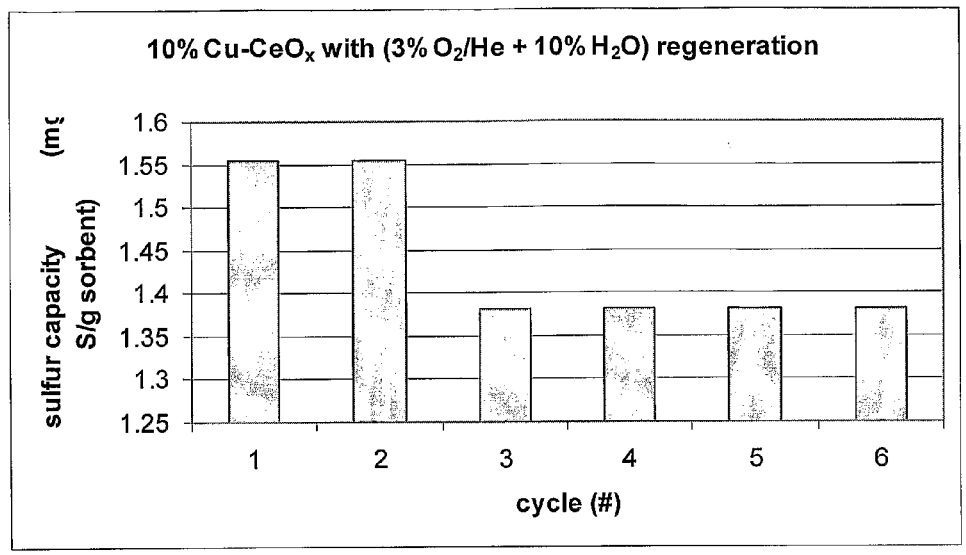
FIG. 15 depicts sulfur capacity for fully sulfided and non-fully sulfided 10% Cu—$CeO_x$ with 3% $O_2$/He+10% $H_2O$ regeneration.
Figure 15:
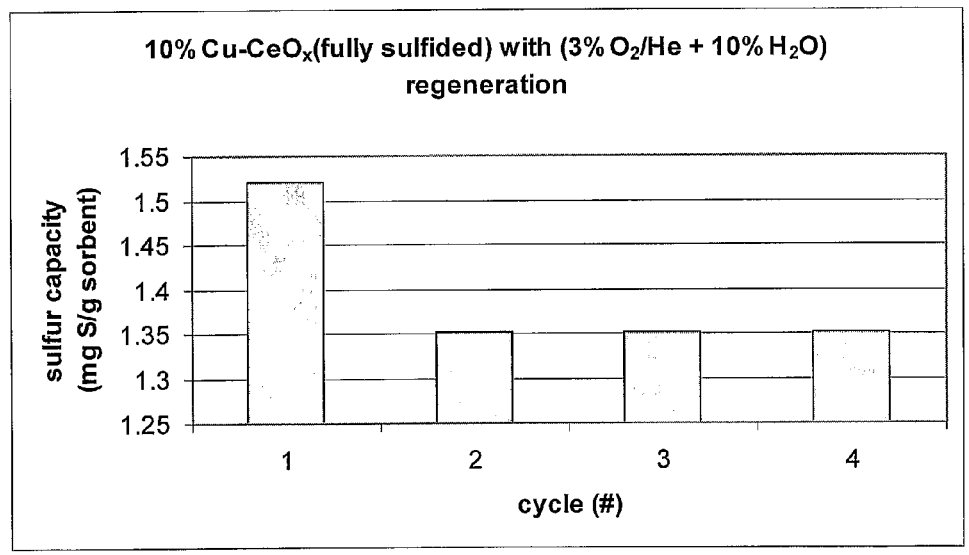
Figure 16:
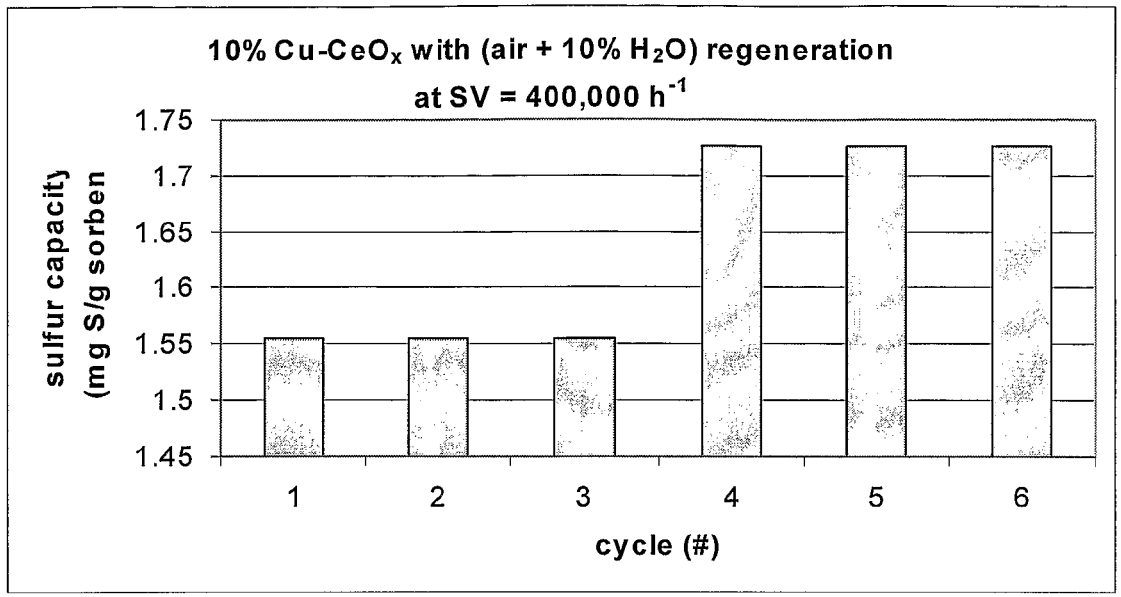
FIG. 16 depicts sulfur capacity for 10% Cu—$CeO_x$ with air+10% $H_2O$ regeneration at 400,000 $h^{-1}$ and 80,000 $h^{-1}$ space velocity.
Figure 16:
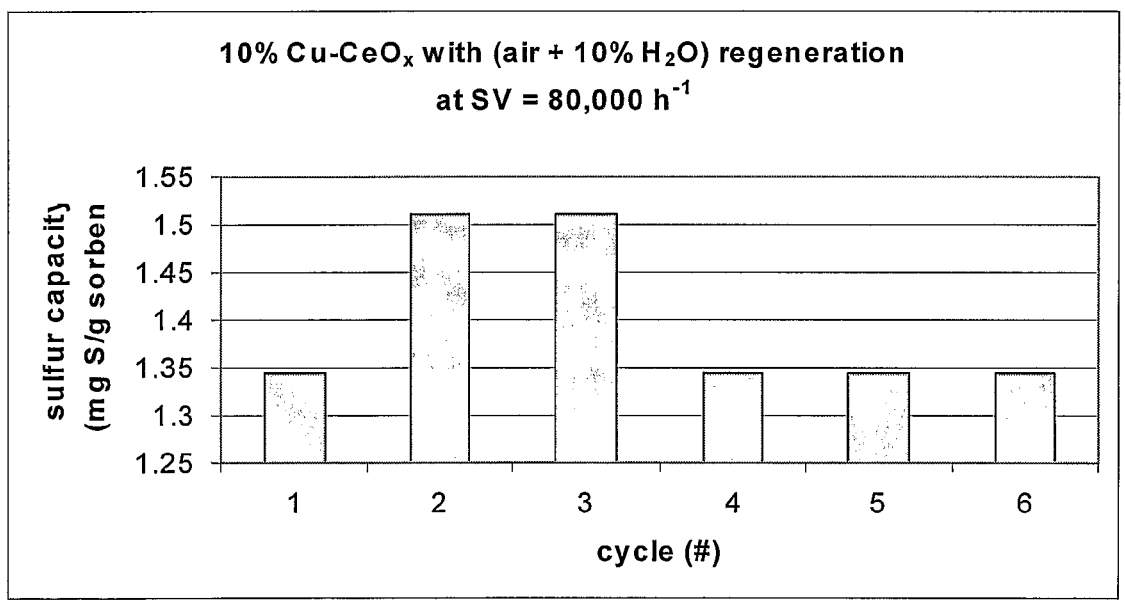
Figure 17:
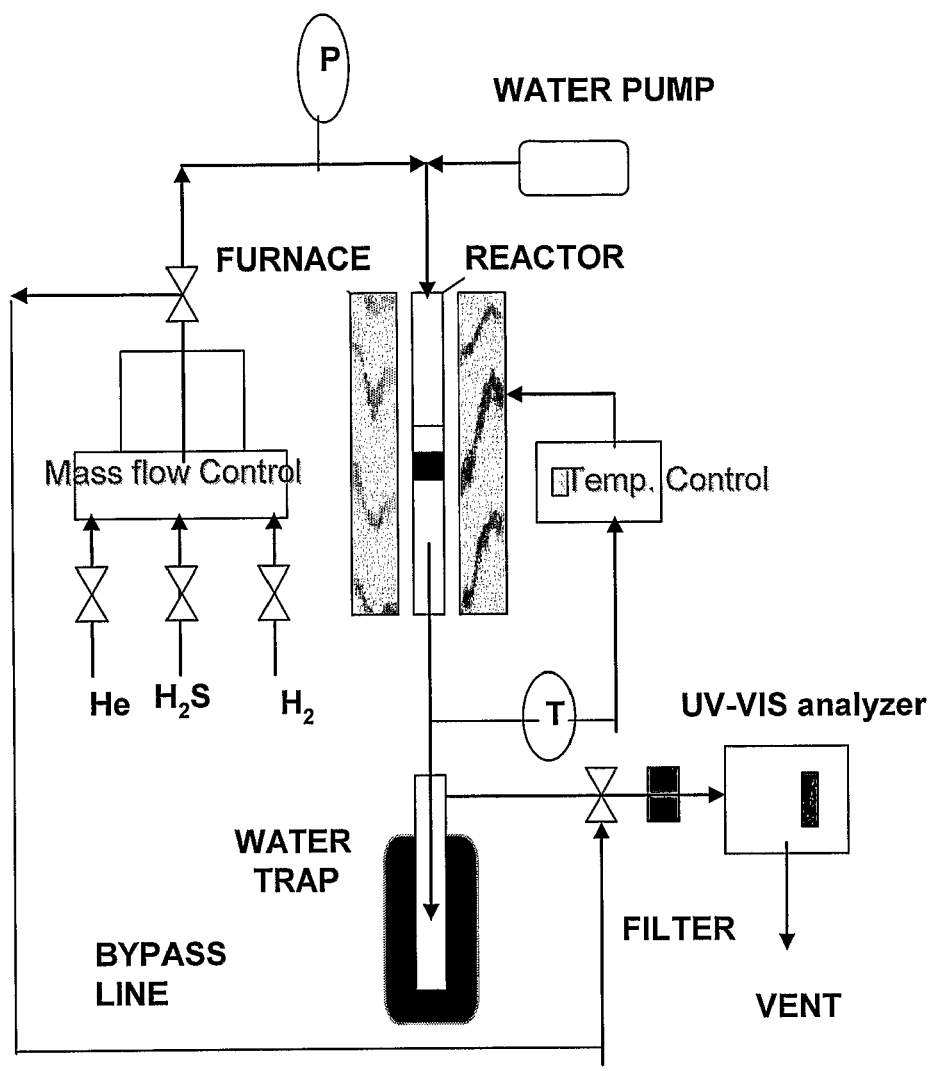
FIG. 17 depicts a schematic drawing of a sulfidation reactor system.
Figure 18:
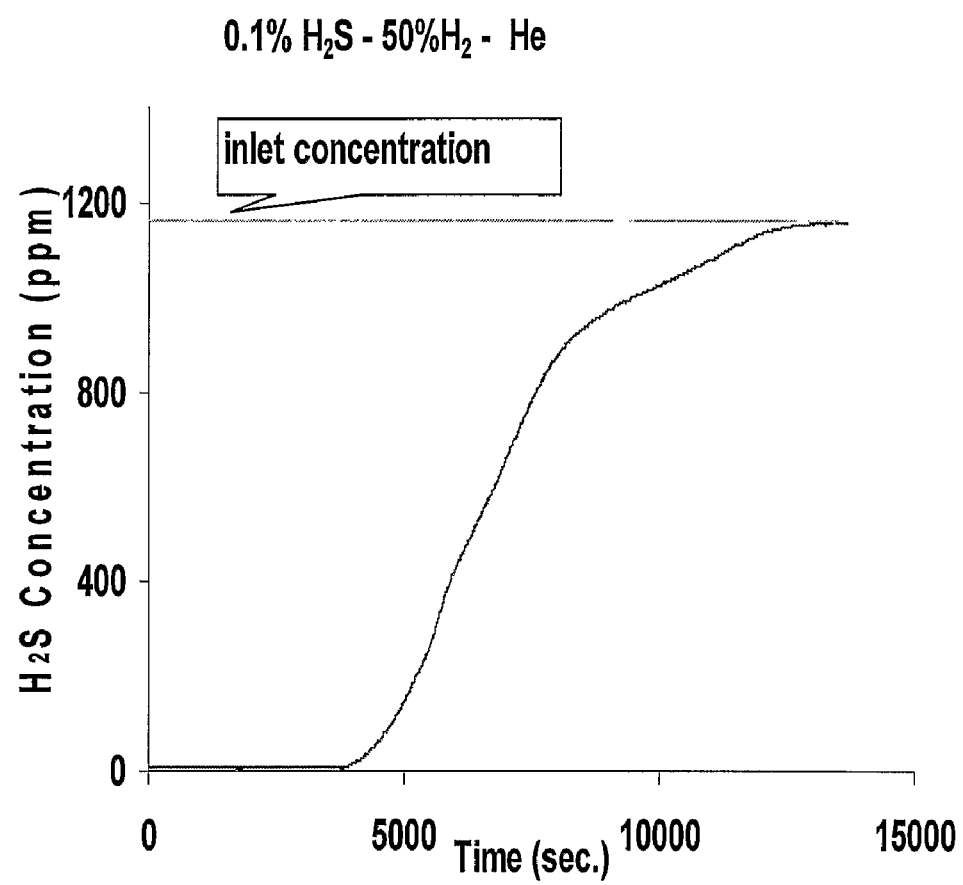
FIG. 18 depicts a sulfidation breakthrough profile.

For convenience, before further description of the present invention, certain terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

The articles "a" and "an" are used herein to refer to one or to more than one (i.e., to at least one) of the grammatical object of the article. By way of example, "an element" means one element or more than one element.

The term "absorb" as used herein refers to taking up or receiving matter. The matter may be, for example, gas molecules. The term "adsorb" as used herein refers to taking up and holding another substance on the surface.

The terms "comprise" and "comprising" are used in the inclusive, open sense, meaning that additional elements may be included.

The term "desorb" as used herein refers to carrying out the process of desorption.

The term "desorption" as used herein refers to a physical or chemical process by which a substance that has been adsorbed or absorbed by a solid material is removed from the solid material.

The term "desulfurize" as used herein refers to the process of removing or reducing sulfur content from a substance. The substance may be, for example, fuel gas.

The term "desulfurization unit" as used herein refers to a unit for removing sulfur or sulfur compounds in fossil fuel processing, coal gasification, fuel reforming for fuel cell systems, and other operations. The desulfurization unit may comprise a desulfurization cartridge and inlet/exit for the fuel gas and regeneration gas streams.

The term "desulfurization cartridge" as used herein refers to a replaceable unit comprising a housing and a sorbent. The desulfurization cartridge may be easily interchanged with a previous desulfurization cartridge for the efficient desulfurization of fuel gas. A dual compartment housed in the desulfurization cartridge serves as a desulfurization/regeneration unit with one compartment serving as absorber, while the second serves as a regenerator, and vice versa; the first becoming a regenerator, while the second is a sorber in cyclic operation of the unit.

The term "including" is used herein to mean "including but not limited to". "Including" and "including but not limited to" are used interchangeably.

The term "reducing gas" as used herein refers to any gas that is capable of reducing the sorbent. For example, if the sorbent is a $CeO_2$ oxide, a reducing gas would be a gas that through contact results in at least some of the $CeO_2$ becoming $CeO_x$ wherein x is less than 2, meaning that in the overall array of the cerium oxide sorbent, Ce now has an oxidation state of less than +4.

The term "sorbent" as used herein refers to any material that absorbs or adsorbs.

The term "space velocity" as used herein refers to the gas hourly space velocity, defined as the ratio of the gas flow rate to the volume of the bed of sorbent, with units of vol/time/vol, or reciprocal time units.

2. Methods of Desulfurizing

A. Non-Regenerative Methods

In part the present invention relates to a method of desulfurizing fuel gas comprising the step of:

passing fuel gas comprising a sulfur compound through a sorbent, at a flow rate, corresponding to a high space velocity, and at a temperature, wherein the sulfur compound is adsorbed substantially on a surface of the sorbent, thereby generating a substantially desulfurized fuel gas.

In certain embodiments, the present invention relates to the aforementioned method and the attendant definitions, wherein said space velocity is from about 16,000 h$^{-1}$ to about 400,000 h$^{-1}$. In certain embodiments, the present invention relates to the aforementioned method and the attendant definitions, wherein said space velocity is from about 80,000 h$^{-1}$ to about 400,000 h$^{-1}$. In certain embodiments, the present invention relates to the aforementioned method and the attendant definitions, wherein space velocity is about 80,000 h$^{-1}$. In certain embodiments, the present invention relates to the aforementioned method and the attendant definitions, wherein said space velocity is about 400,000 h$^{-1}$.

In certain embodiments, the present invention relates to the aforementioned method and the attendant definitions, wherein the sorbent is represented by formula I:

$$n\text{M-CeO}_x \qquad\qquad\qquad \text{I}$$

wherein:

M is a transition or lanthanide metal;

n is the atomic percent relating to the amount of metal M from about 0% to about 80%; and x is a number $1.5 \leq x \leq 2$.

In certain embodiments, the present invention relates to the aforementioned method and the attendant definitions, further comprising the step of reducing the sorbent by passing a reducing gas through the sorbent.

B. Regenerative Methods

In part the present invention relates to a method of desulfurizing fuel gas comprising the step of:

passing fuel gas comprising a sulfur compound through a sorbent, at a first flow rate, corresponding to a high space velocity, and at a first temperature, wherein the sulfur compound is adsorbed substantially on a surface of the sorbent, thereby generating a substantially desulfurized fuel gas; and regenerating the sorbent by passing a regenerating gas stream through the sorbent, at a second flow rate, corresponding to a high space velocity, and at a second temperature, thereby substantially all of the sulfur compound is desorbed from said sorbent surface.

In certain embodiments, the present invention relates to the aforementioned method and the attendant definitions, wherein said first space velocity is from about 16,000 h$^{-1}$ to about 400,000 h$^{-1}$; and said second space velocity is from about 16,000 h$^{-1}$ to about 400,000 h$^{-1}$. In certain embodiments, the present invention relates to the aforementioned method and the attendant definitions, wherein said first space velocity is from about 80,000 h$^{-1}$ to about 400,000 h$^{-1}$; and said second space velocity is from about 80,000 h$^{-1}$ to about 400,000 h$^{-1}$. In certain embodiments, the present invention relates to the aforementioned method and the attendant definitions, wherein first space velocity is about 80,000 h$^{-1}$; and said second space velocity is about 80,000 h$^{-1}$. In certain embodiments, the present invention relates to the aforementioned method and the attendant definitions, wherein said first space velocity is about 400,000 h$^{-1}$; and said second space velocity is about 400,000 h$^{-1}$.

In certain embodiments, the present invention relates to the aforementioned method and the attendant definitions, wherein the sorbent is represented by formula I:

$$n\text{M-CeO}_x \qquad\qquad\qquad \text{I}$$

wherein:

M is a transition or lanthanide metal;

n is the atomic percent relating to the amount of metal M from about 0% to about 80%; and x is a number $1.5 \leq x \leq 2$.

In certain embodiments, the present invention relates to the aforementioned method and the attendant definitions, further comprising the step of reducing the sorbent by passing a reducing gas through the sorbent.

In certain embodiments, the present invention relates to the aforementioned method and the attendant definitions, further comprising the step of passing said substantially desulfurized over an oxidation catalyst.

In certain embodiments, the present invention relates to the aforementioned method and the attendant definitions, wherein the regenerating gas comprises the gas composition exiting the anode of a fuel cell.

In certain embodiments, the present invention relates to the aforementioned method and the attendant definitions, wherein said fuel cell is a solid oxide fuel cell.

In certain embodiments, the present invention relates to the aforementioned method and the attendant definitions, further comprising the step of passing said regenerative gas stream over an oxidation catalyst.

In certain embodiments, the present invention relates to the aforementioned method and the attendant definitions, further comprising the step of directing the gas composition exiting the anode of the fuel cell to a combustor.

In certain embodiments, the present invention relates to the aforementioned method and the attendant definitions, wherein said fuel gas is formed by heating an air and fuel mixture in a reformer, and said combustor generates heat for the reformer.

In certain embodiments, the present invention relates to the aforementioned method and the attendant definitions, further comprising the step of passing the substantially desulfurized fuel gas through a sorbent.

In certain embodiments, the present invention relates to the aforementioned method and the attendant definitions, wherein the sorbent may be fully sulfided, wherein the surface and the bulk (internal) sorbent is sulfided. In these embodiments, the regeneration step regenerates only the surface of the sorbent allowing the desulfurization process to proceed continuously.

2.1 Metal M

Metal M in formula I represents a transition or lanthanide metal. As such M may be a Group 3-12 transition metal. Group 3-12 transition metals include Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. In one embodiment, M is a transition metal from the group of Mn, Fe, Co, Ni, or Cu. In a further embodiment, M is Cu. Metal M may also be a lanthanide metal. Lanthanide metals include La, Ce, Pr, Nd, Pm, Sm, Eu, Gd, Tb, Dy, Ho, Er, Tm, Yb, and Lu. In one embodiment M is La. M may also represent more than one metal or a mixed metal comprised of more than one metal. In such cases, percent n refers to the atomic percent of the combined metals and not to the individual metals making up the mixture. Even though M in formula I represents a transition or lanthanide metal, it is understood that the transition or lanthanide may be in the form of an oxide, and that the percent refers to the amount of metal. For instance, when M is Cu the copper may be in the form of CuO, or when M is Zr the zirconium may be in the form of $ZrO_2$, or when M is La, the lanthanum may be in the form of $La_2O_3$.

2.2 Percent n

Percent n represents the atom percent of metal M in the sorbents of formula I. In one embodiment, n is about 5 atom % to about 75%. In another embodiment, n is about 10%, 15%, 20%, 25%, 30%, 35%, 40%, 45%, 50%, 55%, 60%, 65%, or 70 atom %. In a further embodiment, n is about 10 atom %, or 30 atom %, or about 70 atom %.

2.3 Reducing and Regenerating Gas

The reducing and regenerating gases may be the same or different and can be any gas stream capable of reducing or regenerating the sorbent. In one embodiment, the reducing stream comprises $H_2$ any where from about 1% to about 50% by volume. In other embodiments the amount of $H_2$ in the reducing gas is anywhere from about 5% to about 45%, about 15% to about 40%, about 20% to about 35%, about 25% to about 30% by volume. Other components in the reducing gas stream may include $H_2O$ anywhere from about 0% to about 50%, about 5% to about 15%, or about 10% volume, carbon monoxide anywhere from about 0% to 20% or about 20% by volume, carbon dioxide anywhere from 0 to about 20%, or about 10% by volume and nitrogen as an inert gas. Generally, the amount of $H_2$, CO, $CO_2$, $H_2O$, and $N_2$ in the reducing gas is dictated by the type of fuel processor, fuel and temperature of operation, and the operation of the anode of the solid oxide fuel cell.

In another embodiment the regenerating gas may be the same as the reducing gas described above or it may be different. If different, the regenerating gas may be an inert gas, such as, for example, nitrogen anywhere from about 1% to about 100% volume. Another component of the regenerating gas may include $H_2O$ anywhere from about 0% to about 100% by volume, and $O_2$ anywhere from about 0% to about 2% by volume. The regeneration gas may even be air anywhere from about 1% to about 100%. In these cases, other components may include $H_2O$ anywhere from about 0% to about 80% by volume.

2.4 Flow Rate

The present invention achieves high levels of desulfurization of fuel gases rapidly and without damage to the structural integrity of the sorbent in part because of the rapid rate in which the fuel gas and reducing gas flow through the sorbent. The flow rate for the fuel gas (adsorption resulting in sulfidation of the sorbent) and regeneration gas (desorption resulting in regenerating the sorbent) may be the same or different. In one embodiment the flow rates are about the same and are such that a space velocity of about 80,000 $h^{-1}$ to about a space velocity of about 400,000 $h^{-1}$ is used. At these flow rates substantially only the surface of the sorbent is sulfided or regenerated allowing for rapid cycle times because the sulfur compounds are collected and subsequently removed from the more accessible surface of the sorbent. This process results in what is referred to as the "swing" process where substantially all the sulfur compounds are removed from the fuel gas and adsorbed on the sorbent surface followed by desorption of the sulfur compounds from the sorbent surface during the regeneration step.

One advantage of the methods of the present invention is that the design is flexible in that lower space velocities are possible by changing the regeneration gas composition. The space velocity and regeneration gas effects the clearance of $H_2S$ from the sorbent which in turn effects the efficiency of the system.

2.5 Temperature

Methods of desulfurization fuel gases of the present invention may be run at any temperature that yields the optimum results depending on the sorbent used and components of the fuel gas. In certain embodiments, the present invention features high levels of desulfurization in the range of about 500° C. to about 1000° C. In another embodiment, the desulfurization may occur at about 600° C. to 900° C. In a further embodiment, the desulfurization may occur at about 650° C. or at about 800° C. These temperatures are needed for such high temperature fuel cells such as SOFCs. The sorbents of the present invention maintain their structural integrity and effective desulfurization abilities even after repeated cycles at these high temperatures and at lower temperatures.

In certain embodiments, the present invention features high levels of desulfurization in the range of about 300° C. to about 500° C. In another embodiment, the desulfurization may occur at about 350° C. to 450° C. In a further embodiment, the desulfurization may occur at about 400° C. Regenerable sorbents useful at these lower temperature ranges include ZnO, $La_2O_3$, and $CeO_2$.

3. Sorbents

In part the present invention relates to sorbents of formula II:

$$n\text{M-CeO}_x \qquad \text{II}$$

wherein:

M is a lanthanide metal;

n is an atomic percent relating to the amount of metal M from about 20% to about 80%; and x is a number $1.5 \leq x \leq 2$.

3.1 Metal M

Metal M in formula II represents a lanthanide metal. Lanthanide metals include La, Ce, Pr, Nd, Pm, Sm, Eu, Gd, Tb, Dy, Ho, Er, Tm, Yb, and Lu. In one embodiment M is La. M may also represent more than one metal. In such cases, percent n refers to the atomic percent of the combined metals and not to the individual metals making up the mixture. Even though M in formula II represents a lanthanide metal, it is understood that the lanthanide may be in the form of an oxide, and that the percent refers to the amount of metal. For instance, when M is La, the lanthanum may be in the form of $La_2O_3$.

3.2 Percent n

Percent n represents the atomic percent of metal M in the sorbents of formula II. In one embodiment, n represents about 5% to about 50%. In another embodiment, n represents about 30%, 35% 40%, or 45 atom %. In a further embodiment, n represents about 30 atom %.

4. Results

4.1 Sulfidation/Regeneration Profile

A typical sulfidation/regeneration profile is disclosed in FIG. 1. The left side of the curve represents the amount of $H_2S$ in the product gas during sulfidation of the sorbent. The right side of the curve represents the decreasing amount of $H_2S$ in the product gas during regeneration. The sulfidation breakthrough part of the curve may be divided into three sections: pre-breakthrough, active-breakthrough, and post-breakthrough. The pre-breakthrough portion is the most important section because it identifies the potential $H_2S$ removal capability of the sorbent at the reaction conditions. During the pre-breakthrough portion, most of the $H_2S$ gas reacted with $CeO_x$. At the beginning of the active-breakthrough region, the leading edge of the sulfidation reaction front reached the exit of the sorbent and the product $H_2S$ concentration begins to increase with time. During post-breakthrough, the sorbent approached complete conversion and essentially all the $H_2S$ in the feed gas passed through the sorbent without reaction. The effluent $H_2S$ concentration in this region should match the $H_2S$ concentration in the feed gas.

4.2 Cyclic Sulfidation/Regeneration Performance of Sulfided Sorbents

The goal of the experiments of Example 2 was to examine the performance of three different sorbent compositions at both 650 and 800° C. Ceria doped with 10% Cu or 30% La was selected for these tests. Pure ceria was also included for comparison. Sorbents were prepared according to Example 1. Table 1 below presents the results which are depicted graphically in FIGS. 3-8.

TABLE 1

Cyclic sulfidation/regeneration performance of pre-reduced ceria-based sorbents[1]

| Sorbent Type | Temp (° C.) | Sulfidation Time (sec) | Regeneration Time (sec) | % $H_2S$[2] desorbed from regeneration | Sulfur Capacity at 30 ppm $H_2S$ breakthrough (mg/g sorbent) |
|---|---|---|---|---|---|
| 10% Cu—$CeO_x$ | 650 | 80 | 1400 | 95 | 1.23 |
|  | 800 | 90 | 2000 | 98 | 1.57 |
| 30% La—$CeO_x$ | 650 | 130 | 2400 | 65 | 2.35 |
|  | 800 | 130 | 2700 | 85 | 2.31 |
| $CeO_x$ | 650 | 70 | 1300 | 85 | 1.21 |
|  | 800 | 80 | 1400 | 90 | 1.40 |

Key:
[1] At a space velocity of 80,000 h$^{-1}$ for all steps which corresponds to a flow rate of 200 mL/min and 0.34 g sorbent.
[2] Stabilized value after a few cycles of operation. Operating conditions: (a) pre-reduction: 50% $H_2$, 10% $H_2O$, bal He for 1 h; followed by (b) sulfidation: 0.1% $H_2S$, 50% $H_2$, 10% $H_2O$, bal He to breakthrough of 30 ppm $H_2S$; followed by (c) regeneration: 50% $H_2$, 10% $H_2O$, bal He until exit $H_2S$ was <10 ppm; followed by (d) repeating steps (b) and (c).

As shown in Table 1, with addition of 30% lanthanum, the capacity of the sorbent increases significantly, which is due to the participation of lanthanum oxide in sulfidation. 10% Cu addition leads to a slight increase in capacity compared to the un-doped ceria at the temperature of 800° C. From Table 1, the 10% Cu—$CeO_x$ sorbent shows almost complete "swing" adsorption-desorption capability, with 98% of the adsorbed sulfur in sulfidation desorbing as $H_2S$ in the sulfur-free gas at 800° C.

With 30% La—$CeO_x$ and $CeO_2$, even though the adsorption-desorption capability is inferior to 10% Cu—$CeO_2$ compared at the same number of sulfidation/regeneration cycles, the sorbents are getting more saturated as the number of cycles increases. Therefore, at the point of saturation, it is eventually possible to desorb 100% of the adsorbed sulfur in sulfidation as $H_2S$ during regeneration.

The fact that the only product in regeneration can be $H_2S$, facilitates enormously the downstream processing of the regenerator offgas. Thus, a simple chemical trap can be used to collect all the $H_2S$ desorbed, so that the effluent gas is non-toxic and safe to be emitted in the fuel cell surrounding space. This is a major advantage of the present invention.

As is evident from FIGS. 3-8, the sulfur capacity of the 10% Cu—$CeO_2$ sorbent, 30% La—$CeO_2$ sorbent, and $CeO_2$ sorbent became almost stable after a few cycles of operation at 800° C. and 650° C. at the conditions of Table 1. Stable sorbent sulfur capacity is a key factor in repeated sulfidation/regeneration.

4.3 Space Velocity Effect

In Example 3, the purpose of these tests was to investigate the space velocity effect on regeneration time. The sulfidation/regeneration cycle is basically an adsorption/desorption process. Therefore, by increasing the regeneration gas flow rate, it is possible to decrease the time it takes for sorbent regeneration. Ideally, the times of two half cycles should match, so that in practice two reactors will be used, one being sulfided while the other is being regenerated, and vice versa.

In these tests, the sulfidation space velocity was kept at 80,000 h$^{-1}$. Regeneration was carried out at two space velocities, 80,000 and 400,000 h$^{-1}$. From Table 2, it is clear that by increasing the regeneration space velocity 5 times, the regeneration time is reduced by 5 times, while no sulfidation capacity loss or loss of regenerability is observed. This shows that the regeneration time can be reduced to match the sulfidation time by increasing the gas flow rate in regeneration.

TABLE 2

Effect of space velocity on regeneration time[3]

| Space Velocity (h$^{-1}$) | Regeneration time (s) |
|---|---|
| 80,000 | 1800-2200 |
| 400,000 | 300-500 |

Key:
[3] Sorbent: 10% Cu—$CeO_x$. Regeneration is done at 2 different space velocities, 80,000 h$^{-1}$ and 400,000 h$^{-1}$, corresponding to 200 mL/min and 1,000 mL/min respectively with 0.34 g sorbent. Operating conditions: (a) prereduction: 50% $H_2$, 10% $H_2O$, bal He for 1 h; followed by (b) sulfidation: 0.1% $H_2S$, 50% $H_2$, 10% $H_2O$, bal He to breakthrough of 30 ppm $H_2S$; followed by (c) regeneration: 50% $H_2$, 10% $H_2O$, bal He; followed by (d) repeating steps (b) and (c).

4.4 Parametric Effects on the Regeneration Offgas Composition from 10% Cu—$CeO_x$ The parametric effects on the regeneration offgas composition from 10% Cu—$CeO_x$ were investigated next. The set of experiments from Example 4 was run to test the effects of different regeneration gas composition, temperature, and different sulfidation space velocities on the sorbent regeneration performance; especially on the regeneration offgas composition. A 10% Cu—$CeO_x$ sorbent was used for all tests. The results are present in Tables 3.

TABLE 3

Effect of regeneration gas composition and temperature[4]

| | Regeneration | | | |
|---|---|---|---|---|
| | He | He + 10% $H_2O$ | 50% $H_2$/He | 50% $H_2$/He + 10% $H_2O$ |
| T = 650° C. | 65% $H_2S$ | 86% $H_2S$ (+9% $SO_2$) | 60% $H_2S$ | 95% $H_2S$ |
| T = 800° C. | 82% $H_2S$ | 92% $H_2S$ (+8% $SO_2$) | 82% $H_2S$ | 98% $H_2S$ |

Key:
[4]at a space velocity of 80,000 h$^{-1}$ for all steps which corresponds to 200 mL/min and 0.34 g sorbent; when the sulfur balance is less than 100%, i.e., when the amount of sulfur species desorbed is less than the uptake of $H_2S$ during the sulfidation cycle, the residual sulfur is retained in the sorbent. Operating conditions: (a) prereduction: 50% $H_2$, 10% $H_2O$, bal He for 1 h; followed by (b) sulfidation: 0.1% $H_2S$, 50% $H_2$, 10% $H_2O$, bal He to breakthrough of 30 ppm $H_2S$; followed by (c) regeneration: 50% $H_2$, 10% $H_2O$, bal He; followed by (d) repeating steps (b) and (c).

As shown in Table 3, for all types of regeneration gas mixtures, a larger fraction of the $H_2S$ adsorbed in sulfidation was desorbed as $H_2S$ during regeneration at 800° C. than at 650° C. The reason for this is the configuration of the packed bed. Thus, at lower temperature the eluted $H_2S$ from the front end of the bed is re-adsorbed by the partially sulfided sorbent in the downstream part of the bed. At higher temperature this effect is minimized, because adsorption is suppressed. Thus, with a different bed configuration, e.g., wall-coated open channels as in a honeycomb monolith or other such designs, re-adsorption can be controlled. As a result, we estimate that the temperature of operation will have a minor effect on the regeneration offgas composition.

Four different gas types were selected to check their effects on the regeneration offgas composition. As shown in the first column of Table 3, He, an inert gas, was first used as regeneration gas. The amount of $H_2S$ desorbed in helium was typically less than in gases containing water vapor. This is because of $H_2S$ re-adsorption, according to the mechanism explained above; it is a result of the packed bed configuration, and may be avoided by a different design of the fixed bed of sorbent. As shown in Table 3, similar amount of $H_2S$ desorbed when a 50% $H_2$—He gas was used instead of pure He in the regeneration step. This is important as it proves that the species adsorbed on the surface during sulfidation is $H_2S$, and not elemental sulfur. If it were elemental sulfur, this would be scavenged by $H_2$ but not He as $H_2S$ during the desorption (regeneration) step. Therefore, these results indicate that no elemental sulfur was formed during sulfidation. Re-adsorption of $H_2S$ during regeneration in a packed bed can be suppressed in the presence of $H_2O$. Thus, addition of $H_2O$ keeps the cerium oxide sorbent in a more oxidized state, which has a lower affinity to hydrogen sulfide. Therefore, including $H_2O$ during regeneration will prevent some or all of $H_2S$ re-adsorption onto the sorbent. The data of Table 3 shown in the last two columns corroborate the above statement at both temperatures. However, $SO_2$, an undesirable gas byproduct, is also produced in 10% $H_2O$—He. As a solution, 50% $H_2$ is also included during regeneration to prevent the production of $SO_2$. As shown in the last column of Table 3, it is clear that the partially sulfided sorbents can be fully regenerated with 98% of the sulfur loaded desorbed as $H_2S$ using a 50% $H_2$-10% $H_2O$—He gas mixture.

In practice, one may have to use air diluted with steam to regenerate the sorbent. Also, in applications involving SOFCs, a side stream of the anode offgas can be used to regenerate the sorbent. This stream will contain a much lower amount of hydrogen and carbon monoxide than the fuel gas, but its composition will be suitable for using in sorbent regeneration. The offgas composition and re-adsorption will be controlled by proper choice of the conditions, as well as by proper design of the sorbent layer, as stated above; e.g., as thin coatings on ceramic walls, supported on high surface area washcoates, and the like, to prevent participation of the bulk sorbent material in reaction/re-adsorption of desorbed $H_2S$.

4.5 Sulfidation Space Velocity Effect

As shown in Table 4, it is clear that the amount of $H_2S$ desorbed in regeneration is higher when a space velocity of 80,000 h$^{-1}$ rather than 16,000 h$^{-1}$ was used during the sulfidation step. At low space velocities, more of the bulk sorbent participates in sulfidation. Then, regeneration cannot be fully complete at the chosen conditions of regeneration; and the offgas composition is greatly affected by further reactions. To realize the process of "swing" adsorption/desorption, high space velocities are preferred. Again, the limitation is more severe for a packed bed of small sorbent particles, but less so for other configurations, including but not limited to bigger pellets, coated pellets or channel reactors, and the like. Further, the limitation of space velocity or packed-bed configuration can be relaxed if fully sulfided sorbents are used. The design of a dual bed is important for swing operation. In some embodiments, more than two beds may be required.

TABLE 4

Effect of sulfidation space velocity[5]

| | Regeneration | | | |
|---|---|---|---|---|
| T = 800° C. | He | He + 10% $H_2O$ | 50% $H_2$/He | 50% $H_2$/He + 10% $H_2O$ |
| S.V. = 16,000 h$^{-1}$ | 30% $H_2S$ | 35% $H_2S$ (+3% $SO_2$) | 35% $H_2S$ | 75% $H_2S$ |
| S.V. = 80,000 h$^{-1}$ | 82% $H_2S$ | 92% $H_2S$ (+8% $SO_2$) | 82% $H_2S$ | 98% $H_2S$ |

Key:
[5]Regeneration is at a space velocity of 80,000 h$^{-1}$ which corresponds to 200 mL/min and 0.34 g sorbent; when sulfur balance is less than 100%, i.e., when the amount of sulfur species desorbed is less than the uptake of $H_2S$ during the sulfidation cycle, the residual sulfur is retained in the sorbent.

4.6 Fully Sulfided Sorbents

A fully sulfided (bulk+ surface) material can also be used in the adsorption/desorption cyclic process disclosed herein. By proper choice of a high regeneration space velocity, we can simply regenerate the sorbent surface alone, while keeping the bulk sorbent in sulfided form; and continue to work in this cyclic mode indefinitely.

Fully sulfided sorbents prepared by sulfidation gas streams lacking $H_2O$ resulted in faster regeneration times as investigated in Examples 6 and 7 and shown in Tables 5 and 6.

TABLE 5

Cyclic regeneration performance of fully sulfided sorbents

| Sorbent Type | Temp (° C.) | Sulfidation Time (sec) | Regeneration Time (sec) | % $H_2S$ desorbed from regeneration | Sulfur capacity at 30 ppm $H_2S$ breakthrough (mg S/g sorbent) |
|---|---|---|---|---|---|
| 30% La—CeO$_x$ (fully sulfided) | 800 | 80 | 1000 | 70 | 1.37 |
| 30% La—CeO$_x$ | 800 | 130 | 2700 | 85 | 2.31 |

TABLE 6

Cyclic oxidative regeneration performance of sulfided sorbents at 800° C.

| Sorbent Type | Regeneration gas | Regeneration space value ($h^{-1}$) | Regeneration time (sec) | % $SO_2$ desorbed from regeneration | % $H_2S$ desorbed from regeneration | Sulfur capacity at 30 ppm $H_2S$ breakthrough |
|---|---|---|---|---|---|---|
| 10% Cu—$CeO_x$ | 3% $O_2$/He + 10% $H_2O$ | 400,000 | 350 | 55 | 45 | 1.4 |
| 10% Cu—$CeO_x$ (fully sulfided) | 3% $O_2$/He + 10% $H_2O$ | 400,000 | 350 | 55 | 45 | 1.4 |
| 10% Cu—$CeO_x$ | air + 10% $H_2O$ | 80,000 | 1000 | 40 | 20 | 1.3 |
| 10% Cu—$CeO_x$ | air + 10% $H_2O$ | 400,000 | 500 | 45 | 55 | 1.7 |

4.7 Other Sorbent Compositions

The "swing" adsorption-desorption method is also applied to $La_2O_3$, a non-$CeO_2$-based sorbent (Table 7). After 9 cycles of operation, the sulfidation capacity started to stabilize and the % $H_2S$ desorbed increased slowly as the sorbent became more saturated. Therefore, at the point of saturation, the sorbent is expected to perform similarly to $CeO_2$-based sorbents and be able to desorb 100% of the adsorbed sulfur in sulfidation as $H_2S$ during the subsequent step of regeneration.

The "swing" adsorption-desorption method disclosed here can be applied to all $CeO_2$-based sorbents; lanthanum oxide, other rare earth oxides, and potentially other oxides, especially those from the first row transition metals of the Periodic Table.

TABLE 7

"Swing" adsorption-desorption method applied to $La_2O_3$

| Sorbent type | Temp (° C.) | Sulfidation time[6] (sec) | Sulfur loading at 30 ppm $H_2S$ breakthrough (mg S/g sorbent) | Regeneration time | % of sulfur loaded desorbed as $H_2S$ after 9 cycles |
|---|---|---|---|---|---|
| $La_2O_3$ | 800 | 110 | 4.7 | 200 | 50 |

Key:
[6]Sulfidation was rn at a space velocity of 80,000 $h^{-1}$, while regeneration was run at 400,000 $h^{-1}$.

From these results, it is concluded that reduced cerium oxide sorbents have good sulfidation efficiency and kinetics at about 650-800° C. Copper addition improves the kinetics, while lanthanum oxide addition improves the sulfur capacity of the sorbent. Regeneration schemes examined for these sorbents have identified the possibility of fully regenerating the sorbent surface by purging the adsorbed $H_2S$. A simple swing $H_2S$ adsorption-desorption process can be designed for SOFC applications.

5. Variations in the Treatment of the Regeneration Offgas 5.1 Variation One

Figure 37:
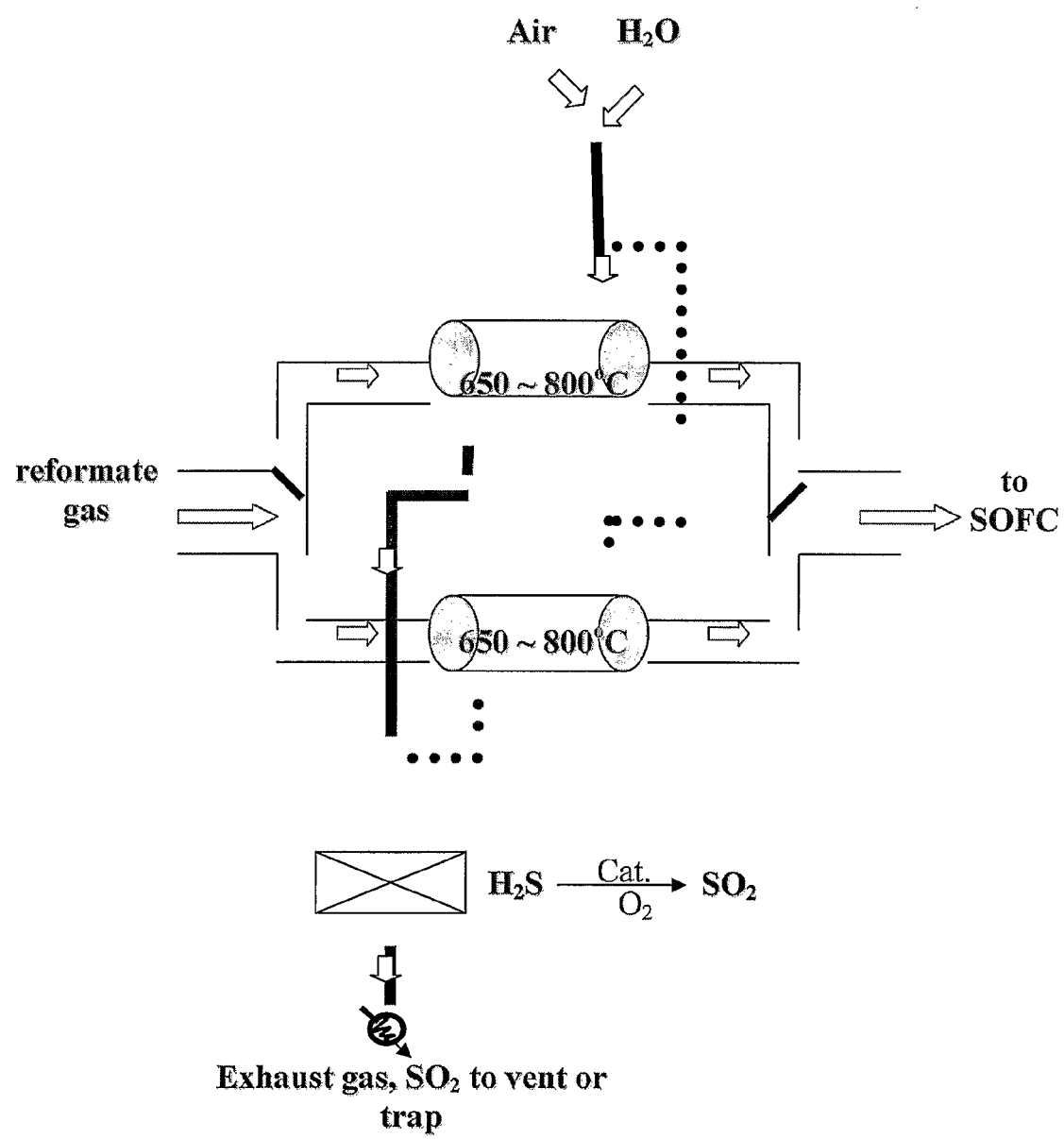
FIG. 37 depicts a schematic flowsheet of a design for the treatment of regeneration offgas.

When using air as is or air diluted with steam as a sweep gas to remove the $H_2S$ from the saturated sorbent, the offgas might contain small amounts of $SO_2$. Because of the presence of oxygen in the offgas, a preferred way of treating it is to pass it over an oxidation catalyst, which will oxidize the $H_2S$ to $SO_2$. The dilute sulfur dioxide produced can be vented (depending on the application and scale) or it can be fixed in a trap; the later will have to be periodically replaced during operation of the fuel cell. See FIG. 37.

5.2 Variation Two

Figure 38:
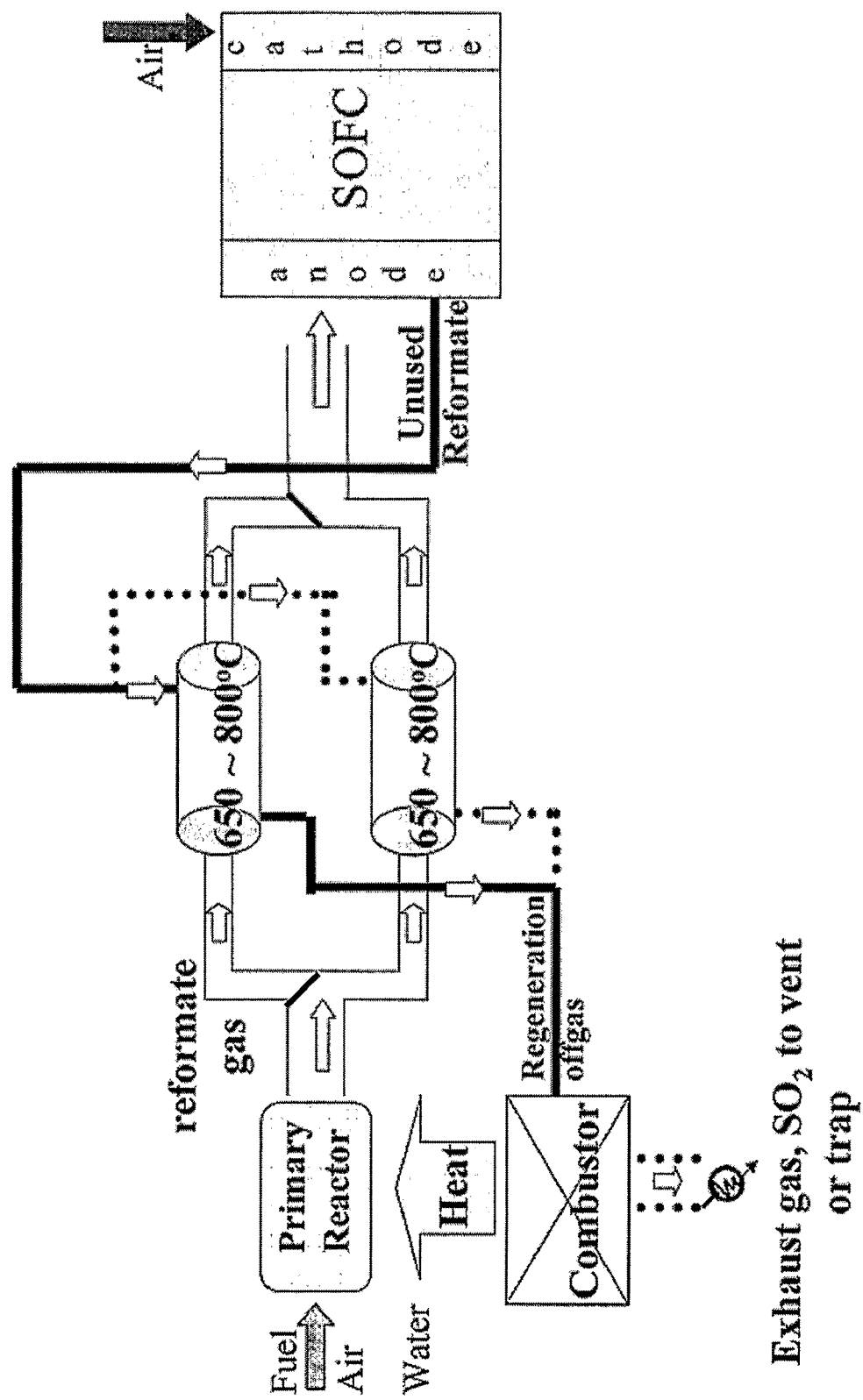
FIG. 38 depicts a schematic flowsheet of a design for the treatment of regeneration offgas.

Perhaps the simplest of all approaches, and the one requiring the lowest cost and energy, is shown in FIG. 38. Here the fuel cell anode offgas, which comprises unconverted reformate gas, and is rich in steam, is passed over the saturated sorbent as sweep gas carrying away $H_2S$. This stream is then directed to the combustor, which generates heat for the primary fuel reformer. In the combustor, which is part of the fuel cell system in all designs and scales, unconverted hydrogen and carbon monoxide are burned to produce heat that is then used to reform the primary fuel. The exhaust of the combustor, containing only inert gases ($H_2O$, $CO_2$, and $N_2$) is vented into the atmosphere. Now, in this approach, the $H_2S$ carried to the combustor will be oxidized to $SO_2$, which then can be similarly vented to the atmosphere, depending on concentration and fuel cell application. Alternatively, the $SO_2$ can be removed by a trap prior to venting the combustor exhaust gas.

6. Selected Embodiments

One aspect of the present invention relates to a method of desulfurizing fuel gas comprising the steps of:

passing fuel gas comprising a sulfur compound through a sorbent, at a first flow rate, corresponding to a high space velocity, and at a first temperature, wherein the sulfur compound is adsorbed substantially on a surface of the sorbent, thereby generating a substantially desulfurized fuel gas; and regenerating the sorbent by passing a regenerating gas stream through the sorbent, at a second flow rate, corresponding to a high space velocity, and at a second temperature, thereby desorbing substantially all of the sulfur compound from said sorbent surface.

In certain embodiments, the present invention relates to the aforementioned method, wherein said first space velocity is from about 16,000 $h^{-1}$ to about 400,000 $h^{-1}$; and said second space velocity is from about 16,000 $h^{-1}$ to about 400,000 $h^{-1}$.

In certain embodiments, the present invention relates to the aforementioned method, wherein said first space velocity is from about 80,000 $h^{-1}$ to about 400,000 $h^{-1}$; and said second space velocity is from about 80,000 $h^{-1}$ to about 400,000 $h^{-1}$.

In certain embodiments, the present invention relates to the aforementioned method, wherein said first space velocity is about 80,000 $h^{-1}$; and said second space velocity is about 80,000 $h^{-1}$.

In certain embodiments, the present invention relates to the aforementioned method, wherein said first space velocity is about 400,000 h$^{-1}$; and said second space velocity is about 400,000 h$^{-1}$.

In certain embodiments, the present invention relates to the aforementioned method, wherein said first temperature is selected from about 500° C. to about 1,000° C.; and said second temperature is selected from about 500° C. to about 1,000° C.

In certain embodiments, the present invention relates to the aforementioned method, wherein said first temperature is selected from about 600° C. to about 900° C.; and said second temperature is selected from about 600° C. to about 900° C.

In certain embodiments, the present invention relates to the aforementioned method, wherein said first temperature is about 650° C.; and wherein said second temperature is about 650° C.

In certain embodiments, the present invention relates to the aforementioned method, wherein said first temperature is about 800° C.; and wherein said second temperature is about 800° C.

In certain embodiments, the present invention relates to the aforementioned method, wherein said first temperature is selected from about 300° C. to about 500° C.; and said second temperature is selected from about 300° C. to about 500° C.

In certain embodiments, the present invention relates to the aforementioned method, wherein said first temperature is selected from about 350° C. to about 450° C.; and said second temperature is selected from about 350° C. to about 450° C.

In certain embodiments, the present invention relates to the aforementioned method, wherein said first temperature is about 400° C.; and said second temperature is about 400° C.

In certain embodiments, the present invention relates to the aforementioned method, wherein the sorbent is represented by formula I:

$$n\text{M-CeO}_x \qquad \text{I}$$

wherein:

M is a transition or lanthanide metal;

n is atomic percent relating to the amount of metal M from about 0% to about 80%; and x is a number $1.5 \leq x \leq 2$.

In certain embodiments, the present invention relates to the aforementioned method, wherein M is a transition metal.

In certain embodiments, the present invention relates to the aforementioned method, wherein M is a transition metal selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg.

In certain embodiments, the present invention relates to the aforementioned method, wherein M is a first row transition metal.

In certain embodiments, the present invention relates to the aforementioned method, wherein M is Mn, Fe, Co, Ni, or Cu.

In certain embodiments, the present invention relates to the aforementioned method, wherein M is Cu.

In certain embodiments, the present invention relates to the aforementioned method, wherein M is a lanthanide metal.

In certain embodiments, the present invention relates to the aforementioned method, wherein M is selected from the group consisting of La, Ce, Pr, Nd, Pm, Sm, Eu, Gd, Tb, Dy, Ho, Er, Tm, Yb, and Lu.

In certain embodiments, the present invention relates to the aforementioned method, wherein M is La.

In certain embodiments, the present invention relates to the aforementioned method, wherein n is about 5%, 10%, 15%, 20%, 25%, 30%, 35%, 40%, 45%, 50%, 55%, 60%, 65%, 70%, or 75 atom %.

In certain embodiments, the present invention relates to the aforementioned method, wherein n is about 10 atom %.

In certain embodiments, the present invention relates to the aforementioned method, wherein n is about 30 atom %.

In certain embodiments, the present invention relates to the aforementioned method, wherein n is about 70 atom %.

In certain embodiments, the present invention relates to the aforementioned method, wherein x is between about 1 and about 2.

In certain embodiments, the present invention relates to the aforementioned method, wherein M is a transition metal; n is about 10%, 30%, or 70% by weight; and x is between about 1.5 and about 2.

In certain embodiments, the present invention relates to the aforementioned method, wherein M is a lanthanide metal; n is about 10 atom %, 30 atom %, or 70 atom % by weight; and x is between about 1.5 and about 2.

In certain embodiments, the present invention relates to the aforementioned method, wherein M is selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg; n is about 10-50 atom %; and x is between about 1.5 and about 2.

In certain embodiments, the present invention relates to the aforementioned method, wherein M is selected from the group consisting of La, Ce, Pr, Nd, Pm, Sm, Eu, Gd, Tb, Dy, Ho, Er, Tm, Yb, and Lu; n is about 10%, 30%, or 70% by weight; and x is between about 1.5 and about 2.

In certain embodiments, the present invention relates to the aforementioned method, wherein M is Mn, Fe, Co, Ni, or Cu; n is about 5%, 10%, 15%, 20%, 25%, 30%, 35%, 40%, 45%, 50 atom %; and x is between about 1.5 and about 2.

In certain embodiments, the present invention relates to the aforementioned method, wherein M is La; n is about 5%, 10%, 15%, 20%, 25%, 30%, 35%, 40%, 45%, 50%, 55%, 60%, 65%, 70%, or 75 atom %; and x is between about 1.5 and about 2.

In certain embodiments, the present invention relates to the aforementioned method, wherein M is Mn, Fe, Co, Ni, or Cu; n is about 10%-50 atom %; and x is between about 1.5 and about 2.

In certain embodiments, the present invention relates to the aforementioned method, wherein M is La; n is about 10% to about 50 atom %; and x is between about 1.5 and about 2.

In certain embodiments, the present invention relates to the aforementioned method, wherein M is Cu; n is about 10% to about 50 atom %; and x is between about 1.5 and about 2.

In certain embodiments, the present invention relates to the aforementioned method, wherein M is La; n is about 30 atom %; and x is between about 1.5 and about 2.

In certain embodiments, the present invention relates to the aforementioned method, wherein M is La; n is about 70 atom %; and x is between about 1.5 and about 2.

In certain embodiments, the present invention relates to the aforementioned method, wherein M is Cu; n is about 10 atom %; and x is between about 1.5 and about 2.

In certain embodiments, the present invention relates to the aforementioned method, wherein the sorbent comprises a rare earth oxide.

In certain embodiments, the present invention relates to the aforementioned method, wherein the sorbent comprises a lanthanum oxide.

In certain embodiments, the present invention relates to the aforementioned method, wherein the sorbent comprises a cerium oxide.

In certain embodiments, the present invention relates to the aforementioned method, wherein the sorbent comprises $La_2O_3$.

In certain embodiments, the present invention relates to the aforementioned method, wherein the sorbent comprises $CeO_2$.

In certain embodiments, the present invention relates to the aforementioned method, wherein the sorbent is a lanthanum oxide.

In certain embodiments, the present invention relates to the aforementioned method, wherein the sorbent is a cerium oxide.

In certain embodiments, the present invention relates to the aforementioned method, wherein the sorbent is $La_2O_3$.

In certain embodiments, the present invention relates to the aforementioned method, wherein the sorbent is $CeO_2$.

In certain embodiments, the present invention relates to the aforementioned method, wherein the sorbent comprises a transition metal oxide.

In certain embodiments, the present invention relates to the aforementioned method, wherein the sorbent comprises a first row transition metal oxide.

In certain embodiments, the present invention relates to the aforementioned method, wherein the sorbent comprises a manganese oxide, an iron oxide, a cobalt oxide, a nickel oxide, a copper oxide or a zinc oxide.

In certain embodiments, the present invention relates to the aforementioned method, wherein the sorbent comprises ZnO.

In certain embodiments, the present invention relates to the aforementioned method, wherein the sorbent is a manganese oxide, an iron oxide, a cobalt oxide, a nickel oxide, a copper oxide or a zinc oxide.

In certain embodiments, the present invention relates to the aforementioned method, wherein the sorbent is ZnO.

In certain embodiments, the present invention relates to the aforementioned method, wherein the sorbent is a rare earth oxide or a transition metal oxide; said first temperature is selected from about 300° C. to about 500° C.; and said second temperature is selected from about 300° C. to about 500° C.

In certain embodiments, the present invention relates to the aforementioned method, wherein the sorbent is a lanthanum oxide, a cerium oxide, a manganese oxide, an iron oxide, a cobalt oxide, a nickel oxide, a copper oxide or a zinc oxide; said first temperature is selected from about 350° C. to about 450° C.; and said second temperature is selected from about 350° C. to about 450° C.

In certain embodiments, the present invention relates to the aforementioned method, wherein the sorbent is $La_2O_3$; said first temperature is about 400° C.; and said second temperature is about 400° C.

In certain embodiments, the present invention relates to the aforementioned method, wherein the sorbent is $CeO_2$; said first temperature is about 400° C.; and said second temperature is about 400° C.

In certain embodiments, the present invention relates to the aforementioned method, wherein the sorbent is ZnO; said first temperature is about 400° C.; and said second temperature is about 400° C.

In certain embodiments, the present invention relates to the aforementioned method, wherein the sulfur compound is $H_2S$.

In certain embodiments, the present invention relates to the aforementioned method, wherein the sorbent is fully sulfided, wherein the surface and bulk sorbent is sulfided.

In certain embodiments, the present invention relates to the aforementioned method, further comprising the step of passing said substantially desulfurized fuel gas over an oxidation catalyst.

In certain embodiments, the present invention relates to the aforementioned method, further comprising the step of passing the substantially desulfurized fuel gas through a sorbent.

In certain embodiments, the present invention relates to the aforementioned method, further comprising the step of reducing the sorbent by passing a reducing gas through the sorbent.

In certain embodiments, the present invention relates to the aforementioned method, wherein the reducing gas comprises about 50% by volume $H_2$ and CO, and about 0% to about 20% by volume $H_2O$.

In certain embodiments, the present invention relates to the aforementioned method, wherein the reducing gas comprises about 50% by volume $H_2$ and CO, about 10 to about 20% by volume $H_2O$, and about 5 to about 20% by volume $CO_2$, and the balance is nitrogen gas.

In certain embodiments, the present invention relates to the aforementioned method, wherein the reducing gas is the same as the regenerating gas.

In certain embodiments, the present invention relates to the aforementioned method, wherein the reducing gas is different than the regenerating gas.

In certain embodiments, the present invention relates to the aforementioned method, wherein the regenerating gas comprises about 50% by volume $H_2$ and CO, about 10 to about 20% by volume $H_2O$, about 5 to about 20% $CO_2$, and the balance is nitrogen gas.

In certain embodiments, the present invention relates to the aforementioned method, wherein the regenerating gas comprises the gas composition exiting the anode of a fuel cell.

In certain embodiments, the present invention relates to the aforementioned method, wherein said fuel cell is a solid oxide fuel cell.

In certain embodiments, the present invention relates to the aforementioned method, further comprising the step of passing said regenerative gas stream over an oxidation catalyst.

In certain embodiments, the present invention relates to the aforementioned method, further comprising the step of directing the gas composition exiting the anode of the fuel cell to a combustor.

In certain embodiments, the present invention relates to the aforementioned method, wherein said fuel gas is formed by heating an air and fuel mixture in a reformer, and said combustor generates heat for the reformer.

Another aspect of the present invention relates to a sorbent of formula II:

$$n\text{M-CeO}_x \qquad\qquad \text{II}$$

wherein:

M is a lanthanide metal;

n is atomic percent relating to the amount of metal M from about 20% to about 80%; and x is a number $1.5 \leq x \leq 2$.

In certain embodiments, the present invention relates to the aforementioned sorbent, wherein M is La.

In certain embodiments, the present invention relates to the aforementioned sorbent, wherein n is about 10 to about 70 atom %.

In certain embodiments, the present invention relates to the aforementioned sorbent, wherein n is about 30 atom %.

In certain embodiments, the present invention relates to the aforementioned sorbent, wherein n is about 70 atom %.

In certain embodiments, the present invention relates to the aforementioned sorbent, wherein x is between about 1.5 and about 2.

In certain embodiments, the present invention relates to the aforementioned sorbent, wherein M is La, n is about 30 atom %, and x is between about 1.5 and about 2.

In certain embodiments, the present invention relates to the aforementioned sorbent, wherein M is La, n is about 70 atom %, and x is between about 1.5 and about 2.

Another aspect of the present invention relates to a desulfurization cartridge comprising a housing unit and a sorbent of formula I:

$$nM\text{-}CeO_x \qquad\qquad I$$

wherein:

M is a transition or lanthanide metal;

n is atomic percent relating to the amount of metal M from about 0% to about 80%; and x is a number $1.5 \leq x \leq 2$.

Another aspect of the present invention relates to a desulfurization cartridge comprising a housing unit and a sorbent selected from the group consisting of rare earth oxides and a transition metal oxides.

In certain embodiments, the present invention relates to the aforementioned desulfurization cartridge, wherein the sorbent is selected from the group consisting of lanthanum oxides, cerium oxides, manganese oxides, iron oxides, cobalt oxides, nickel oxides, copper oxides and zinc oxides.

In certain embodiments, the present invention relates to the aforementioned desulfurization cartridge, wherein the sorbent is $La_2O_3$.

In certain embodiments, the present invention relates to the aforementioned desulfurization cartridge, wherein the sorbent is $CeO_2$.

In certain embodiments, the present invention relates to the aforementioned desulfurization cartridge, wherein the sorbent is ZnO.

Another aspect of the present invention relates to a desulfurization unit comprising any one of the aforementioned desulfurization cartridges; a fuel gas inlet/outlet; and regeneration gas inlet/outlet.

Figure 19:
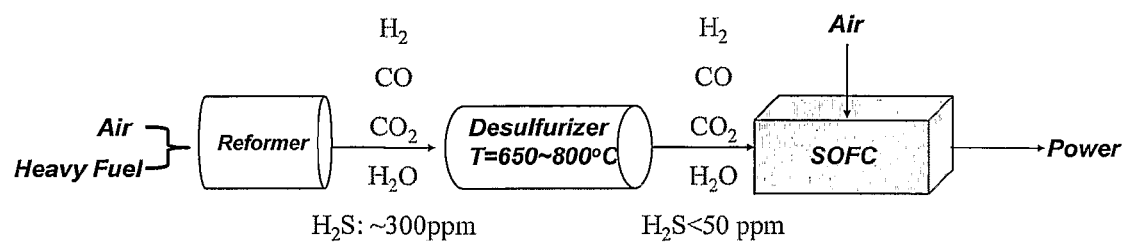
FIG. 19 depicts the process for fuel reforming and desulfurization.
Figure 20:
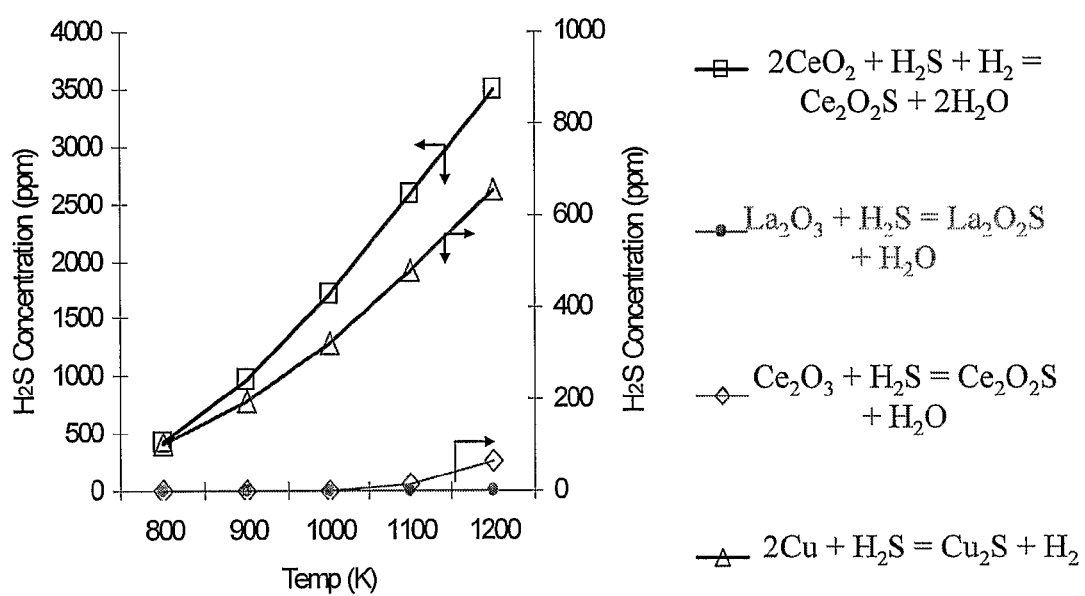
FIG. 20 depicts sorbent sulfidation equilibria for various sorbents and 50% $H_2$-10% $H_2O$—He sulfidation gas.
Figure 21:
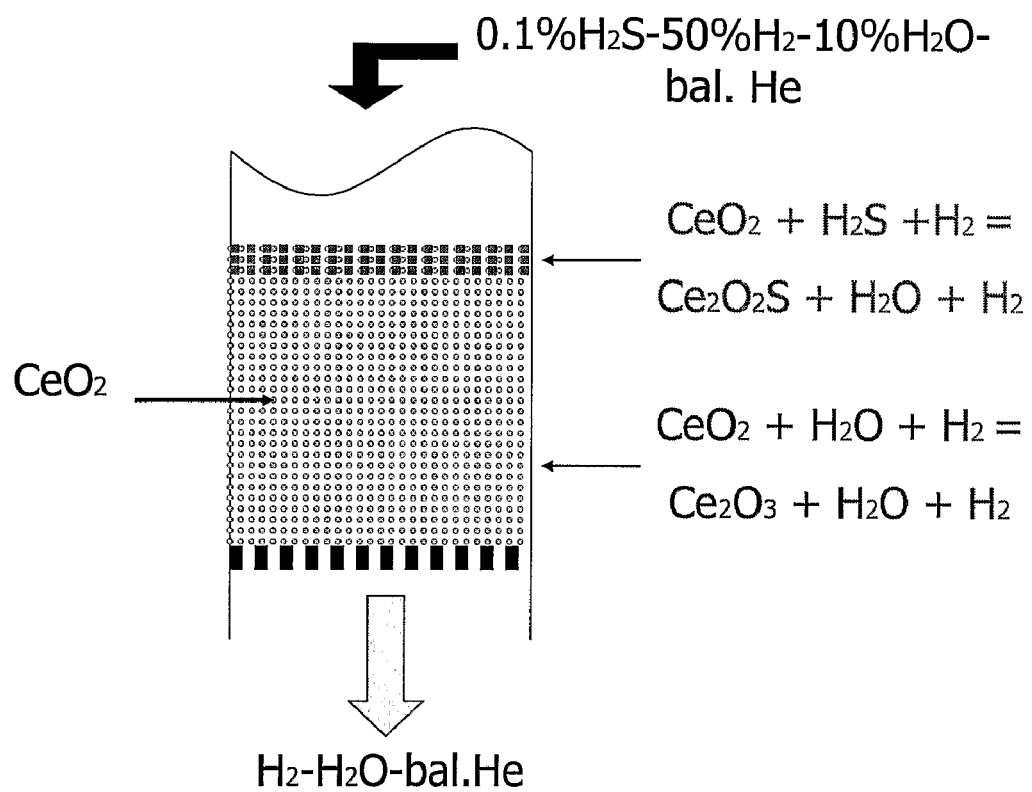
FIG. 21 depicts sulfidation of the sorbent surface. In a packed bed reactor, most of the sorbent bed is initially exposed to sulfur-free gas.
Figure 22:
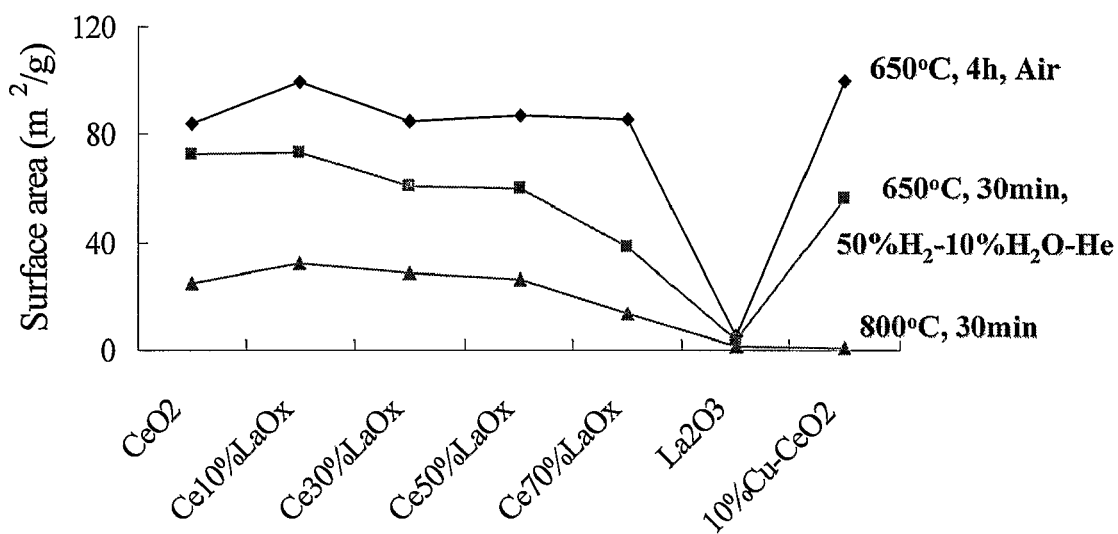
FIG. 22 depicts the effect of pre-reduction on sorbent surface area for various sorbents.
Figure 23:
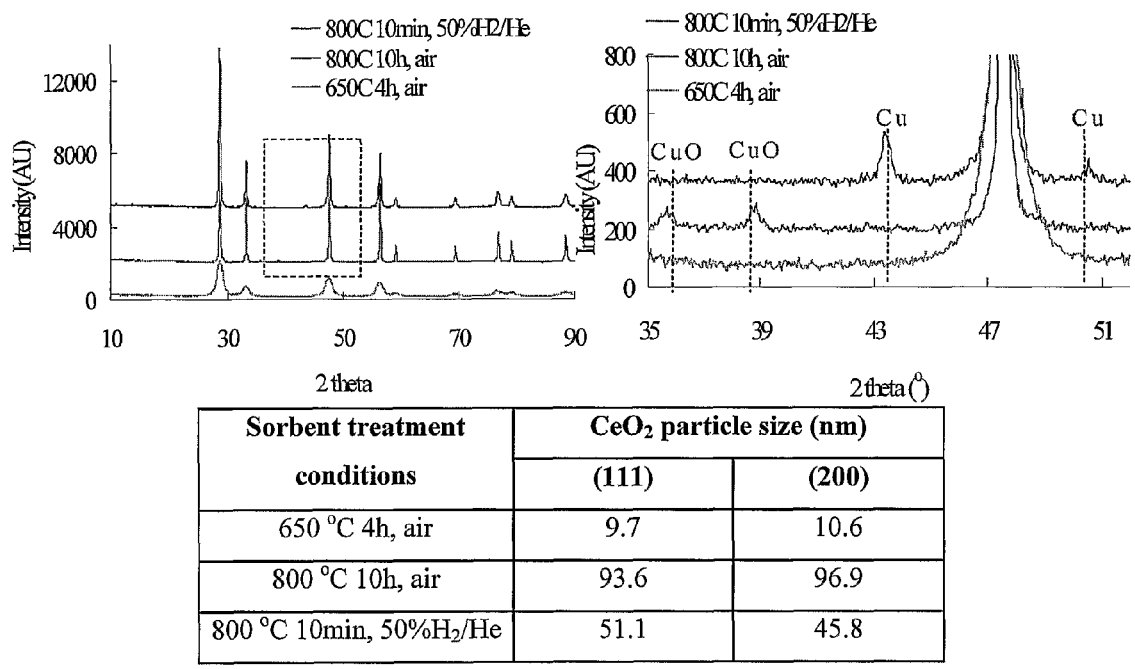
FIG. 23 depicts the XRD analysis of fresh and pretreated 10% Cu—$CeO_x$.
Figure 24:
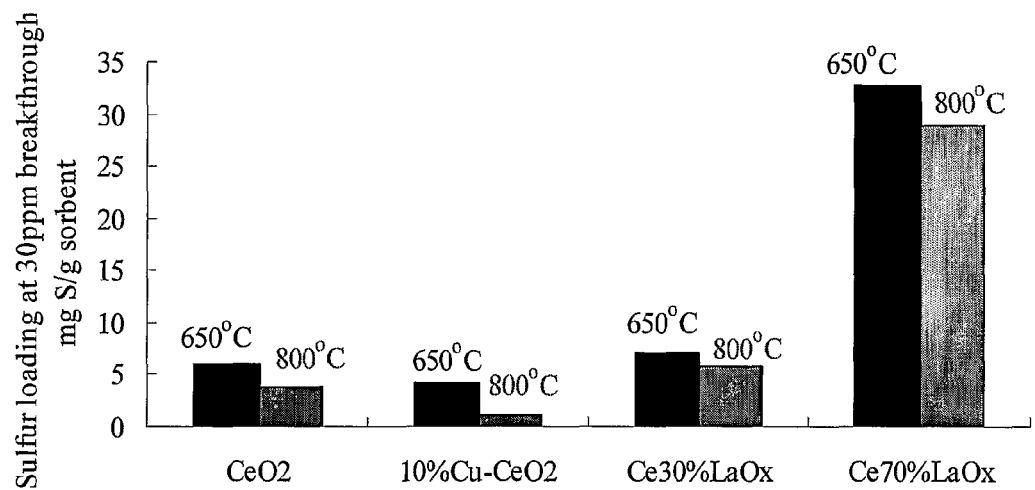
FIG. 24 depicts the amounts of sulfur loading on pre-reduced sorbents. Pre-reduction: 50% $H_2$-10% $H_2O$—He, at 650/800° C., 1 h, S.V.=16,000 $h^{-1}$. Sulfidation: 0.1% $H_2S$-50% $H_2$-10%/$H_2O$—He, at 650/800° C., S.V.=16,000 $h^{-1}$.
Figure 25:
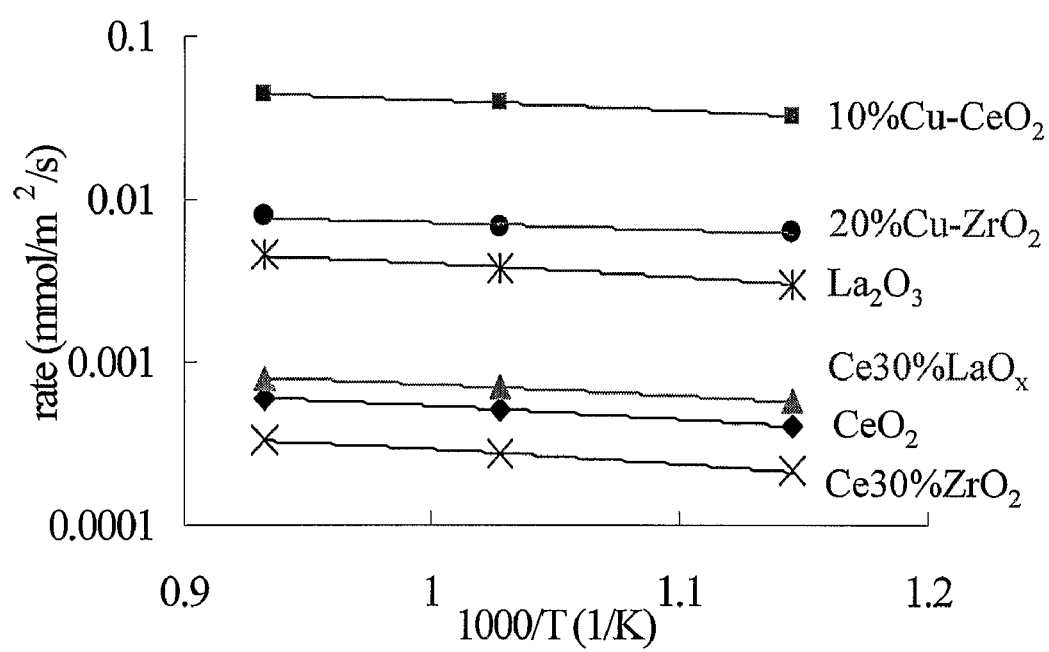
FIG. 25 depicts the initial sulfidation rates or pre-reduced sorbents. Reduction: 50% $H_2$—He, at 800° C. for 10 min. Sulfidation: 1,000 ppm $H_2S$-50% $H_2$-3% $H_2O$—He. Apparent activation energy, $E_a$: 10% Cu—$CeO_x$: 13 Kj/mol; 30% La—$CeO_x$: 16 Kj/mol; $CeO_x$: 17 Kj/mol.
Figure 26:
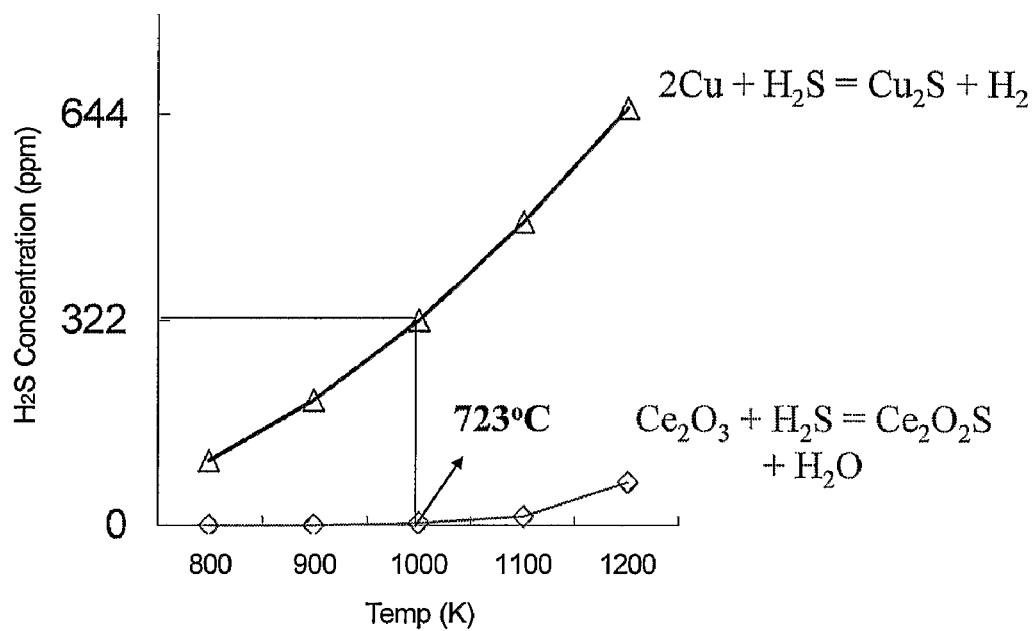
FIG. 26 depicts the sulfidation threshold for copper in a gas mixture of 50% $H_2$-10% $H_2O$—He. This data allows the selection of conditions at which Cu will not be sulfided: Sulfidation at 300 ppm $H_2S$-50% $H_2$-10% $H_2O$—He; Temperature 750 and 850° C.
Figure 27:
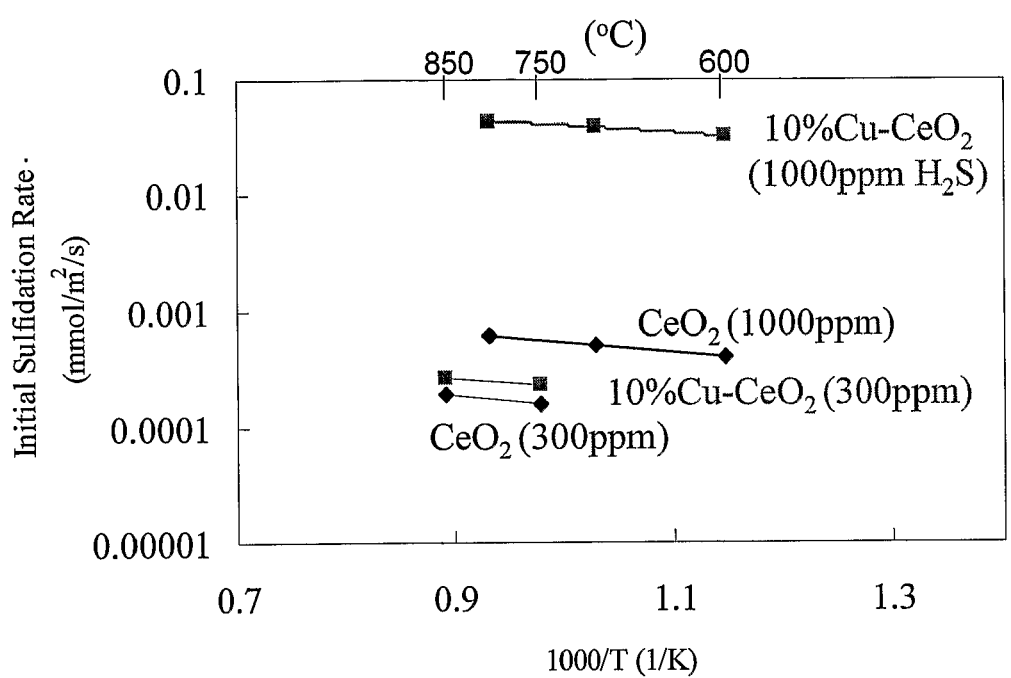
FIG. 27 depicts the sulfidation kinetics of pre-reduced Cu—$CeO_x$ sorbents and $CeO_x$ sorbents at 300 and 1000 ppm $H_2S$ in the feed gas. Copper has faster sulfidation kinetics than reduced cerium oxide.
Figure 28:
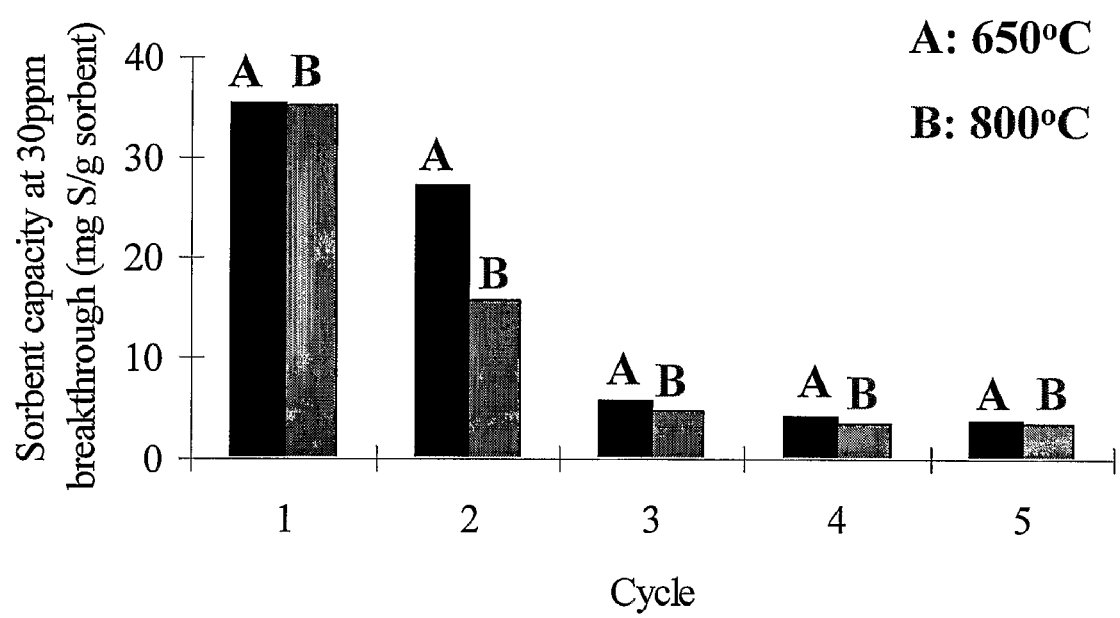
FIG. 28 depicts the cyclic sulfur capacity at 30 ppm $H_2S$ breakthrough for sorbent 70% La—$CeO_x$ at 650 and 800° C. Pre-reduction: 50% $H_2$-10% $H_2O$—He; Sulfidation: 0.1% $H_2S$-50% $H_2$-10% $H_2O$—He, S.V.=16,000 $h^{-1}$; Regeneration: 3% $O_2$—He, S.V.=80,000 $h^{-1}$.
Figure 29:
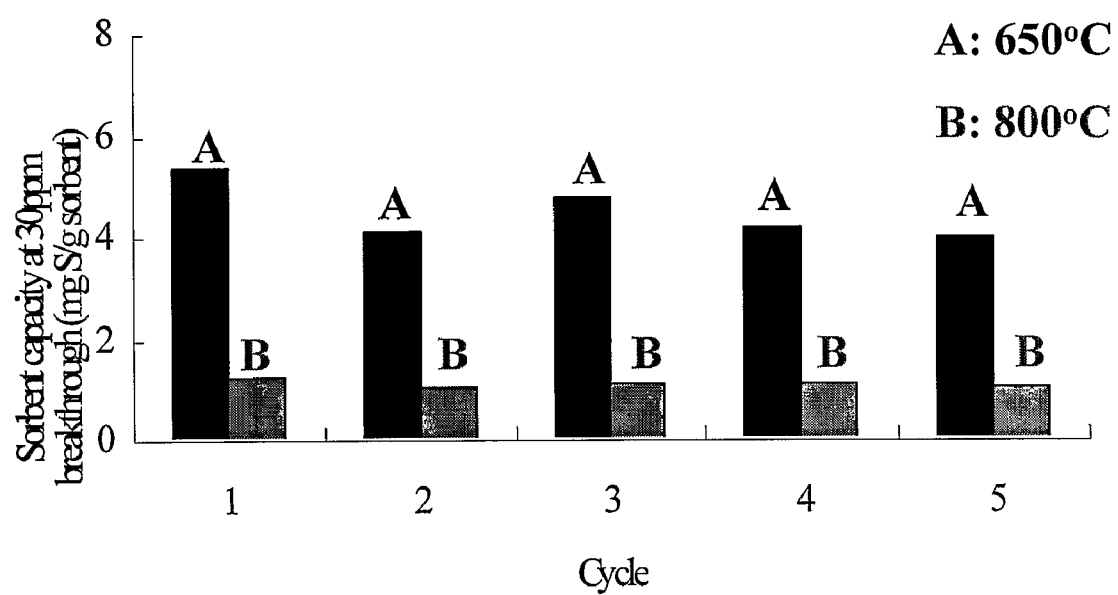
FIG. 29 depicts the cyclic sulfur capacity at 30 ppm $H_2S$ breakthrough for sorbent 10% Cu—$CeO_2$ at 650 and 800° C. Pre-reduction: 50% $H_2$-10% $H_2O$—He; Sulfidation: 0.1% $H_2S$-50% $H_2$-10% $H_2O$—He, S.V.=16,000 $h^{-1}$; Regeneration: 3% $O_2$—He, S.V.=80,000 $h^{-1}$.
Figure 30:
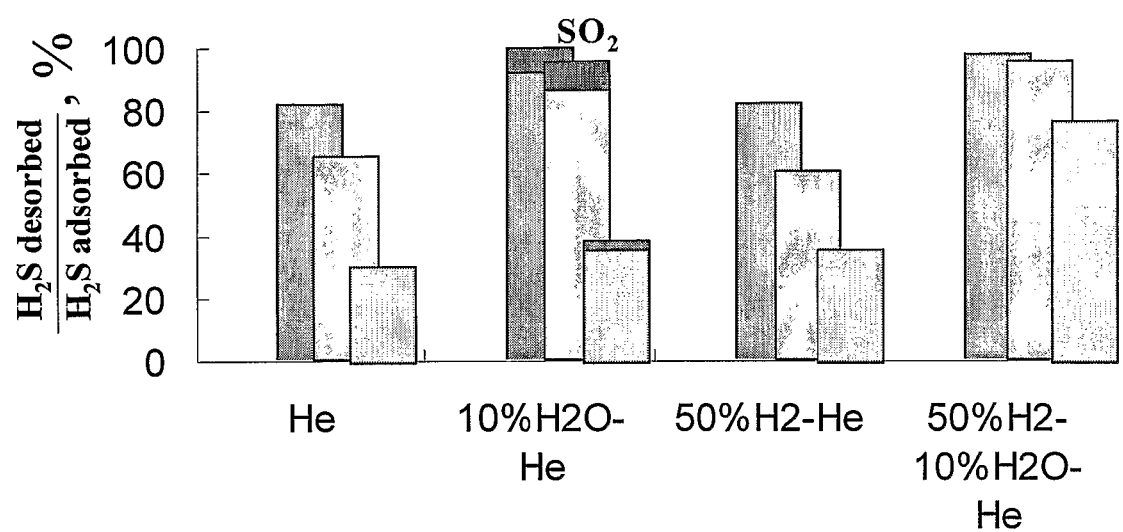
FIG. 30 depicts the results from sampling the regeneration offgas for $H_2S$ adsorbed on a 10% $Cu$—$CeO_x$ sorbent surface. There were 3 tests conducted: Test 1-800° C., sulfidation S.V.=80,000 $h^{-1}$, regeneration S.V.=80,000 $h^{-1}$; Test 2-650° C., sulfidation S.V.=80,000 $h^{-1}$, regeneration S.V.=80,000 $h^{-1}$; Test 3-800° C., sulfidation S.V.=16,000 $h^{-1}$, regeneration S.V.=80,000 $h^{-1}$.
Figure 31:
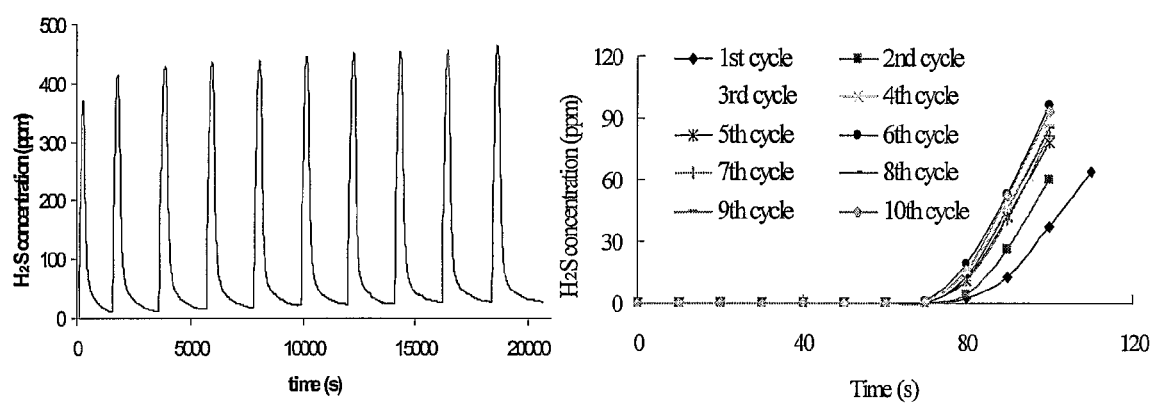
FIG. 31 depicts the cyclic sulfidation/regeneration performance of 10% $Cu$—$CeO_2$ at 800° C. Left is cyclic sulfidation/regeneration $H_2S$ profile, and Right is cyclic sulfidation capacity at 30 ppm breakthrough. Pre-reduction: 50% $H_2$-10% $H_2O$—He, 800° C.; Sulfidation: 0.1% $H_2S$-50% $H_2$-10% $H_2O$—He, S.V.=80,000 $h^{-1}$; Regeneration: 50% $H_2$-10% $H_2O$—He, S.V.=80,000 $h^{-1}$.
Figure 32:
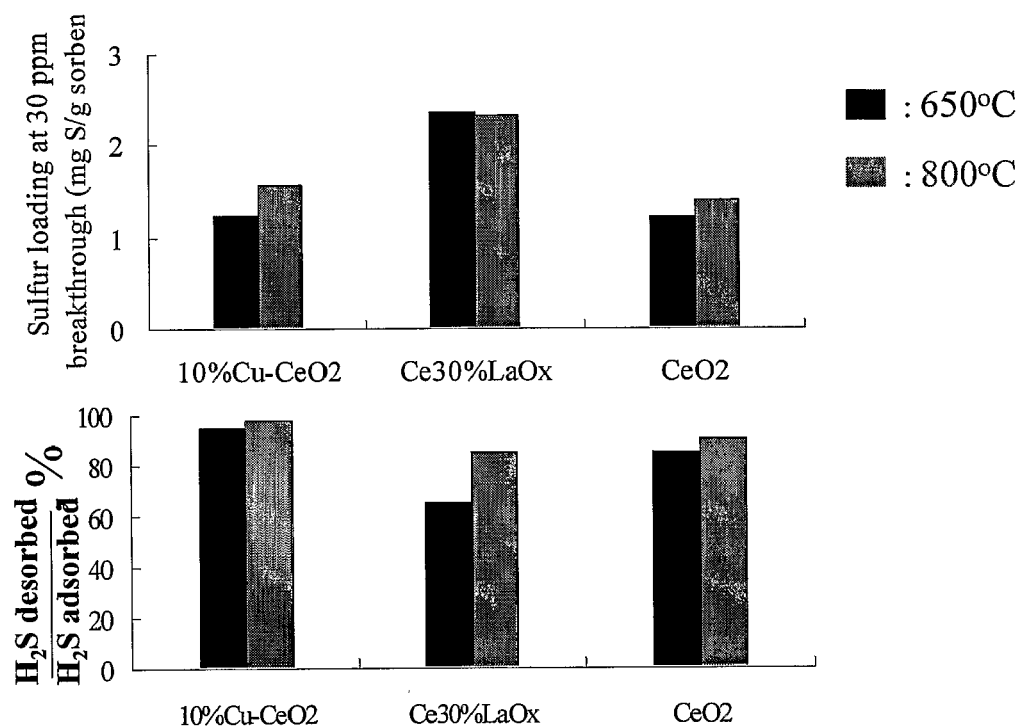
FIG. 32 depicts the stabilized adsorption/desorption of $H_2S$ from ceria-based sorbents. Pre-reduction: 50% $H_2$-10% $H_2O$—He, 800° C.; Sulfidation: 0.1% $H_2S$-50% $H_2$-10% $H_2O$—He, S.V.=80,000 $h^1$; Regeneration: 50% $H_2$-10% $H_2O$—He, S.V.=80,000 $h^{-1}$.

Another aspect of the present invention relates to a unit substantially similar to the unit depicted in FIG. 19. Another aspect of the present invention relates to a unit substantially similar to the unit depicted in FIG. 37. Another aspect of the present invention relates to a unit substantially similar to the unit depicted in FIG. 38.

Another aspect of the present invention relates to a method of desulfurizing fuel gas comprising the step of:

passing fuel gas comprising a sulfur compound through a sorbent, at a flow rate, corresponding to a high space velocity, and at a temperature, wherein the sulfur compound is adsorbed substantially on a surface of the sorbent, thereby generating a substantially desulfurized fuel gas.

In certain embodiments, the present invention relates to the aforementioned method, wherein said space velocity is from about 16,000 $h^{-1}$ to about 400,000 $h^{-1}$.

In certain embodiments, the present invention relates to the aforementioned method, wherein said space velocity is from about 80,000 $h^{-1}$ to about 400,000 $h^{-1}$.

In certain embodiments, the present invention relates to the aforementioned method, wherein said space velocity is about 80,000 $h^{-1}$.

In certain embodiments, the present invention relates to the aforementioned method, wherein said space velocity is about 400,000 $h^{-1}$.

In certain embodiments, the present invention relates to the aforementioned method, wherein said first temperature is selected from about 500° C. to about 1,000° C.

In certain embodiments, the present invention relates to the aforementioned method, wherein said first temperature is selected from about 600° C. to about 900° C.

In certain embodiments, the present invention relates to the aforementioned method, wherein said first temperature is about 650° C.

In certain embodiments, the present invention relates to the aforementioned method, wherein said first temperature is about 800° C.

In certain embodiments, the present invention relates to the aforementioned method, wherein said first temperature is selected from about 300° C. to about 500° C.

In certain embodiments, the present invention relates to the aforementioned method, wherein said first temperature is selected from about 350° C. to about 450° C.

In certain embodiments, the present invention relates to the aforementioned method, wherein said first temperature is about 400° C.

In certain embodiments, the present invention relates to the aforementioned method, wherein the sorbent is represented by formula I:

$$nM\text{-}CeO_x \qquad\qquad I$$

wherein:

M is a transition or lanthanide metal;

n is atomic percent relating to the amount of metal M from about 0% to about 80%; and x is a number $1.5 \leq x \leq 2$.

In certain embodiments, the present invention relates to the aforementioned method, wherein M is a transition metal.

In certain embodiments, the present invention relates to the aforementioned method, wherein M is a transition metal selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg.

In certain embodiments, the present invention relates to the aforementioned method, wherein M is a first row transition metal.

In certain embodiments, the present invention relates to the aforementioned method, wherein M is Mn, Fe, Co, Ni, or Cu.

In certain embodiments, the present invention relates to the aforementioned method, wherein M is Cu.

In certain embodiments, the present invention relates to the aforementioned method, wherein M is a lanthanide metal.

In certain embodiments, the present invention relates to the aforementioned method, wherein M is selected from the group consisting of La, Ce, Pr, Nd, Pm, Sm, Eu, Gd, Tb, Dy, Ho, Er, Tm, Yb, and Lu.

In certain embodiments, the present invention relates to the aforementioned method, wherein M is La.

In certain embodiments, the present invention relates to the aforementioned method, wherein n is about 5%, 10%, 15%, 20%, 25%, 30%, 35%, 40%, 45%, 50%, 55%, 60%, 65%, 70%, or 75 atom %.

In certain embodiments, the present invention relates to the aforementioned method, wherein n is about 10 atom %.

In certain embodiments, the present invention relates to the aforementioned method, wherein n is about 30 atom %.

In certain embodiments, the present invention relates to the aforementioned method, wherein n is about 70 atom %.

In certain embodiments, the present invention relates to the aforementioned method, wherein x is between about 1 and about 2.

In certain embodiments, the present invention relates to the aforementioned method, wherein M is a transition metal; n is about 10%, 30%, or 70% by weight; and x is between about 1.5 and about 2.

In certain embodiments, the present invention relates to the aforementioned method, wherein M is a lanthanide metal; n is about 10 atom %, 30 atom %, or 70 atom % by weight; and x is between about 1.5 and about 2.

In certain embodiments, the present invention relates to the aforementioned method, wherein M is selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg; n is about 10-50 atom %; and x is between about 1.5 and about 2.

In certain embodiments, the present invention relates to the aforementioned method, wherein M is selected from the group consisting of La, Ce, Pr, Nd, Pm, Sm, Eu, Gd, Tb, Dy, Ho, Er, Tm, Yb, and Lu; n is about 10%, 30%, or 70% by weight; and x is between about 1.5 and about 2.

In certain embodiments, the present invention relates to the aforementioned method, wherein M is Mn, Fe, Co, Ni, or Cu; n is about 5%, 10%, 15%, 20%, 25%, 30%, 35%, 40%, 45%, 50 atom %; and x is between about 1.5 and about 2.

In certain embodiments, the present invention relates to the aforementioned method, wherein M is La; n is about 5%, 10%, 15%, 20%, 25%, 30%, 35%, 40%, 45%, 50%, 55%, 60%, 65%, 70%, or 75 atom %; and x is between about 1.5 and about 2.

In certain embodiments, the present invention relates to the aforementioned method, wherein M is Mn, Fe, Co, Ni, or Cu; n is about 10%-50 atom %; and x is between about 1.5 and about 2.

In certain embodiments, the present invention relates to the aforementioned method, wherein M is La; n is about 10% to about 50 atom %; and x is between about 1.5 and about 2.

In certain embodiments, the present invention relates to the aforementioned method, wherein M is Cu; n is about 10% to about 50 atom %; and x is between about 1.5 and about 2.

In certain embodiments, the present invention relates to the aforementioned method, wherein M is La; n is about 30 atom %; and x is between about 1.5 and about 2.

In certain embodiments, the present invention relates to the aforementioned method, wherein M is La; n is about 70 atom %; and x is between about 1.5 and about 2.

In certain embodiments, the present invention relates to the aforementioned method, wherein M is Cu; n is about 10 atom %; and x is between about 1.5 and about 2.

In certain embodiments, the present invention relates to the aforementioned method, wherein the sorbent comprises a rare earth oxide.

In certain embodiments, the present invention relates to the aforementioned method, wherein the sorbent comprises a lanthanum oxide.

In certain embodiments, the present invention relates to the aforementioned method, wherein the sorbent comprises a cerium oxide.

In certain embodiments, the present invention relates to the aforementioned method, wherein the sorbent comprises $La_2O_3$.

In certain embodiments, the present invention relates to the aforementioned method, wherein the sorbent comprises $CeO_2$.

In certain embodiments, the present invention relates to the aforementioned method, wherein the sorbent is a lanthanum oxide.

In certain embodiments, the present invention relates to the aforementioned method, wherein the sorbent is a cerium oxide.

In certain embodiments, the present invention relates to the aforementioned method, wherein the sorbent is $La_2O_3$.

In certain embodiments, the present invention relates to the aforementioned method, wherein the sorbent is $CeO_2$.

In certain embodiments, the present invention relates to the aforementioned method, wherein the sorbent comprises a transition metal oxide.

In certain embodiments, the present invention relates to the aforementioned method, wherein the sorbent comprises a first row transition metal oxide.

In certain embodiments, the present invention relates to the aforementioned method, wherein the sorbent comprises a manganese oxide, an iron oxide, a cobalt oxide, a nickel oxide, a copper oxide or a zinc oxide.

In certain embodiments, the present invention relates to the aforementioned method, wherein the sorbent comprises ZnO.

In certain embodiments, the present invention relates to the aforementioned method, wherein the sorbent is a manganese oxide, an iron oxide, a cobalt oxide, a nickel oxide, a copper oxide or a zinc oxide.

In certain embodiments, the present invention relates to the aforementioned method, wherein the sorbent is ZnO.

In certain embodiments, the present invention relates to the aforementioned method, wherein the sorbent is a rare earth oxide or a transition metal oxide; and said first temperature is selected from about 300° C. to about 500° C.

In certain embodiments, the present invention relates to the aforementioned method, wherein the sorbent is a lanthanum oxide, a cerium oxide, a manganese oxide, an iron oxide, a cobalt oxide, a nickel oxide, a copper oxide or a zinc oxide; and said first temperature is selected from about 350° C. to about 450° C.

In certain embodiments, the present invention relates to the aforementioned method, wherein the sorbent is $La_2O_3$; and said first temperature is about 400° C.

In certain embodiments, the present invention relates to the aforementioned method, wherein the sorbent is $CeO_2$; and said first temperature is about 400° C.

In certain embodiments, the present invention relates to the aforementioned method, wherein the sorbent is ZnO; and said first temperature is about 400° C.

In certain embodiments, the present invention relates to the aforementioned method, wherein the sulfur compound is $H_2S$.

In certain embodiments, the present invention relates to the aforementioned method, wherein the sorbent is fully sulfided, wherein the surface and bulk sorbent is sulfided.

In certain embodiments, the present invention relates to the aforementioned method, further comprising the step of passing said substantially desulfurized fuel gas over an oxidation catalyst.

In certain embodiments, the present invention relates to the aforementioned method, further comprising the step of passing the substantially desulfurized fuel gas through a sorbent.

In certain embodiments, the present invention relates to the aforementioned method, further comprising the step of reducing the sorbent by passing a reducing gas through the sorbent.

In certain embodiments, the present invention relates to the aforementioned method, wherein the reducing gas comprises about 50% by volume $H_2$ and CO, and about 0% to about 20% by volume $H_2O$.

In certain embodiments, the present invention relates to the aforementioned method, wherein the reducing gas comprises about 50% by volume H$_2$ and CO, about 10 to about 20% by volume H$_2$O, and about 5 to about 20% by volume CO$_2$, and the balance is nitrogen gas.

7. Summary

The instant invention establishes that reduced cerium oxide sorbents have good sulfidation efficiency and kinetics at 650-800° C. Copper addition improves the kinetics, while lanthanum oxide addition improves the sulfur capacity of the sorbent. In addition, regeneration schemes examined for these sorbents have shown the regeneration of the sorbent surface by purging the adsorbed H$_2$S. In one embodiment, a simple swing H$_2$S adsorption-desorption process was designed for on-board sulfur removal and recovery in SOFC applications. Further, other regenerable sorbents (e.g., ZnO, La$_2$O$_3$, CeO$_2$) have been shown to have good sulfidation efficiency and kinetics at even lower temperatures, e.g., about 400° C.

In addition, all of the approaches described herein (e.g. FIGS. 19, 37 and 38) provide flexibility of designs and options to the user, and can address the needs of fuel cell systems of small-scale, medium-scale, mobile or remote stationary units, as well as the large-scale gasification power plants using sulfur-laden fuels, including coal. In part the present invention relates to a unit substantially similar to the unit depicted in FIG. 19. In part the present invention relates to a unit substantially similar to the unit depicted in FIG. 37. In part the present invention relates to a unit substantially similar to the unit depicted in FIG. 38.

EXEMPLIFICATION

The invention now being generally described, it will be more readily understood by reference to the following examples which are included merely for purposes of illustration of certain aspects and embodiments of the present invention, and are not intended to limit the invention.

Example 1

Figure 33:
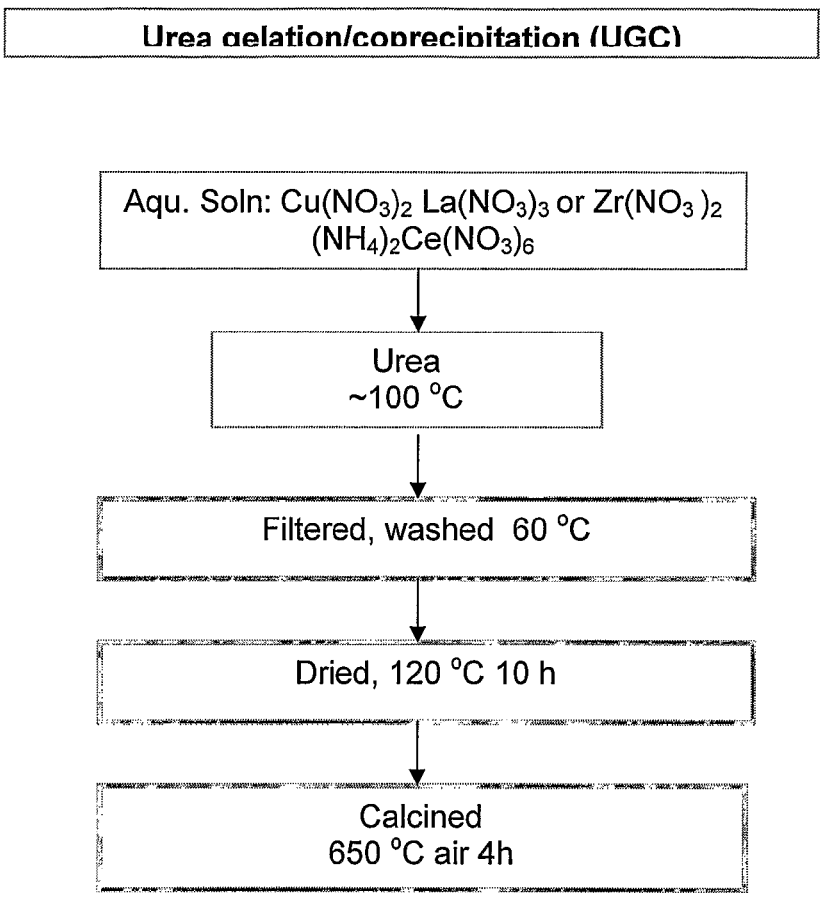
FIG. 33 depicts the preparation, and resulting particle size and surface area, of nanoscale ceria-based sorbents.
Figure 34:
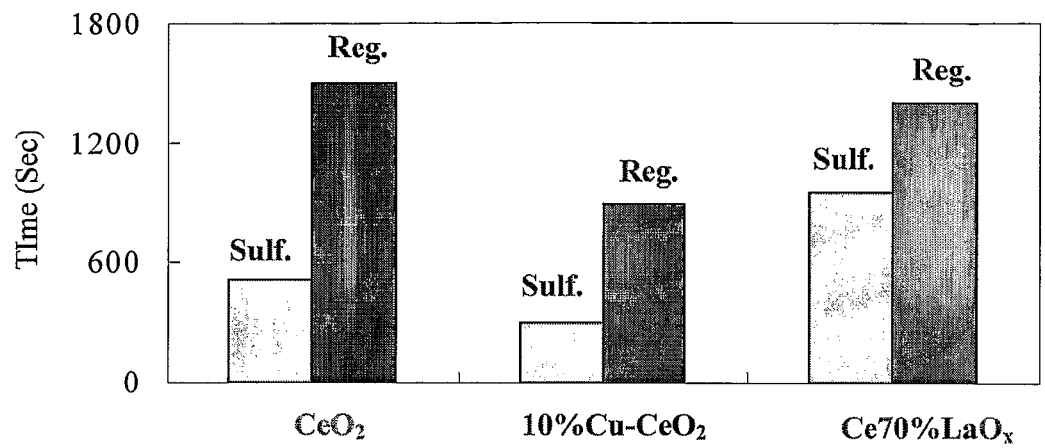
FIG. 34 depicts a comparison of sulfidation/regeneration times. Regenerative gas: $O_2$/He. Part A—Pre-reduction: 50% $H_2$-10% $H_2O$—He, T=800° C.; Sulfidation: 0.1% $H_2S$-50% $H_2$-10% $H_2O$—He, T=800° C., S.V.=16,000/h; Regeneration: 3% $O_2$—He, T=800° C., S.V.=80,000/h. Part B—50% $H_2$-10% $H_2O$—He, T=800° C.; Sulfidation: 0.1% $H_2S$-50% $H_2$-10% $H_2O$—He, T=800° C., S.V.=80,000/h; Regeneration: 3% $O_2$—He, T=800° C., S.V.=80,000/h.
Figure 34:
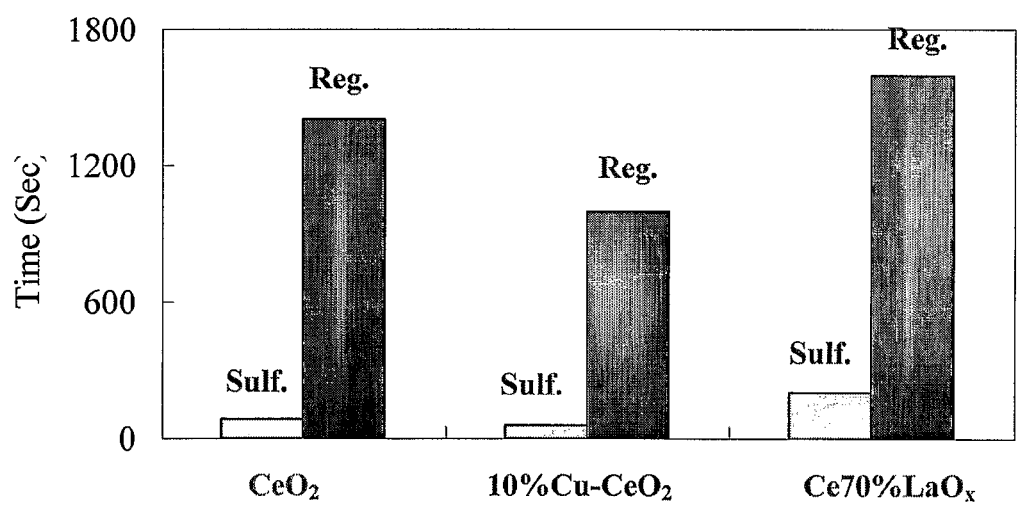
Figure 35:
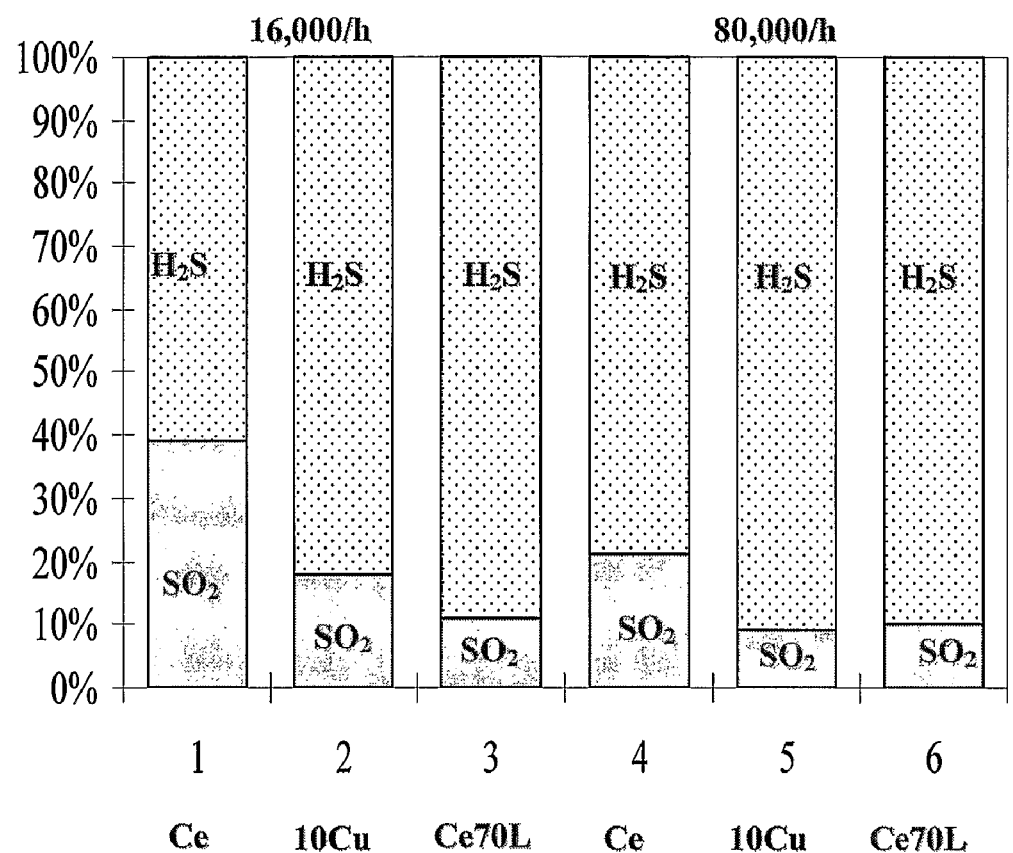
FIG. 35 depicts offgas composition in regeneration with $O_2$ at 800° C. Pre-reduction: 50% $H_2$-10% $H_2O$—He, T=800° C.; Sulfidation 0.1% $H_2S$-50% $H_2$-10% $H_2O$—He, T=800° C., S.V.=16,000 (left three columns) or 80,000/h (right three columns); Regeneration: 3% $O_2$—He, S.V.=80,000/h.
Figure 36:
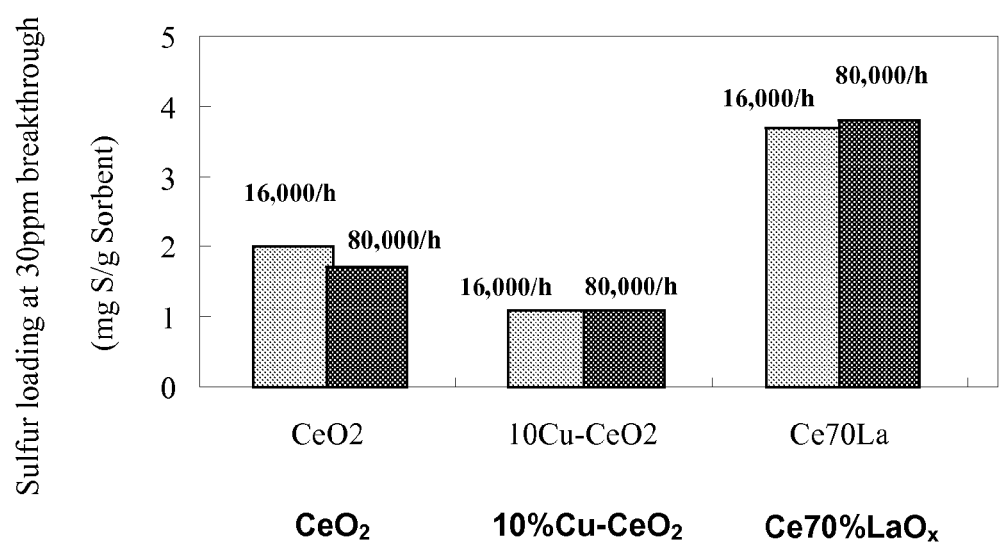
FIG. 36 depicts sorbent sulfur capacity after six cycles, showing no effect of sulfidation space velocity on surface $H_2S$ loading Pre-reduction: 50% $H_2$-10% $H_2O$—He, T=800° C.; Sulfidation 0.1% $H_2S$-50% $H_2$-10% $H_2O$—He, T=800° C., S.V.=16,000 (light colored) or 80,000/h (dark colored); Regeneration: 3% $O_2$—He, S.V.=80,000/h.

Sorbent Preparation. Cerium (IV) oxide (ceria), and La$_2$O$_3$ or CuO— containing ceria materials were prepared by the urea coprecipitation/gelation method, using nitrate salt solutions in the desired atomic metal ratios. For example, to prepare 10% Cu—CeOx, 1.8 g copper (II) nitrate and 41.1 g ammonium cerium (IV) nitrate were mixed and dissolved in 600 mL DI-water. This gives an atomic ratio of Ce/Cu of 9:1. Excess urea (72 g) was added into the solution under constant stirring and boiling over a hot plate. After the precipitant was produced, DI-water was added to 800 mL, and the solution was kept boiling for 8 h. The precipitate was filtered, washed twice, then dried in vacuum at 120° C. for 12 h, and crushed to powder before calcination. Samples were heated to 650 or 750° C. in air at 2° C./min, holding at the final temperature for 4 h. After calcination in air at 650° C. for 4 h, high surface area materials (80~100 m$^2$/g) with nanosize ceria were obtained. See FIG. 33.

Example 2

Cyclic regeneration performance of sulfided sorbents. Sulfidation and regeneration tests were run in a packed-bed, quartz-tube micro reactor to evaluate the sulfur capacity, efficiency, regenerability, and stability of the sorbents. The sorbents were prepared by the urea coprecipitation/gelation method. In a typical experiment, 0.34 grams of sorbent powder, sized to less than 53 microns, was loaded in the reactor and then heated to the desired temperature in He, an inert gas. To mimic the conditions in a fixed-bed sorber where most of the bed is initially exposed to sulfur-free gas, pre-reduction of the sorbents in H$_2$S-free fuel gas at the selected sulfidation temperature was carried out prior to each sulfidation test. Then the sulfidation gas (50% H$_2$, 0.1% H$_2$S, 10% H$_2$O balance He) was introduced to the sorbent. This gas contains an exaggerated amount of hydrogen, corresponding to the upper limit of the combined concentration of H$_2$ and CO present in a reformate gas produced by catalytic partial oxidation (CPOX) of a heavy fuel, such as JP-8. In separate experiments we have found that substituting CO for half of the H$_2$ does not alter the results. The amount of H$_2$S present in our sulfidation gas is also higher than the 300-400 ppm expected from the CPOX of a typical JP-8 fuel. This was done to accelerate breakthrough times and allow for many cycles of sulfidation/regeneration to be performed in the course of a day. The sulfidation process was carried out at a high space velocity to keep the reaction on the surface of the sorbent. Once the surface of the sorbent is saturated, the concentration of H$_2$S in the outlet stream starts to increase. A UV-visible gas analyzer was used to monitor continuously the exit gas content of H$_2$S. Sulfidation was allowed to continue only to the point where the H$_2$S concentration reached a breakthrough level of 30 ppm. This level is considered safe for the anode material of a solid oxide fuel cell operating at temperatures higher than 650° C. The regeneration gas was then introduced right after sulfidation. The regeneration offgases, H$_2$S and/or SO$_2$ (depending on the type of regeneration gas), were monitored by a UV-visible gas analyzer. The regeneration process was continued until the H$_2$S and SO$_2$ concentration leveled off (to a value less than 10 ppm). Next, the sorbent was again exposed to the sulfidation gas mixture. After the first few cycles, stable performance in sulfidation/regeneration cycling was achieved with all sorbents examined here.

Example 3

Effect of space velocity on regeneration time. A 10% Cu—CeO$_2$ sorbent underwent sulfidation/regeneration cycling under the following conditions. The sorbent was pre-reduced with a 50% H$_2$, 10% H$_2$O, and 40% helium mixture for 1 hr. This step was followed by sulfidation in a gas mixture of 0.1% H$_2$S, 50% H$_2$, 10% H$_2$O, and the balance of helium gas stream to breakthrough of 30 ppm H$_2$S. The sulfidation step was followed by a regeneration step comprising passing a 50% H$_2$, 10% H$_2$O, and balance of helium gas stream through the sorbents. The sulfidation and regeneration steps were repeated. Space velocities of 80,000 h$^{-1}$ and 400,000 h$^{-1}$ were compared.

Example 4

Parametric effects on the regeneration offgas composition from 10% Cu—CeO$_2$. A 10% Cu—CeO$_2$ sorbent was used to determine the effect the regeneration gas has on regeneration times at a temperature of 800° C. The sorbent was pre-reduced in the same manner as in Examples 1 and 2. Sulfidation was carried out at a space velocity of 16,000 h$^{-1}$ which corresponds to 40 mL/min and 0.34 g sorbent using a 0.1% H$_2$S, 50% H$_2$, 10% H$_2$O, and balance of helium to breakthrough of 30 ppm. Regeneration was carried out using He, He+10% H$_2$O, 50% H$_2$/He, or 50% H$_2$/He+10% H$_2$O. The sulfidation and regeneration steps were repeated.

Example 5

Effect of different regeneration gas on cyclic performance. A 10% Cu—Cu—CeO$_x$ sorbent was used to determine the effect the regeneration gas has on regeneration times at temperatures of 650° C. and 800° C. The sorbent was pre-reduced in the same manner as in Examples 1 and 2. Sulfidation and regeneration were carried out at a space velocity of 80,000 h$^{-1}$ which corresponds to 200 mL/min and 0.34 g sorbent. Sulfidation was carried out using a 0.1% $H_2S$, 50% $H_2$, 10% $H_2O$, and balance of helium to breakthrough of 30 ppm. Regeneration was carried out using He, He+10% $H_2O$, 50% $H_2$/He, or 50% $H_2$/He+10% $H_2O$. The sulfidation and regeneration steps were repeated.

Example 6

Cyclic regeneration performance of fully sulfided sorbents. A comparison of regeneration times for a fully sulfided and non-fully sulfided 30% La—$CeO_x$ sorbent was determined by fully sulfiding one 30% La—$CeO_x$ sorbent with a waterless gas stream comprising 0.1% $H_2S$, 50% $H_2$, balance of helium at 16,000 h$^{-1}$. Prior to this step, both sorbents were pre-reduced in the same manner as in Examples 1 and 2 except no water was used in the reduction gas stream. The non-fully sulfided 30% La—$CeO_x$ sorbent was sulfided in the same manner as the fully sulfided sorbent, except that the gas stream comprised 10% $H_2O$. Regeneration was carried out using 50% $H_2$, 10% $H_2O$, balance of helium at 80,000 h$^{-1}$. The sulfidation and regeneration steps were repeated.

Example 7

Cyclic oxidative regeneration performance of sulfided sorbents. The effects of fully sulfiding a sorbent, regeneration gas, and space volumes were tested on several Cu—$CeO_x$ sorbents according to the conditions in Table 6. Pre-reduction of the sorbents and full sulfidation was carried in the same manner as in Example 5. The other sulfidation steps were carried out at 80,000 h$^{-1}$ which corresponds to 200 mL/min and 0.34 g sorbent using a 0.1% $H_2S$, 50% $H_2$, 10% $H_2O$, and balance of helium mixture to breakthrough of 30 ppm $H_2S$. Regeneration was carried out at 80,000 h$^{-1}$ using the regeneration gas mixture indicated. The sulfidation and regeneration steps were repeated.

Example 8

Long-Term, Non-Regenerative Desulfurization Using an La-Rich Sorbent. The results depicted in FIGS. 39 and 40 demonstrate the suitability of a La-rich sorbent (e.g., dispersed in a matrix) for the long-term removal of low concentrations of hydrogen sulfide from hot gas streams. An exemplary use is as a compact polishing unit, perhaps in the form of a cartridge, to desulfurize gases prior to their use in a fuel cell. The experimental results demonstrate that such a device could be used for a long period without the need for maintenance or regeneration.

Experimental Parameters—Sorbent: Ce70% LaOx; calcined in air at 650° C. for 4 h; <53 µm particle size; and about 0.25 g loaded in the reactor. Gas flow rate=200 mL/min. Sulfidation Temperatures=700° C. (FIG. 39) or 800° C. (see FIG. 40). Gas composition at 700° C.=50 ppm $H_2S$-40% $H_2$-5% $H_2O$—He. Gas composition at 800° C.=60 ppm $H_2S$-40% $H_2$-5% $H_2O$—He.

Figure 39:
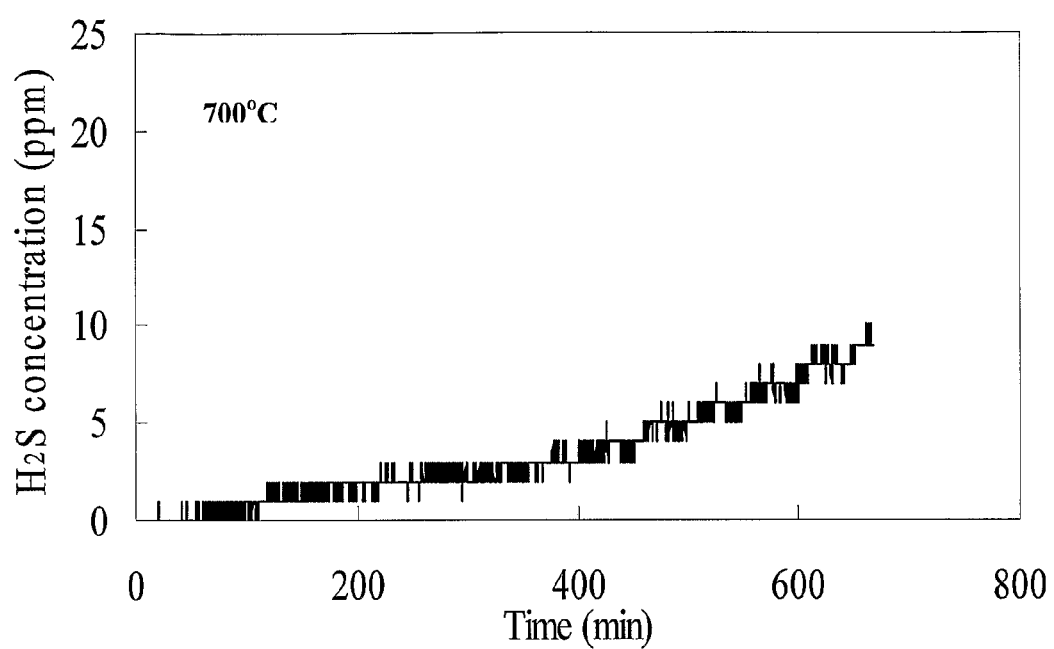
FIG. 39 depicts as a function of time the hydrogen sulfide concentration in the outlet gas stream in a non-regenerating system running at 700° C. using 70% $La$—$CeO_x$.
Figure 40:
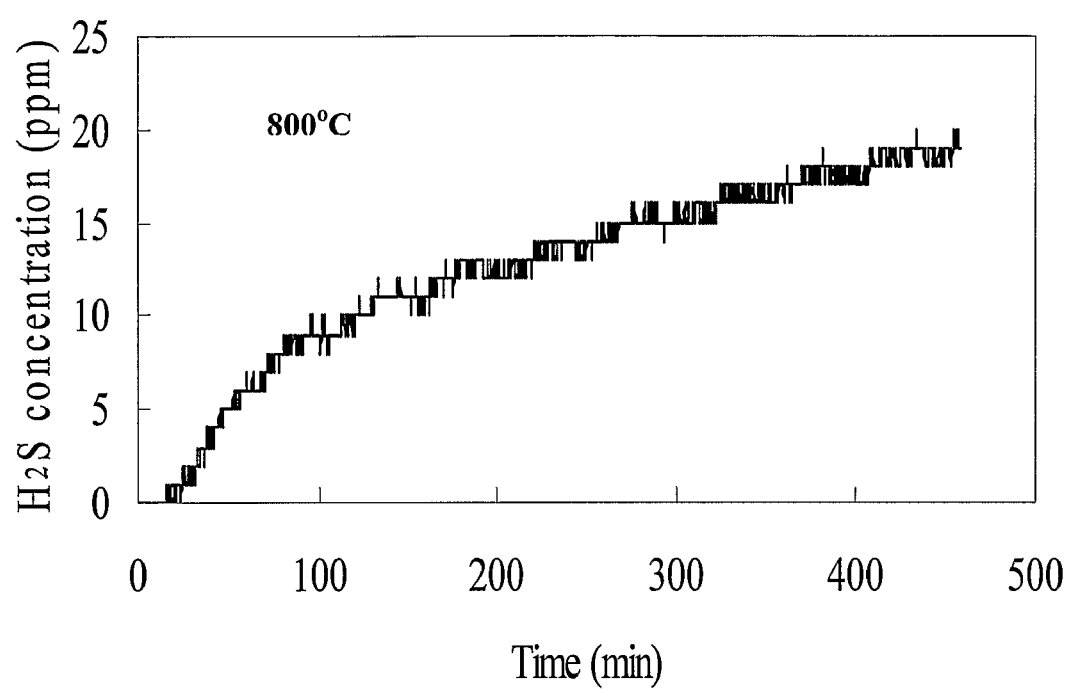
FIG. 40 depicts as a function of time the hydrogen sulfide concentration in the outlet gas stream in a non-regenerating system running at 800° C. using 70% $La$—$CeO_x$.
Figure 41:
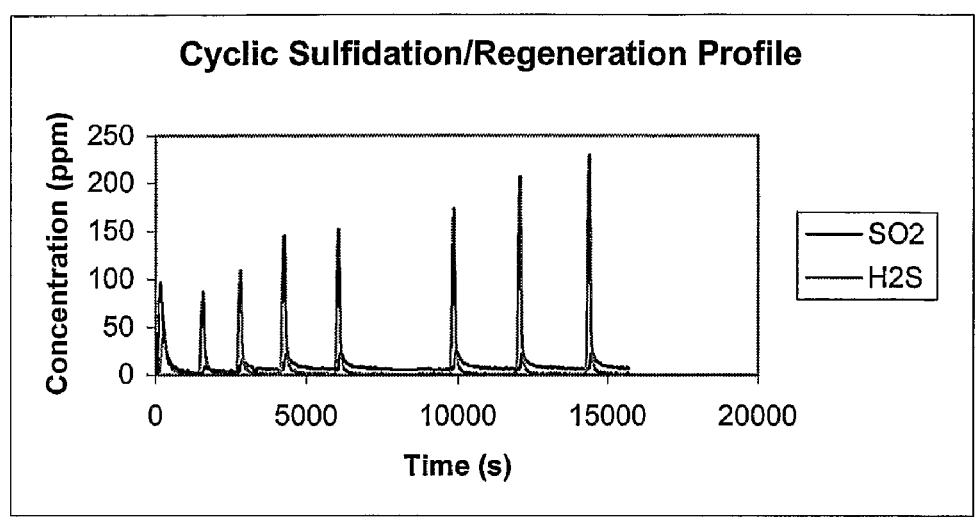
FIG. 41 depicts a regeneration profile at 400° C. for ZnO.
Figure 42:
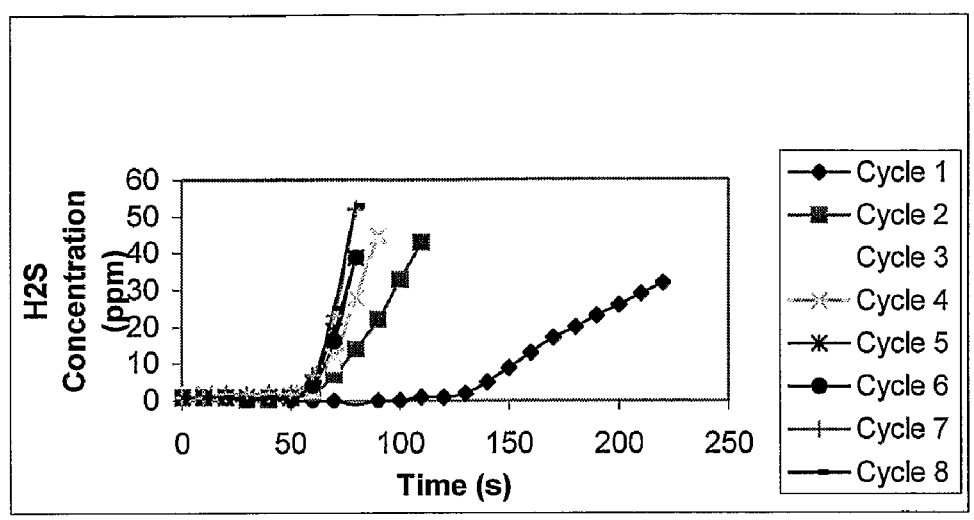
FIG. 42 depicts cyclic sulfidation/regeneration at 400° C. for ZnO.
Figure 43:
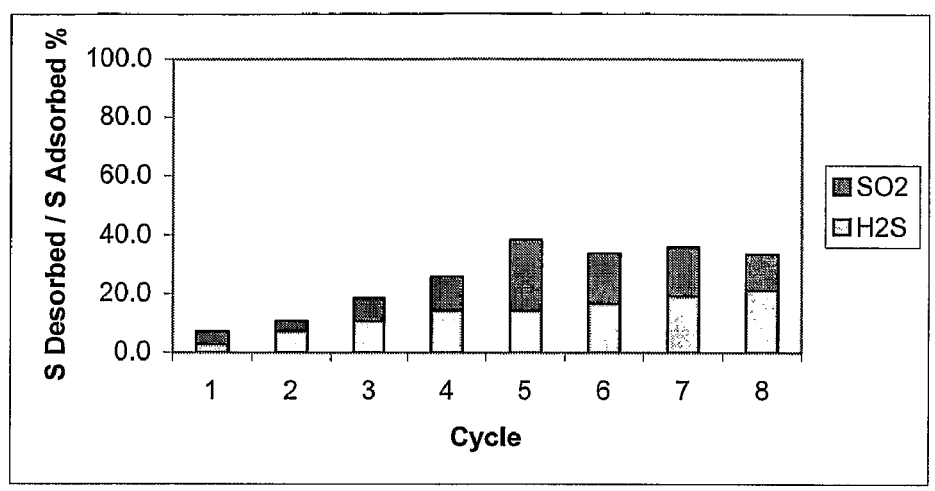
FIG. 43 depicts the stabilized adsorption/desorption of $H_2S$ from ZnO.
Figure 44:
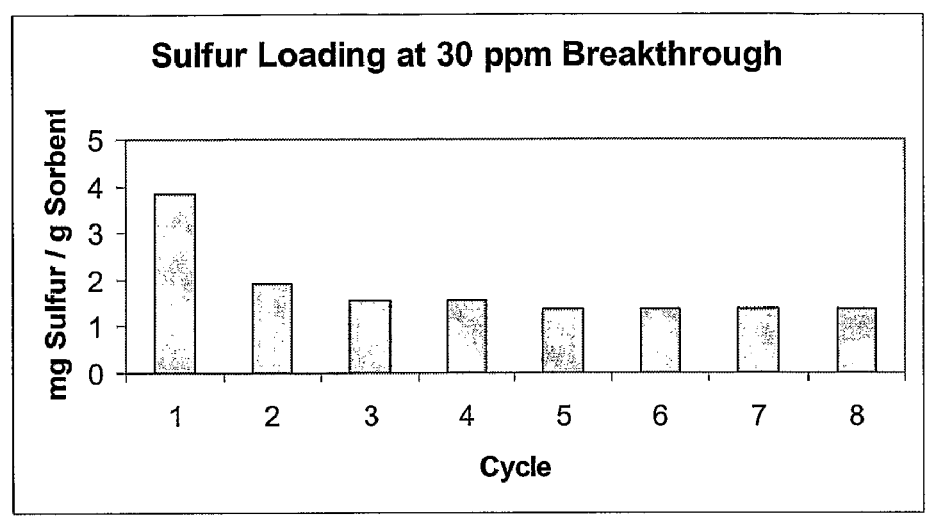
FIG. 44 depicts the cyclic sulfur capacity at 30 ppm for ZnO.

Experimental Results—FIG. 39 depicts the $H_2S$ breakthrough profile obtained at 700° C. To reach about 3 ppm and about 4 ppm outlet concentration, it took about 220 minutes and about 377 minutes, respectively. The corresponding sulfur loadings were about 12.5 and about 21.4 mg S/g sorbent. FIG. 40 depicts the $H_2S$ breakthrough profile obtained at 800° C. It took about 2400 sec to reach about 4 ppm $H_2S$ outlet concentration. At that time, the sulfur loading was about 2.74 mg S/g sorbent.

Example 9

Low Temperature Cyclic Sulfidation and Regeneration. Sulfidation and regeneration tests were run at atmospheric pressure in a packed-bed, quartz-tube microreactor (I.D.=1.0 cm) to evaluate the sorbent sulfur capacity, sulfur removal efficiency and sorbent regenerability. In a typical experiment, 0.34 grams of sorbent powder, sized to less than 53 microns, was loaded on a quartz frit located at the center of the reactor and then heated to 400° C. in pure He. To mimic the conditions in a fixed-bed sorber where most of the bed is initially exposed to sulfur-free gas, pre-reduction of the sorbents in $H_2S$-free fuel gas mixture (50% $H_2$, 10% $H_2O$ balance He) at the selected sulfidation temperature was carried out for 1 hour prior to each sulfidation test. Then the sulfidation gas mixture (0.1% $H_2S$, 50% $H_2$, 10% $H_2O$ balance He) was introduced over the sorbent bed. Most sulfidation tests were done at the same temperature at a flow rate of 200 mL/min. Sulfidation was performed until the $H_2S$ concentration in outlet gas mixture reached a breakthrough level of 30 ppm. The $H_2S$ and $SO_2$ concentrations in the gas mixture during operation were monitored by a Western Research Series 900 UV-Visible analyzer (Ametek). The regeneration gas mixture was introduced after each sulfidation half cycle. This was continued until the $H_2S$ and $SO_2$ concentrations in the off gas leveled off (<2 ppm).

In some tests, we used pre-sulfided sorbents and examined the possibility to use only the surface of the sorbent particles for sulfur capture. Presulfidation was performed in a gas mixture of 2500 ppm $H_2S$-50% $H_2$-bal. He at 400° C. till the $H_2S$ concentration in the exit gas was equal to that of the inlet gas. A flow rate of 50 mL/min (NTP) was used in pre-sulfidation.

Fresh ZnO. Conditions: fresh ZnO required no pre-reduction; temperature was at 400° C.; sulfidation: 0.1% $H_2S$-50% $H_2$-10% $H_2O$—He, flow rate=200 mL/min; and regeneration: 50% $H_2$-10% $H_2O$—He, flow rate=200 mL/min. Fresh ZnO showed in the early cycles some bulk sulfidation. This is evidenced by the low % desorption of sulfur during regeneration. As more cycles are performed, the bulk material will be more and more sulfided. Therefore, it is possible to desorb all of the adsorbed sulfur from the surface of the sorbent. This is shown by pre-sulfiding the bulk of the material prior to the cyclic tests. See FIGS. 41-44.

Figure 45:
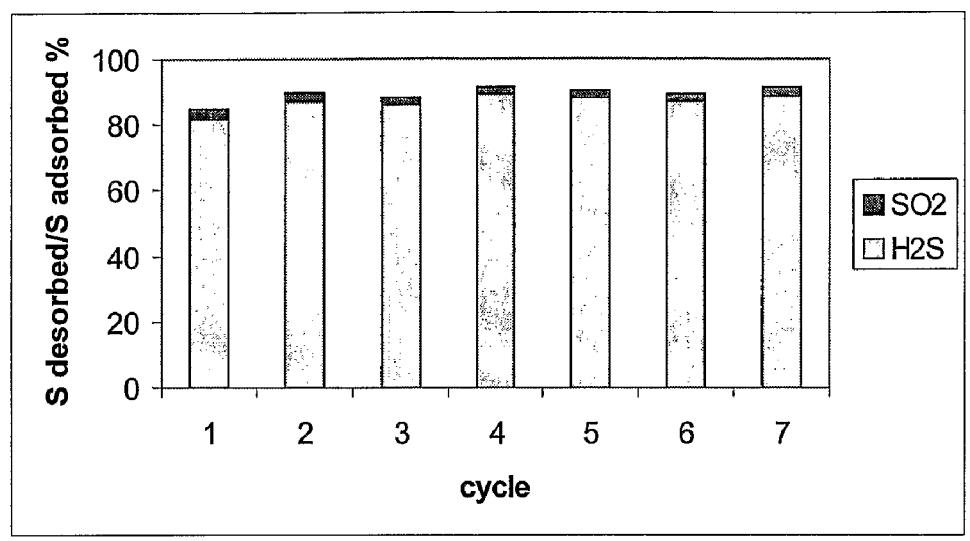
FIG. 45 depicts, for pre-sulfided ZnO, stable sulfur capacity at 30 ppm $H_2S$, breakthrough of 1.15 mg S/g sorbent.
Figure 46:
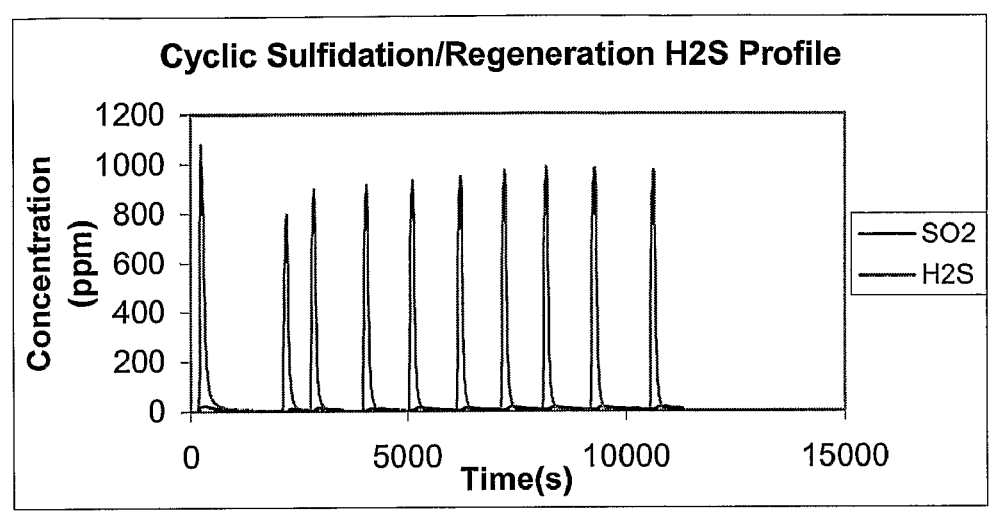
FIG. 46 depicts a regeneration profile at 400° C. for $La_2O_3$.
Figure 47:
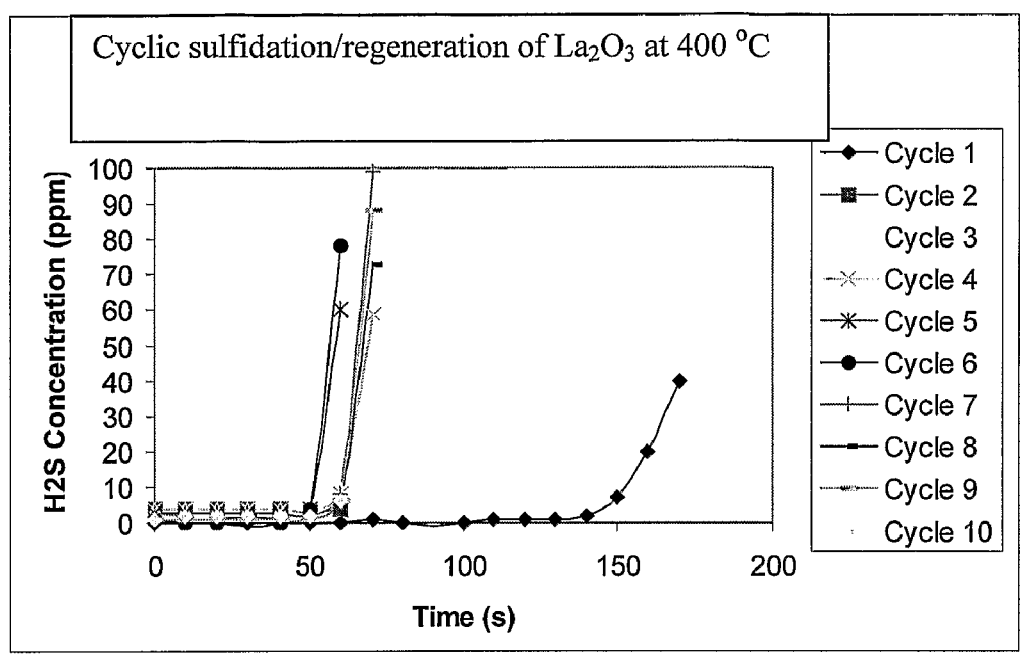
FIG. 47 depicts cyclic sulfidation/regeneration at 400° C. for $La_2O_3$.
Figure 48:
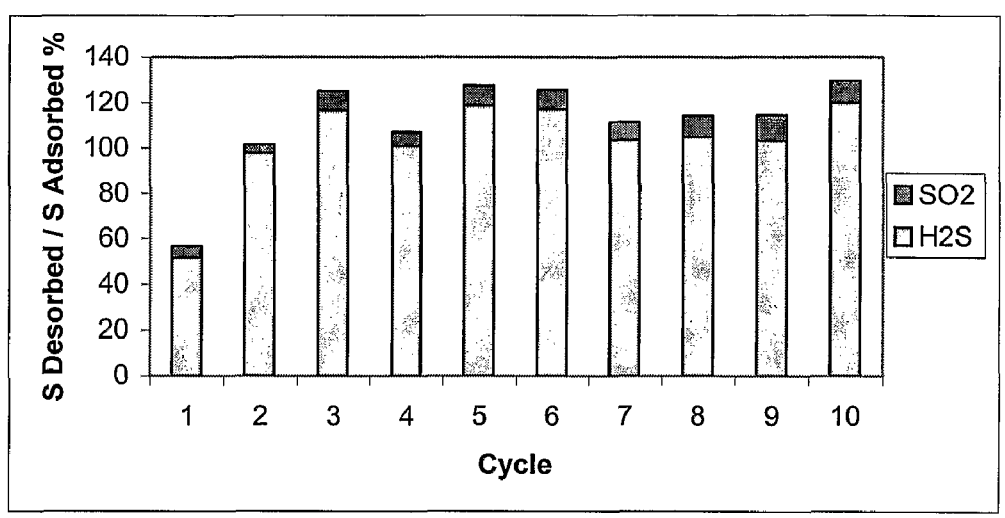
FIG. 48 depicts the stabilized adsorption/desorption of $H_2S$ from $La_2O_3$.
Figure 49:
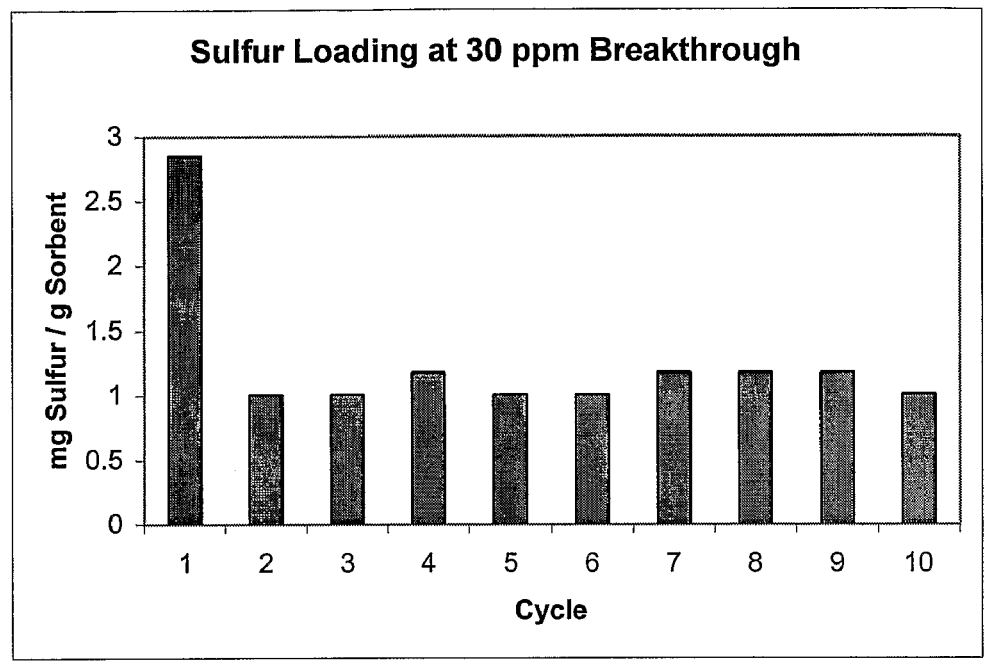
FIG. 49 depicts the cyclic sulfur capacity at 30 ppm for $La_2O_3$.
Figure 50:
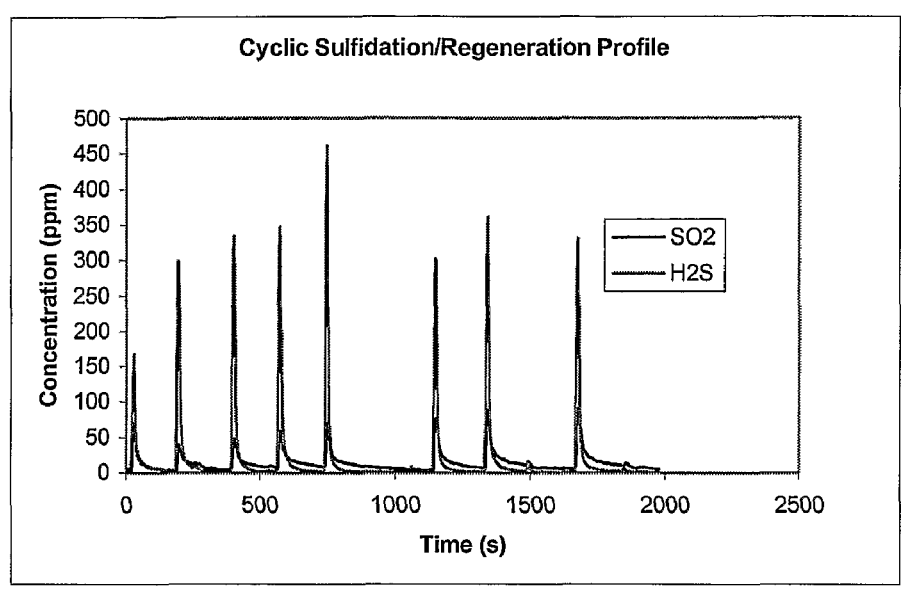
FIG. 50 depicts a regeneration profile at 400° C. for $CeO_2$.
Figure 51:
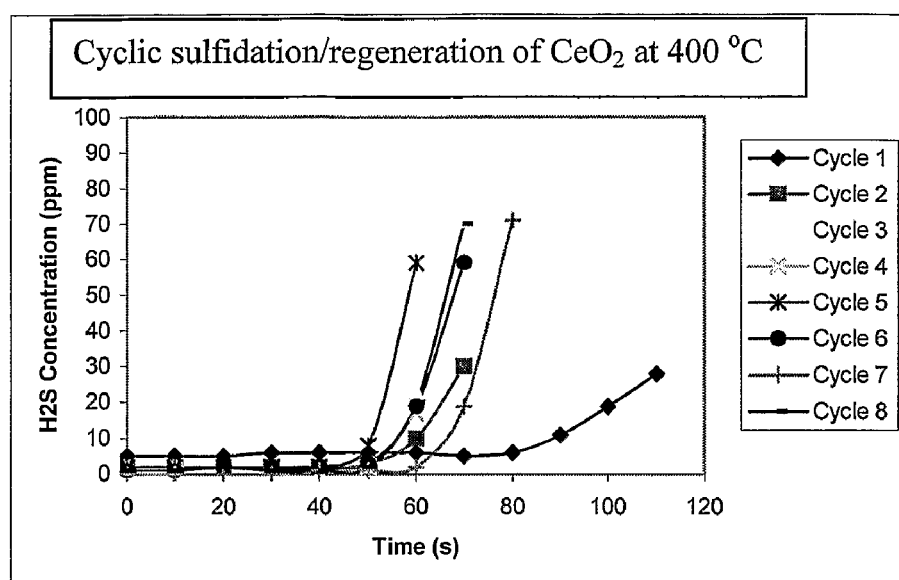
FIG. 51 depicts cyclic sulfidation/regeneration at 400° C. for $CeO_2$.
Figure 52:
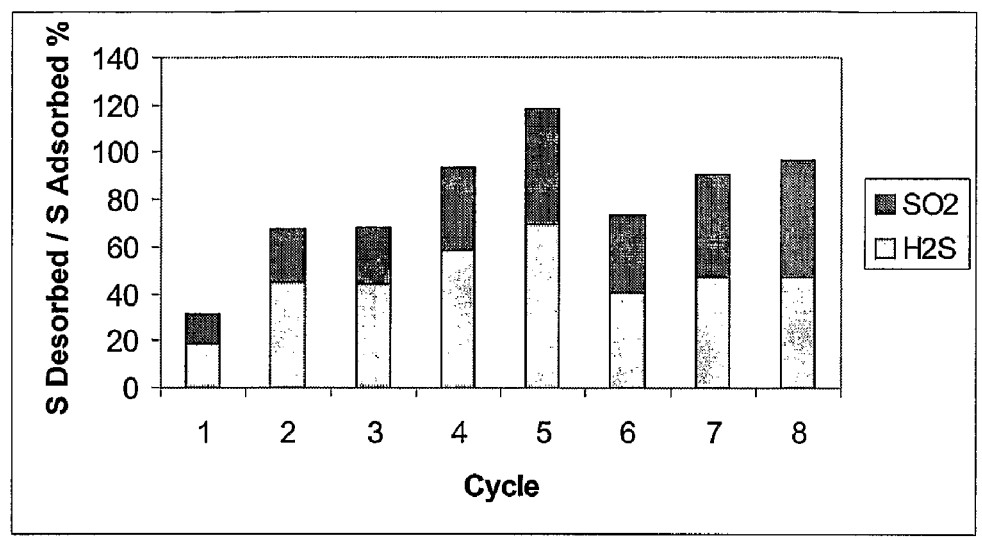
FIG. 52 depicts the stabilized adsorption/desorption of $H_2S$ from $CeO_2$.
Figure 53:
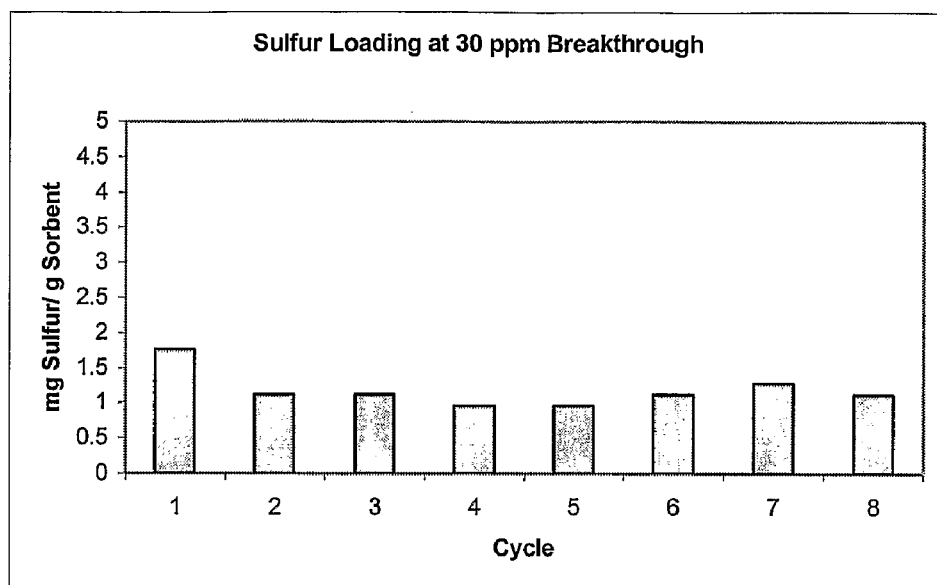
FIG. 53 depicts the cyclic sulfur capacity at 30 ppm for $CeO_2$.

Pre-sulfided ZnO. Conditions: pre-sulfidation: 2500 ppm $H_2S$-50% $H_2$—He, flow rate=50 mL/min; temperature was at 400° C.; sulfidation: 0.1% $H_2S$-50% $H_2$-10% $H_2O$—He, flow rate=200 mL/min; and regeneration: 50% $H_2$-10% $H_2O$—He, flow rate=200 mL/min. With pre-sulfided ZnO, the % sulfur desorption increased from 35% (after 8 cycles) to about 90%. The stable sulfur capacity at 30 ppm $H_2S$ breakthrough is 1.15 mg S/g sorbent. See FIG. 45.

Fresh $La_2O_3$ and fresh $CeO_2$. $La_2O_3$ conditions: fresh $La_2O_3$ required no pre-reduction; temperature was at 400° C.; sulfidation: 0.1% $H_2S$-50% $H_2$-10% $H_2O$—He, flow rate=200 mL/min; and regeneration: 50% $H_2$-10% $H_2O$—He, flow rate=200 mL/min. $CeO_2$ conditions: fresh $CeO_2$ was pre-reduced: 50% $H_2$-10% $H_2O$—He for 1 h; temperature was at 400° C.; sulfidation: 0.1% $H_2S$-50% $H_2$-10% $H_2O$—He, flow rate=200 mL/min; and regeneration: 50% $H_2$-10% $H_2O$—He, flow rate=200 mL/min. $CeO_2$ and $La_2O_3$, which are excellent high-temperature desulfurization sorbents, also exhibited stable cyclic sulfidation/regeneration tests at the low temperature of 400° C. Stable sulfur capacity is achieved after a few cycles of surface sulfidation/regeneration. Therefore, the surface adsorption/desorption cyclic performance of $CeO_2$-based sorbents and $La_2O_3$, which are promising novel methods for high-temperature desulfurization, can also be applied at low temperatures. See FIGS. 46-53.

In general, as long as there is reversible adsorption of $H_2S$ on the sorbent at a given temperature, this sorbent material can be used in the swing adsorption/desorption method disclosed here. Materials other than the rare earth oxides become potential candidates at low temperatures. As demonstrated above, these materials include ZnO, which can be used regeneratively.

INCORPORATION BY REFERENCE

All of the U.S. patents and U.S. patent application publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:
1. A method of desulfurizing fuel gas, comprising the steps of:
passing fuel gas comprising a sulfur compound through a sorbent, at a first flow rate, corresponding to a high space velocity, and at a first temperature, wherein the sulfur compound is adsorbed substantially on a surface of the sorbent, thereby generating a substantially desulfurized fuel gas; and
regenerating the sorbent by passing a regenerating gas stream through the sorbent, at a second flow rate, corresponding to a high space velocity, and at a second temperature, thereby desorbing substantially all of the sulfur compound from said sorbent surface;
wherein the sorbent comprises a lanthanum oxide or a cerium oxide;
the sorbent further comprises a lanthanide metal or a transition metal;
said first space velocity is from about 16,000 $h^{-1}$ to about 400,000 $h^{-1}$;
said second space velocity is from about 16,000 $h^{-1}$ to about 400,000 $h^{-1}$;
said first temperature is selected from about 400° C. to about 1,000° C.;
and said second temperature is selected from about 400° C. to about 1,000° C.

2. The method of claim 1, wherein said first space velocity is from about 80,000 $h^{-1}$ to about 400,000 $h^{-1}$; and said second space velocity is from about 80,000 $h^{-1}$ to about 400,000 $h^{-1}$.

3. The method of claim 1, wherein said first space velocity is about 80,000 $h^{-1}$;
and said second space velocity is about 80,000 $h_{-1}$.

4. The method of claim 1, wherein the sorbent is represented by formula I:

$$nMO_y\text{—}CeO_x \qquad \text{I}$$

wherein:
M is a transition or lanthanide metal;
n is atomic percent relating to the amount of metal M from about 5% to about 80%;
x is a number $1.5 \leq x \leq 2$; and
y is a number $0 \leq y \leq 2$.

5. The method of claim 4, wherein M is a transition metal selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, and Zn.

6. The method of claim 4, wherein M is Cu.

7. The method of claim 4, wherein M is a lanthanide metal.

8. The method of claim 4, wherein M is selected from the group consisting of La, Ce, Pr, Nd, Pm, Sm, Eu, Gd, Tb, Dy, Ho, Er, Tm, Yb, and Lu.

9. The method of claim 4, wherein M is La.

10. The method of claim 1, wherein said first temperature is about 800° C.; and said second temperature is about 800° C.

11. The method of claim 1, wherein the regenerating gas comprises the gas composition exiting the anode of a fuel cell.

12. The method of claim 11, wherein said fuel cell is a solid oxide fuel cell.

13. The method of claim 1, wherein the sulfur compound is $H_2S$.

14. The method of claim 1, wherein the bulk of the sorbent is sulfided.

15. The method of claim 14, wherein said regenerating gas stream comprises any sulfur-free gas composition.

16. The method of claim 15, wherein said regenerating gas stream is the effluent of the anode of a solid oxide fuel cell.

17. The method of claim 15, wherein said regenerating gas stream is a combustor exhaust gas stream.

* * * * *